(12) United States Patent
Montague et al.

(10) Patent No.: US 12,246,811 B2
(45) Date of Patent: Mar. 11, 2025

(54) WATERCRAFT DEVICE WITH A HANDHELD CONTROLLER

(71) Applicant: Kai Concepts, LLC, Alameda, CA (US)

(72) Inventors: Donald Lewis Montague, Paia, HI (US); Joseph Andrew Brock, Alameda, CA (US); Jamieson Edward Schulte, Alameda, CA (US); Daniel Elliot Schabb, Alameda, CA (US); Alec Korver, Monument, CO (US)

(73) Assignee: Kai Concepts, LLC, Alameda, CA (US)

( * ) Notice: Subject to any disclaimer, the term of this patent is extended or adjusted under 35 U.S.C. 154(b) by 355 days.

(21) Appl. No.: 17/523,680

(22) Filed: Nov. 10, 2021

(65) Prior Publication Data

US 2022/0063786 A1 Mar. 3, 2022

Related U.S. Application Data

(63) Continuation-in-part of application No. 17/238,085, filed on Apr. 22, 2021, now Pat. No. 11,897,583.
(Continued)

(51) Int. Cl.
*G05D 1/00* (2024.01)
*B63B 32/10* (2020.01)
(Continued)

(52) U.S. Cl.
CPC ............ *B63H 21/21* (2013.01); *B63B 32/10* (2020.02); *B63B 32/66* (2020.02); *B63H 21/17* (2013.01);
(Continued)

(58) Field of Classification Search
CPC ..................................................... B63H 21/21
See application file for complete search history.

(56) References Cited

U.S. PATENT DOCUMENTS

| 1,067,392 A | 7/1913 | Barr |
| 3,405,677 A | 10/1968 | Smith |
| (Continued) | | |

FOREIGN PATENT DOCUMENTS

| AU | 5012101 A | 12/2002 |
| AU | 200150121 | 12/2002 |
| (Continued) | | |

OTHER PUBLICATIONS

European Search Report for Application No. 22206528.6 dated Apr. 11, 2023.
(Continued)

*Primary Examiner* — Redhwan K Mawari
*Assistant Examiner* — Paul W Arellano
(74) *Attorney, Agent, or Firm* — Fitch, Even, Tabin & Flannery LLP

(57) ABSTRACT

In one aspect, a wireless remote controller for a personal watercraft is provided that includes a watertight body and a rotatable thumbwheel disposed on an upper surface of the watertight body. The remote controller includes at least one magnet affixed to the thumbwheel such that the at least one magnet rotates with the thumbwheel. The remote controller includes a magnetic sensor configured to produce magnetic field data in at least two axes. The remote controller includes a processor operably coupled to the magnetic sensor and communication circuitry configured to communicate control signals to an associated personal watercraft. The processor is configured to determine an angular position of the thumbwheel based at least in part on the magnetic field data in each of the at least two axes and to generate a control signal based
(Continued)

at least in part on the determined position of the thumbwheel.

26 Claims, 35 Drawing Sheets

Related U.S. Application Data

(60) Provisional application No. 63/079,769, filed on Sep. 17, 2020, provisional application No. 63/014,014, filed on Apr. 22, 2020.

(51) Int. Cl.
  *B63B 32/66* (2020.01)
  *B63H 21/17* (2006.01)
  *B63H 21/21* (2006.01)
  *B63H 25/02* (2006.01)

(52) U.S. Cl.
  CPC ..... *G05D 1/0206* (2013.01); *B63H 2021/216* (2013.01); *B63H 2025/028* (2013.01)

(56) References Cited

U.S. PATENT DOCUMENTS

| | | | |
|---|---|---|---|
| 3,498,131 A | 3/1970 | Rickey | |
| 3,515,000 A | 6/1970 | Joseph | |
| 3,584,643 A | 6/1971 | Burke | |
| 3,593,050 A | 7/1971 | Ware | |
| 3,704,442 A | 11/1972 | Wright | |
| 3,804,048 A | 4/1974 | Cline | |
| 3,886,884 A | 6/1975 | Stark | |
| 3,902,444 A | 9/1975 | Stark | |
| 4,056,074 A | 11/1977 | Sachs | |
| 4,145,927 A | 3/1979 | Larson | |
| 4,178,871 A | 12/1979 | Hirsch | |
| 4,382,382 A | 5/1983 | Wang | |
| 4,517,912 A | 5/1985 | Jones | |
| 4,676,101 A | 6/1987 | Baughman | |
| 5,042,299 A | 8/1991 | Wells | |
| 5,049,878 A | 9/1991 | Stern | |
| 5,062,378 A | 11/1991 | Bateman | |
| 5,178,089 A | 1/1993 | Hodel | |
| 5,226,313 A | 7/1993 | Murata | |
| 5,309,859 A | 5/1994 | Miller | |
| 5,429,562 A | 7/1995 | Milner | |
| 5,544,607 A | 8/1996 | Rorabaugh | |
| 5,573,088 A | 11/1996 | Daniels | |
| 5,719,556 A | 2/1998 | Albin | |
| 5,726,578 A | 3/1998 | Hook | |
| 5,735,167 A | 4/1998 | Puukangas | |
| 5,749,018 A | 5/1998 | Wess | |
| 5,809,926 A | 9/1998 | Kelsey | |
| 5,848,922 A | 12/1998 | Itima | |
| 6,095,076 A | 8/2000 | Nesbitt | |
| 6,142,840 A | 11/2000 | Efthymiou | |
| 6,178,905 B1 | 1/2001 | Dynes | |
| 6,183,333 B1 | 2/2001 | Hall | |
| 6,192,817 B1 | 2/2001 | Dec | |
| 6,302,230 B1 | 10/2001 | Kamen | |
| 6,311,631 B1 | 11/2001 | Beecher | |
| 6,355,374 B1 * | 3/2002 | Wirsching | H04M 1/0262 429/96 |
| 6,371,726 B1 | 4/2002 | Jonsson | |
| 6,409,560 B1 | 6/2002 | Austin | |
| 6,475,045 B2 | 11/2002 | Schultz | |
| 6,568,340 B2 | 5/2003 | Dec | |
| 6,578,506 B2 | 6/2003 | Bieker | |
| 6,591,776 B2 | 7/2003 | Miyazaki | |
| 6,651,763 B1 | 11/2003 | Kamen | |
| 6,702,634 B2 | 3/2004 | Jung | |
| 6,743,064 B2 | 6/2004 | Gieseke | |
| 6,855,016 B1 | 2/2005 | Jansen | |
| 6,901,872 B1 | 6/2005 | Battle | |
| 6,902,446 B1 | 6/2005 | Healey | |
| 6,962,079 B2 | 11/2005 | Eguchi | |
| 6,966,808 B1 | 11/2005 | Liao | |
| 7,047,901 B2 | 5/2006 | Chen | |
| 7,089,875 B2 | 8/2006 | Kurze | |
| 7,097,523 B2 | 8/2006 | Woolley | |
| 7,138,774 B2 | 11/2006 | Negoro | |
| 7,143,710 B2 | 12/2006 | Lang | |
| 7,166,005 B2 | 1/2007 | Tirloni | |
| 7,182,036 B2 | 2/2007 | Levine | |
| 7,182,037 B2 | 2/2007 | Otobe | |
| 7,226,329 B2 | 6/2007 | Railey | |
| 7,243,607 B2 | 7/2007 | Chesney | |
| 7,275,493 B1 | 10/2007 | Brass | |
| 7,275,607 B2 | 10/2007 | Kamen | |
| 7,298,056 B2 | 11/2007 | Gizara | |
| 7,506,600 B2 | 3/2009 | Furuya | |
| 7,601,041 B2 | 10/2009 | McCarthy | |
| 7,731,555 B2 | 6/2010 | Railey | |
| 7,980,191 B2 | 7/2011 | Murphy | |
| 7,993,178 B2 | 8/2011 | Railey | |
| 8,043,135 B1 | 10/2011 | Corn | |
| 8,070,544 B2 | 12/2011 | Roman | |
| 8,123,578 B2 | 2/2012 | Mewis | |
| 8,166,905 B2 | 5/2012 | Gratsch | |
| 8,262,425 B1 | 9/2012 | Jones | |
| 8,290,636 B2 | 10/2012 | Manning | |
| 8,312,831 B2 | 11/2012 | Templeman | |
| 8,398,446 B2 | 3/2013 | Railey | |
| 8,456,310 B2 | 6/2013 | Becker | |
| 8,616,313 B2 | 12/2013 | Simeray | |
| 8,636,552 B2 | 1/2014 | Braden | |
| 8,702,458 B2 | 4/2014 | Preston | |
| 8,807,250 B2 | 8/2014 | Chen | |
| 8,851,947 B2 | 10/2014 | Vlock | |
| 8,863,681 B2 | 10/2014 | Howes | |
| 8,870,614 B2 | 10/2014 | Railey | |
| 8,951,079 B2 | 2/2015 | Railey | |
| 9,051,038 B1 | 6/2015 | Herber | |
| 9,056,654 B1 | 6/2015 | Fraser | |
| 9,101,817 B2 | 8/2015 | Doerksen | |
| 9,120,547 B2 | 9/2015 | Vlock | |
| 9,162,741 B2 | 10/2015 | Benjamin | |
| 9,359,044 B2 | 6/2016 | Langelaan | |
| 9,475,559 B2 | 10/2016 | Czarnowski | |
| 9,573,656 B2 | 2/2017 | Templeman | |
| 9,586,659 B2 | 3/2017 | Langelaan | |
| 9,618,528 B2 * | 4/2017 | Lesikar | G01P 3/488 |
| 9,643,694 B2 | 5/2017 | Geislinger | |
| 9,645,138 B2 | 5/2017 | Hamm | |
| 9,669,902 B2 | 6/2017 | Geislinger | |
| 9,701,372 B2 | 7/2017 | Railey | |
| 9,718,521 B2 | 8/2017 | Derrah | |
| 9,718,528 B2 | 8/2017 | Railey | |
| 9,758,962 B2 | 9/2017 | Geislinger | |
| 9,789,935 B1 | 10/2017 | Aguera | |
| 9,789,943 B2 | 10/2017 | Lehmann | |
| 9,835,224 B2 | 12/2017 | Geislinger | |
| 9,845,138 B2 | 12/2017 | Benjamin | |
| 9,891,620 B2 | 2/2018 | Green | |
| 9,919,784 B1 | 3/2018 | Fisher | |
| 10,029,775 B2 | 7/2018 | Nikmanesh | |
| 10,054,443 B1 * | 8/2018 | Patel | G06F 21/88 |
| 10,082,788 B1 * | 9/2018 | Dengel | B63H 25/02 |
| 10,099,754 B2 | 10/2018 | Tian | |
| 10,110,046 B1 * | 10/2018 | Esquibel | H04B 5/79 |
| D843,303 S | 3/2019 | Leason | |
| 10,227,120 B2 | 3/2019 | Ajello | |
| 10,235,870 B2 | 3/2019 | Leason | |
| 10,266,239 B2 | 4/2019 | Fry | |
| 10,279,873 B2 | 5/2019 | Logosz | |
| D852,112 S | 6/2019 | Leason | |
| 10,308,336 B1 | 6/2019 | Vermeulen | |
| D853,310 S | 7/2019 | Leason | |
| 10,358,194 B1 | 7/2019 | Wengreen | |
| D857,606 S | 8/2019 | Dane | |
| 10,456,658 B1 | 10/2019 | Doerksen | |
| D866,872 S | 11/2019 | Liu | |
| 10,486,771 B2 | 11/2019 | Tian | |

(56) References Cited

U.S. PATENT DOCUMENTS

| | | |
|---|---|---|
| 10,526,057 B2 | 1/2020 | Kohnsen |
| 10,532,797 B2 | 1/2020 | Derrah |
| 10,597,118 B2 | 3/2020 | Montague |
| 10,597,123 B2 | 3/2020 | Bell |
| D882,010 S | 4/2020 | Vermillion |
| 10,611,261 B2 | 4/2020 | Pang |
| 10,618,621 B1 | 4/2020 | Rott |
| 10,625,834 B2 | 4/2020 | Macfarlane |
| D883,177 S | 5/2020 | Leason |
| 10,647,387 B2 | 5/2020 | Dombois |
| 10,647,392 B2 | 5/2020 | Trewern |
| 10,668,987 B1 | 6/2020 | Murphy |
| 10,668,994 B2 | 6/2020 | Frank |
| 10,683,075 B2 | 6/2020 | Schibli |
| 10,759,503 B2 | 9/2020 | Aguera |
| 10,780,928 B2 | 9/2020 | Pang |
| 10,946,939 B1 | 3/2021 | Montague et al. |
| 10,988,032 B2 | 4/2021 | Pang |
| 11,273,364 B1 | 3/2022 | Doerksen |
| 11,703,866 B2 | 7/2023 | Snyder |
| 2001/0042498 A1 | 11/2001 | Burnham |
| 2002/0072285 A1 | 6/2002 | Jung |
| 2002/0088387 A1 | 7/2002 | Motsenbocker |
| 2002/0090866 A1 | 7/2002 | Hoshina |
| 2003/0019316 A1* | 1/2003 | Tews ............... G05G 9/047 74/471 XY |
| 2003/0033968 A1 | 2/2003 | Thomson |
| 2003/0089293 A1 | 5/2003 | Vos |
| 2003/0167991 A1 | 9/2003 | Namanny |
| 2004/0139905 A1 | 7/2004 | Chen |
| 2005/0266746 A1 | 12/2005 | Murphy |
| 2006/0249513 A1 | 11/2006 | Duke |
| 2007/0180904 A1 | 8/2007 | Gao |
| 2008/0041294 A1 | 2/2008 | Diorio |
| 2008/0168937 A1 | 7/2008 | Ruan |
| 2008/0243321 A1 | 10/2008 | Walser |
| 2008/0268730 A1 | 10/2008 | Heesterman |
| 2009/0023478 A1* | 1/2009 | Lowles ............... G06F 3/016 455/566 |
| 2010/0154534 A1 | 6/2010 | Hampton |
| 2011/0014829 A1 | 1/2011 | Burke |
| 2011/0056423 A1 | 3/2011 | Railey |
| 2011/0201238 A1 | 8/2011 | Rott |
| 2011/0256518 A1 | 10/2011 | Rott |
| 2012/0000409 A1 | 1/2012 | Railey |
| 2012/0126972 A1 | 5/2012 | Rott |
| 2013/0029547 A1 | 1/2013 | Suzuki |
| 2013/0157526 A1 | 6/2013 | Martin |
| 2013/0293179 A1* | 11/2013 | Lee ............... H02P 25/034 318/647 |
| 2014/0053764 A1 | 2/2014 | Ruan |
| 2014/0141891 A1* | 5/2014 | Georgy ............... A63F 13/24 463/47 |
| 2014/0232379 A1* | 8/2014 | Nazarian ............... G01D 5/147 324/207.21 |
| 2015/0064995 A1 | 3/2015 | Woods |
| 2015/0104985 A1 | 4/2015 | Langelaan |
| 2015/0118923 A1 | 4/2015 | Köhnsen |
| 2016/0077543 A1* | 3/2016 | Conro ............... G05G 9/047 74/471 XY |
| 2016/0185430 A1 | 6/2016 | Langelaan |
| 2016/0207601 A1 | 7/2016 | Köhnsen |
| 2017/0043844 A1 | 2/2017 | Chapman |
| 2017/0215033 A1* | 7/2017 | Piraino ............... H04W 4/029 |
| 2017/0322585 A1* | 11/2017 | Tomita ............... G05B 19/4184 |
| 2017/0368413 A1 | 12/2017 | Shavit |
| 2018/0043975 A1* | 2/2018 | Tan ............... B63B 79/40 |
| 2018/0072383 A1 | 3/2018 | Montague |
| 2018/0099730 A1 | 4/2018 | Riegerbauer |
| 2018/0118311 A1 | 5/2018 | Köhnsen |
| 2018/0128882 A1* | 5/2018 | Yoshiya ............. G01R 33/0035 |
| 2018/0170493 A1 | 6/2018 | Terada |
| 2018/0181161 A1 | 6/2018 | Long |
| 2018/0210485 A1* | 7/2018 | Liang ............... G05G 1/06 |
| 2018/0335780 A1 | 11/2018 | Stevens |
| 2018/0361870 A1 | 12/2018 | Zhao |
| 2018/0370600 A1 | 12/2018 | Geislinger |
| 2019/0041891 A1 | 2/2019 | Parazynski |
| 2019/0061557 A1 | 2/2019 | Quick |
| 2019/0061880 A1 | 2/2019 | Bousquet |
| 2019/0106190 A1 | 4/2019 | Schibli |
| 2019/0161148 A1 | 5/2019 | Trewern |
| 2019/0168850 A1 | 6/2019 | Tian |
| 2019/0168851 A1 | 6/2019 | Tian |
| 2019/0173138 A1 | 6/2019 | Tian |
| 2019/0233063 A1 | 8/2019 | Geislinger |
| 2019/0233076 A1 | 8/2019 | Aldama |
| 2019/0344662 A1 | 11/2019 | Warren |
| 2019/0344862 A1 | 11/2019 | Tian |
| 2019/0389551 A1 | 12/2019 | Aoki |
| 2020/0018969 A1 | 1/2020 | Ou |
| 2020/0047849 A1 | 2/2020 | Claughton |
| 2020/0079479 A1 | 3/2020 | Derrah |
| 2020/0102052 A1 | 4/2020 | Geislinger |
| 2020/0140042 A1 | 5/2020 | Kohnsen |
| 2020/0148063 A1 | 5/2020 | Dastoor |
| 2020/0172206 A1 | 6/2020 | Terada |
| 2020/0172207 A1 | 6/2020 | Wengreen |
| 2020/0172213 A1 | 6/2020 | Rodriguez Rondon |
| 2020/0231264 A1 | 7/2020 | Imai |
| 2020/0283102 A1 | 9/2020 | Lind |
| 2020/0391831 A1 | 12/2020 | Jensen |
| 2021/0107601 A1 | 4/2021 | Trewern |
| 2021/0336461 A1 | 10/2021 | Luthman |
| 2022/0063786 A1 | 3/2022 | Montague |
| 2022/0274674 A1 | 9/2022 | Peter |
| 2023/0043812 A1 | 2/2023 | Yanai |
| 2023/0249788 A1 | 8/2023 | Inoue |
| 2024/0059375 A1 | 2/2024 | Werner |
| 2024/0181825 A1 | 6/2024 | Rocha |

FOREIGN PATENT DOCUMENTS

| | | |
|---|---|---|
| AU | 200150121 A1 | 12/2002 |
| AU | 2004100571 A4 | 8/2004 |
| AU | 2004215331 A1 | 9/2004 |
| AU | 2007100530 A4 | 9/2007 |
| AU | 2007202451 A9 | 8/2008 |
| AU | 2007202855 A1 | 1/2009 |
| AU | 2011203287 A1 | 1/2012 |
| AU | 2010312322 A1 | 4/2012 |
| AU | 2013100044 A4 | 2/2013 |
| AU | 2013290356 A1 | 2/2015 |
| AU | 2013290356 B2 | 3/2017 |
| AU | 2018203516 A1 | 1/2019 |
| AU | 2018390893 A1 | 7/2020 |
| BR | 8201283 U | 3/2004 |
| BR | 102013022366 A2 | 8/2015 |
| CN | 2675546 Y | 2/2005 |
| CN | 2875944 Y | 3/2007 |
| CN | 101012003 A | 8/2007 |
| CN | 201012743 Y | 1/2008 |
| CN | 201012744 Y | 1/2008 |
| CN | 201023637 Y | 2/2008 |
| CN | 201086813 Y | 7/2008 |
| CN | 101300971 Y | 11/2008 |
| CN | 201220740 Y | 4/2009 |
| CN | 201291996 Y | 8/2009 |
| CN | 201300970 Y | 9/2009 |
| CN | 201300971 Y | 9/2009 |
| CN | 201329950 Y | 10/2009 |
| CN | 201331716 Y | 10/2009 |
| CN | 201347194 Y | 11/2009 |
| CN | 201390374 Y | 1/2010 |
| CN | 201406017 Y | 2/2010 |
| CN | 201406019 Y | 2/2010 |
| CN | 201406020 Y | 2/2010 |
| CN | 201407093 Y | 2/2010 |
| CN | 201407094 Y | 2/2010 |
| CN | 201415754 Y | 3/2010 |
| CN | 201437400 U | 4/2010 |
| CN | 201447051 U | 5/2010 |
| CN | 101734354 A | 6/2010 |

(56) References Cited

FOREIGN PATENT DOCUMENTS

| | | | |
|---|---|---|---|
| CN | 101734355 A | 6/2010 |
| CN | 101734356 A | 6/2010 |
| CN | 101746490 A | 6/2010 |
| CN | 101870343 A | 10/2010 |
| CN | 101870344 A | 10/2010 |
| CN | 101870346 A | 10/2010 |
| CN | 101871382 A | 10/2010 |
| CN | 101927817 A | 12/2010 |
| CN | 201914426 U | 8/2011 |
| CN | 202264871 U | 6/2012 |
| CN | 202574577 U | 12/2012 |
| CN | 202574578 U | 12/2012 |
| CN | 101875396 B | 9/2013 |
| CN | 103373451 A | 10/2013 |
| CN | 103373453 A | 10/2013 |
| CN | 103419908 A | 12/2013 |
| CN | 203381780 U | 1/2014 |
| CN | 203567910 U | 4/2014 |
| CN | 203593146 U | 5/2014 |
| CN | 101879934 B | 9/2014 |
| CN | 104229063 A | 12/2014 |
| CN | 104229088 A | 12/2014 |
| CN | 204056245 U | 12/2014 |
| CN | 104260845 A | 1/2015 |
| CN | 104260869 A | 1/2015 |
| CN | 104295419 A | 1/2015 |
| CN | 204124333 U | 1/2015 |
| CN | 204197224 U | 3/2015 |
| CN | 204197225 U | 3/2015 |
| CN | 204197244 U | 3/2015 |
| CN | 204197245 U | 3/2015 |
| CN | 204197246 U | 3/2015 |
| CN | 204197248 U | 3/2015 |
| CN | 204197257 U | 3/2015 |
| CN | 204197259 U | 3/2015 |
| CN | 204197260 U | 3/2015 |
| CN | 204197261 U | 3/2015 |
| CN | 204200363 U | 3/2015 |
| CN | 204200365 U | 3/2015 |
| CN | 204200366 U | 3/2015 |
| CN | 204200367 U | 3/2015 |
| CN | 204200423 U | 3/2015 |
| CN | 204200424 U | 3/2015 |
| CN | 204200433 U | 3/2015 |
| CN | 204200443 U | 3/2015 |
| CN | 204436577 U | 7/2015 |
| CN | 204659986 U | 9/2015 |
| CN | 103661833 B | 3/2016 |
| CN | 205131588 U | 4/2016 |
| CN | 105691563 A | 6/2016 |
| CN | 205418042 U | 8/2016 |
| CN | 205469703 U | 8/2016 |
| CN | 205469704 U | 8/2016 |
| CN | 104309792 B | 9/2016 |
| CN | 105947135 A | 9/2016 |
| CN | 105966562 A | 9/2016 |
| CN | 105966563 A | 9/2016 |
| CN | 105966564 A | 9/2016 |
| CN | 105966565 A | 9/2016 |
| CN | 106005300 A | 10/2016 |
| CN | 106054707 A | 10/2016 |
| CN | 205632952 U | 10/2016 |
| CN | 106081001 A | 11/2016 |
| CN | 205675195 U | 11/2016 |
| CN | 206054103 U | 3/2017 |
| CN | 104228695 B | 4/2017 |
| CN | 206087218 U | 4/2017 |
| CN | 106846757 A | 6/2017 |
| CN | 206297715 U | 7/2017 |
| CN | 206317993 U | 7/2017 |
| CN | 206446772 U | 8/2017 |
| CN | 206466156 U | 9/2017 |
| CN | 206466161 U | 9/2017 |
| CN | 206466166 U | 9/2017 |
| CN | 206466174 U | 9/2017 |
| CN | 206466180 U | 9/2017 |
| CN | 206466191 U | 9/2017 |
| CN | 206471439 U | 9/2017 |
| CN | 206471884 U | 9/2017 |
| CN | 206606355 U | 11/2017 |
| CN | 105923116 B | 1/2018 |
| CN | 107628209 A | 1/2018 |
| CN | 206914584 U | 1/2018 |
| CN | 206984297 U | 2/2018 |
| CN | 207010363 U | 2/2018 |
| CN | 107776839 A | 3/2018 |
| CN | 207129115 U | 3/2018 |
| CN | 107953977 A | 4/2018 |
| CN | 207257921 U | 4/2018 |
| CN | 207389479 U | 5/2018 |
| CN | 207389513 U | 5/2018 |
| CN | 108189978 A | 6/2018 |
| CN | 207450184 U | 6/2018 |
| CN | 207496901 U | 6/2018 |
| CN | 207496902 U | 6/2018 |
| CN | 207510694 U | 6/2018 |
| CN | 207550443 U | 6/2018 |
| CN | 207550444 U | 6/2018 |
| CN | 207670628 U | 7/2018 |
| CN | 108357650 A | 8/2018 |
| CN | 207683736 U | 8/2018 |
| CN | 207683737 U | 8/2018 |
| CN | 104260846 B | 9/2018 |
| CN | 108482604 A | 9/2018 |
| CN | 108583797 A | 9/2018 |
| CN | 207851575 U | 9/2018 |
| CN | 108609124 A | 10/2018 |
| CN | 108725709 A | 11/2018 |
| CN | 108909963 A | 11/2018 |
| CN | 208134578 U | 11/2018 |
| CN | 208165225 U | 11/2018 |
| CN | 108945331 A | 12/2018 |
| CN | 108974272 A | 12/2018 |
| CN | 108974298 A | 12/2018 |
| CN | 208291439 U | 12/2018 |
| CN | 109131766 A | 1/2019 |
| CN | 109263823 A | 1/2019 |
| CN | 208344507 U | 1/2019 |
| CN | 208407991 B | 1/2019 |
| CN | 109334888 A | 2/2019 |
| CN | 109334889 A | 2/2019 |
| CN | 109334890 A | 2/2019 |
| CN | 208498755 U | 2/2019 |
| CN | 107215436 B | 3/2019 |
| CN | 208616170 U | 3/2019 |
| CN | 208630821 U | 3/2019 |
| CN | 109572954 A | 4/2019 |
| CN | 109625200 A | 4/2019 |
| CN | 208715417 U | 4/2019 |
| CN | 208715431 U | 4/2019 |
| CN | 208715437 U | 4/2019 |
| CN | 208715455 U | 4/2019 |
| CN | 208760858 U | 4/2019 |
| CN | 208760859 U | 4/2019 |
| CN | 208760860 U | 4/2019 |
| CN | 208760861 U | 4/2019 |
| CN | 208760862 U | 4/2019 |
| CN | 208781922 U | 4/2019 |
| CN | 208789898 U | 4/2019 |
| CN | 109774891 A | 5/2019 |
| CN | 109795610 A | 5/2019 |
| CN | 208855842 U | 5/2019 |
| CN | 208915389 U | 5/2019 |
| CN | 109850090 A | 6/2019 |
| CN | 109895964 A | 6/2019 |
| CN | 208931601 U | 6/2019 |
| CN | 208931604 U | 6/2019 |
| CN | 208931605 U | 6/2019 |
| CN | 208931617 U | 6/2019 |
| CN | 209000208 U | 6/2019 |
| CN | 110039578 A | 7/2019 |
| CN | 209159955 U | 7/2019 |
| CN | 209176872 U | 7/2019 |
| CN | 110085788 A | 8/2019 |

(56) References Cited

FOREIGN PATENT DOCUMENTS

| | | |
|---|---|---|
| CN | 110171092 A | 8/2019 |
| CN | 110182331 A | 8/2019 |
| CN | 209253549 U | 8/2019 |
| CN | 209258326 U | 8/2019 |
| CN | 209258351 U | 8/2019 |
| CN | 209258352 U | 8/2019 |
| CN | 209280091 | 8/2019 |
| CN | 209290629 U | 8/2019 |
| CN | 107128454 B | 9/2019 |
| CN | 107933845 B | 9/2019 |
| CN | 110239687 A | 9/2019 |
| CN | 209366402 U | 9/2019 |
| CN | 209366403 U | 9/2019 |
| CN | 209366404 U | 9/2019 |
| CN | 209366405 U | 9/2019 |
| CN | 209366406 U | 9/2019 |
| CN | 209366407 U | 9/2019 |
| CN | 209366408 U | 9/2019 |
| CN | 209369930 U | 9/2019 |
| CN | 209385232 U | 9/2019 |
| CN | 209441573 U | 9/2019 |
| CN | 110350341 A | 10/2019 |
| CN | 110356524 A | 10/2019 |
| CN | 110362080 A | 10/2019 |
| CN | 209454955 U | 10/2019 |
| CN | 209479921 U | 10/2019 |
| CN | 110406642 A | 11/2019 |
| CN | 110481728 A | 11/2019 |
| CN | 209581796 U | 11/2019 |
| CN | 209581797 U | 11/2019 |
| CN | 209581798 U | 11/2019 |
| CN | 209600753 U | 11/2019 |
| CN | 110562408 A | 12/2019 |
| CN | 209739293 U | 12/2019 |
| CN | 209766523 U | 12/2019 |
| CN | 209833934 U | 12/2019 |
| CN | 209833939 U | 12/2019 |
| CN | 108407991 B | 1/2020 |
| CN | 110683005 A | 1/2020 |
| CN | 209913096 U | 1/2020 |
| CN | 209921564 U | 1/2020 |
| CN | 209921565 U | 1/2020 |
| CN | 209938884 U | 1/2020 |
| CN | 110816758 A | 2/2020 |
| CN | 110844006 A | 2/2020 |
| CN | 210068712 U | 2/2020 |
| CN | 110911888 A | 3/2020 |
| CN | 110920812 A | 3/2020 |
| CN | 110920813 A | 3/2020 |
| CN | 110920847 A | 3/2020 |
| CN | 210149516 U | 3/2020 |
| CN | 210149517 U | 3/2020 |
| CN | 210212690 U | 3/2020 |
| CN | 210212691 U | 3/2020 |
| CN | 110949620 A | 4/2020 |
| CN | 210310790 U | 4/2020 |
| CN | 210364284 U | 4/2020 |
| CN | 210364287 U | 4/2020 |
| CN | 210478964 U | 5/2020 |
| CN | 210478965 U | 5/2020 |
| CN | 210478967 U | 5/2020 |
| CN | 210503084 U | 5/2020 |
| CN | 210526789 U | 5/2020 |
| CN | 110901869 B | 6/2020 |
| CN | 111268038 A | 6/2020 |
| CN | 111284636 A | 6/2020 |
| CN | 210806779 U | 6/2020 |
| CN | 210852818 U | 6/2020 |
| CN | 210971446 U | 7/2020 |
| CN | 211018557 U | 7/2020 |
| CN | 211126279 U | 7/2020 |
| CN | 211139588 U | 7/2020 |
| CN | 211336359 U | 8/2020 |
| CN | 211364859 U | 8/2020 |
| CN | 109795610 B | 11/2020 |
| DE | 3634775 | 4/1988 |
| DE | 10103126 | 9/2002 |
| DE | 202006000210 U1 | 3/2006 |
| DE | 202007003106 U1 | 7/2007 |
| DE | 202010000559 U1 | 6/2010 |
| DE | 102010032014 A1 | 1/2012 |
| DE | 202013007100 U1 | 9/2013 |
| DE | 202014006552 U1 | 11/2014 |
| DE | 102014005314 A1 | 10/2015 |
| DE | 202017103703 U1 | 7/2017 |
| DE | 202017107819 U1 | 1/2018 |
| DE | 202017107820 U1 | 1/2018 |
| DE | 202017107821 U1 | 1/2018 |
| DE | 202017107824 U1 | 1/2018 |
| DE | 202017107826 U1 | 1/2018 |
| DE | 102018113137 A1 | 2/2019 |
| DE | 102017130946 A1 | 6/2019 |
| DE | 102017130949 A1 | 6/2019 |
| DE | 102017130955 A1 | 6/2019 |
| DE | 102017130959 A1 | 6/2019 |
| DE | 102017130963 A1 | 6/2019 |
| DE | 102017130966 A1 | 6/2019 |
| DE | 102018100696 A1 | 6/2019 |
| DE | 102018129501 A1 | 9/2019 |
| DE | 202019103496 U1 | 9/2019 |
| DE | 202018104741 U1 | 11/2019 |
| DE | 102018215176 A1 | 3/2020 |
| DE | 102018127650 A1 | 5/2020 |
| EP | 3041735 A1 | 7/2016 |
| EP | 1955025 B1 | 3/2017 |
| EP | 3526112 A1 | 8/2019 |
| EP | 3526113 A1 | 8/2019 |
| EP | 3529142 A1 | 8/2019 |
| EP | 3529143 A1 | 8/2019 |
| EP | 3552947 A1 | 10/2019 |
| EP | 3277574 B1 | 11/2019 |
| EP | 3640882 A1 | 4/2020 |
| EP | 3747754 | 12/2020 |
| ES | 1153639 Y | 7/2016 |
| FR | 3078680 B1 | 5/2020 |
| GB | 2132773 | 7/1984 |
| GB | 2580022 A | 7/2020 |
| HK | 1250973 A1 | 1/2019 |
| IN | 200701396 I2 | 7/2008 |
| JP | 2002154479 A | 5/2002 |
| JP | 2002193185 A | 7/2002 |
| JP | 2008189169 A | 8/2008 |
| JP | 2008230315 A | 10/2008 |
| JP | 2009018702 A | 1/2009 |
| JP | 2010173405 A | 8/2010 |
| JP | 3163820 U | 11/2010 |
| JP | 4640760 B2 | 3/2011 |
| JP | 3183445 U | 5/2013 |
| JP | 5221737 B2 | 6/2013 |
| JP | 2014043150 A | 3/2014 |
| JP | 5791376 B2 | 10/2015 |
| JP | 2015177735 | 10/2015 |
| JP | 2020111331 A | 7/2020 |
| KR | 100560702 B1 | 3/2006 |
| KR | 100572804 B1 | 4/2006 |
| KR | 100581491 B1 | 5/2006 |
| KR | 20090006619 A | 1/2009 |
| KR | 20090098306 A | 9/2009 |
| KR | 20100010874 U | 11/2010 |
| KR | 101024595 B1 | 3/2011 |
| KR | 200454353 Y1 | 6/2011 |
| KR | 101491661 B1 | 2/2015 |
| KR | 20160027555 A | 3/2016 |
| KR | 20160057060 A | 5/2016 |
| KR | 101697338 B1 | 1/2017 |
| KR | 101713936 B1 | 3/2017 |
| KR | 101767476 B1 | 8/2017 |
| KR | 20170090702 A | 8/2017 |
| KR | 101857099 B1 | 5/2018 |
| KR | 20190063727 A | 6/2019 |
| KR | 101978043 B1 | 8/2019 |
| KR | 102052195 B1 | 12/2019 |
| KR | 102050718 B1 | 1/2020 |
| KR | 200490972 | 1/2020 |

(56) References Cited

FOREIGN PATENT DOCUMENTS

| | | |
|---|---|---|
| KR | 102095292 B1 | 3/2020 |
| KR | 102095294 B1 | 3/2020 |
| KR | 102103228 B1 | 4/2020 |
| KR | 102103229 B1 | 4/2020 |
| KR | 102116532 B1 | 6/2020 |
| KR | 102133778 B1 | 7/2020 |
| NO | 20181547 A1 | 6/2020 |
| PL | 3277574 T3 | 6/2020 |
| TW | M257328 U | 2/2005 |
| TW | M308901 U | 4/2007 |
| TW | 200848320 A | 12/2008 |
| TW | 201000361 A | 1/2010 |
| TW | 1334793 B | 12/2010 |
| TW | I334793 B | 12/2010 |
| TW | M461592 U | 9/2013 |
| TW | 1605324 B | 11/2017 |
| TW | I605324 B | 11/2017 |
| TW | 201743153 A | 12/2017 |
| TW | M552465 U | 12/2017 |
| WO | 2002092420 A1 | 11/2002 |
| WO | 2005058685 A1 | 6/2005 |
| WO | 2006014085 A1 | 2/2006 |
| WO | 2006042359 A1 | 4/2006 |
| WO | 2007072185 A2 | 6/2007 |
| WO | 2008022863 | 2/2008 |
| WO | 2009144400 A2 | 12/2009 |
| WO | 2011047431 A1 | 4/2011 |
| WO | 2011049470 | 4/2011 |
| WO | 2012013770 A2 | 2/2012 |
| WO | 2013026714 A1 | 2/2013 |
| WO | 2015033032 | 3/2015 |
| WO | 2015039970 A1 | 3/2015 |
| WO | 2016003121 A1 | 1/2016 |
| WO | 2017069322 A1 | 4/2017 |
| WO | 2017153338 A1 | 9/2017 |
| WO | 2017221233 A1 | 12/2017 |
| WO | 2018149044 A1 | 8/2018 |
| WO | 2018234969 A1 | 12/2018 |
| WO | 2019072196 A1 | 4/2019 |
| WO | 2019073126 A1 | 4/2019 |
| WO | 2019122087 A1 | 6/2019 |
| WO | 2019122091 A1 | 6/2019 |
| WO | 2019122098 A1 | 6/2019 |
| WO | 2019122176 A1 | 6/2019 |
| WO | 2019122185 A1 | 6/2019 |
| WO | 2019122225 A1 | 6/2019 |
| WO | 2019122321 A1 | 6/2019 |
| WO | 2019129687 A1 | 7/2019 |
| WO | 2019141799 A1 | 7/2019 |
| WO | 2019143276 A1 | 7/2019 |
| WO | 2019183668 A1 | 10/2019 |
| WO | 2019203135 A1 | 10/2019 |
| WO | 2019222119 A1 | 11/2019 |
| WO | 2020042299 A1 | 3/2020 |
| WO | 2020042300 A1 | 3/2020 |
| WO | 2020042301 A1 | 3/2020 |
| WO | 2020042302 A1 | 3/2020 |
| WO | 2020056822 A1 | 3/2020 |
| WO | 2020056823 A1 | 3/2020 |
| WO | 20181547 A1 | 6/2020 |
| WO | 2020107665 A1 | 6/2020 |
| WO | 2020113768 A1 | 6/2020 |
| WO | 2020176033 A1 | 9/2020 |
| WO | 2021191729 | 9/2021 |
| WO | 2022037809 | 2/2022 |
| WO | 2022265968 | 12/2022 |

OTHER PUBLICATIONS

Ray Vellinga, "HYDROFOIL—Thrilling Swedish Invention," https://www.youtube.com/watch?=klAggNlir9A&feature=youtu.be, Oct. 27, 2011.
7M Engineering, "Assembly 1," https://vimeo.com/361237245, Sep. 20, 2019.
Asa Bonthelius, "Hoglage," BATNYTT (Sep. 2009).
European Search Report in corresponding European Patent Application EP 18163734.9, dated Sep. 19, 2018.
Evolo Final Report, Apr. 23, 2009.
International Search Report in corresponding PCT/US2018/023959 dated Jul. 3, 2018.
JetSurfing Nation jet boards & efoils, "Awake RAVIK Premium Electric Surfboard—unboxing and review PART 1," https://www.youtube.com/watch?v=i3P9NWw4fpg, Oct. 1, 2019.
Ray Vellinga, "Hydrofoil—Thrilling Swedish Invention," https://www.youtube.com/watch?V=klAggNlir9A&feature=youtu.be, Oct. 27, 2011.
Scrapheaper, "Trampofoil—the 'originals* from Sweden," https://www.youtube.com/watch?v=QQvYogFP9mw&feature=youtu.be, Aug. 15, 2010.
Autodesk Instructables, "Building an Arduino Water Level Detection Sensor," presently believed to be publicly available at least before Mar. 20, 2023, 7 pages.
Level Hydrofoils, Wayback Machine, Archive of https://www.levelfoils.com/technology , dated Sep. 29, 2022, 7 pages.
Omron, "Technical Explanation for Level Controllers," presently believed to be publicly available at least before Mar. 20, 2023, 31 pages.
Taaroa Hydrofoil, Wayback Machine, Archive of https://www.taaroa-hydrofil.com/iup-product dated Dec. 2, 2022, 5 pages.
Zapata Racing, Manuel Kit Electronique Wireless, Believed to be publicly available before Sep. 12, 2016, 37 pages.
Patent Cooperation Treaty, International Searching Authority, Notification of Transmittal of the International Search Report and the Written Opinion of the International Searching Authority, or the Declaration and the Written Opinion of the International Searching Authority issued in International Application No. PCT/US24/15128, Jul. 23, 2024, 16 pp.
Patent Cooperation Treaty, International Searching Authority, Notification of Transmittal of the International Search Report and the Written Opinion of the International Searching Authority, or the Declaration and the Written Opinion of the International Searching Authority issued in International Application No. PCT/US24/20151, Aug. 15, 2024, 25 pp.
Patent Cooperation Treaty, International Searching Authority, Notification of Transmittal of the International Search Report and the Written Opinion of the International Searching Authority, or the Declaration and the Written Opinion of the International Searching Authority issued in International Application No. PCT/US24/20180, Aug. 13, 2024, 23 pp.

* cited by examiner

WATERCRAFT DEVICE WITH A HANDHELD CONTROLLER

CROSS-REFERENCE TO RELATED APPLICATIONS

This application is a continuation-in-part of prior application Ser. No. 17/238,085 filed Apr. 22, 2021, which claims the benefit of U.S. Provisional Application No. 63/079,769 filed Sep. 17, 2020 and U.S. Provisional Application No. 63/014,014 filed Apr. 22, 2020, which are all incorporated herein by reference in their entireties.

FIELD

This disclosure relates to electrically propelled watercraft devices that include hydrofoils and, more particularly, to apparatus and methods for controlling such watercraft devices and other motor driven devices.

BACKGROUND

Some watercraft include hydrofoils that extend below a board or inflatable platform on which a user rides. One such hydrofoiling watercraft is disclosed in U.S. Pat. No. 10,940,917, which is incorporated herein by reference in its entirety. Many existing hydrofoiling watercraft include a battery in a cavity of the board, an electric motor mounted to a strut of the hydrofoil to propel the watercraft, with power wires extending within the strut between the battery and the electric motor. The hydrofoils of these electric watercraft are not easily detachable from the board due to these wires extending within the strut and into the board. Additionally, since the battery is housed within a cavity of the board, the upper end of the strut may need to form a watertight seal with the board to prevent fluid from entering the cavity of the board and damaging the battery or other electronics within the cavity of the board.

Another problem with existing watercraft having a board and an electric motor is that radio frequency signals are blocked by the board or noise from the motor causes interference with the radio frequency communications of the watercraft, for example, between the watercraft and a wireless remote controller. Another problem with existing hydrofoiling watercraft is that the ride height of the board when in the foiling mode is not accurately determined. For example, current hydrofoiling watercraft include an ultrasonic sensor mounted to the underside of the board to detect the distance between the board and the surface of the water. However, due to the waves and splashing that occurs above the surface of the water, the ride height measurements are often inaccurate.

Many existing hydrofoiling watercraft are steered by the rider shifting their weight to one side of the board or the other. As a result, riders must keep their balance while operating the hydrofoiling watercraft while shifting their weight to steer the watercraft. As a result, operating the watercraft requires skill and experience. Thus, there is a need for a hydrofoiling watercraft that may be steered or controlled by other methods to make the hydrofoiling watercraft easier to operate or ride.

Many existing hydrofoiling watercraft are controlled by remote controllers that have a trigger that the user pulls or squeezes to control the throttle. One shortcoming with such remote controllers is that users may squeeze the trigger of the remote control as they fall off the board. This provides a throttle control signal to the watercraft that causes the propeller of the watercraft to continue to drive the watercraft. For example, the watercraft may end up further away from the user when the user falls off of the watercraft.

Another shortcoming of existing remote controllers, for watercraft and other motor driven vehicles (e.g., electric skateboards), is that the remote controllers are not able to filter out stray magnetic flux and noise from external magnets (e.g., magnetic screwdriver tip, etc.). For example, many existing remote controllers include a single axis hall effect sensor that detects the magnitude of the flux from a magnet coupled to a trigger. As the trigger moves when the trigger is squeezed, the magnitude of the magnetic flux changes as the magnet of the trigger is brought in proximity to or moved away from the single axis hall effect sensor. A throttle control signal is then generated based on the magnitude of the flux detected by the single axis hall effect sensor. Such remote controllers are thus prone to generating throttle control signals in response to any magnetic flux that is detected by the hall effect sensor. As a result, these existing remote controllers undesirably send throttle control signals to the motor in response to the detection of such external magnetic flux.

SUMMARY

Generally speaking and pursuant to these various embodiments, a wireless remote controller for a personal watercraft is provided. The remote controller includes a watertight body forming a watertight compartment and a thumbwheel disposed on an upper surface of the watertight body and outside of the at least one watertight compartment. The thumbwheel is rotatable about an axis relative to the body. The thumbwheel includes at least one magnet affixed to the thumbwheel such that the at least one magnet rotates with the thumbwheel relative to the watertight body. The remote controller further includes a magnetic sensor disposed within the watertight compartment configured to produce magnetic field data in at least two axes and disposed within the watertight compartment. The remote controller includes a processor disposed within the watertight compartment and operably coupled to the magnetic sensor. The processor is configured to determine an angular position of the thumbwheel based at least in part on the magnetic field data in each of the at least two axes and to generate a control signal based at least in part on the determined position of the thumbwheel. The remote controller further includes communication circuitry operably coupled to the processor configured to communicate control signals to an associated personal watercraft.

In some examples, the processor is further configured to identify whether the magnetic field data is associated with the at least one magnet or caused by magnetic interference. The processor is configured to determine the angular position of the thumbwheel based on the magnetic field data when the magnetic field data is identified as being associated with the at least one magnet.

A method of controlling a personal watercraft is provided. The method includes collecting magnetic field data in at least two axes via a magnetic sensor disposed within a watertight compartment. The method includes determining, via a processor disposed within the watertight compartment, an angular position of a thumbwheel of a remote controller based at least in part on the magnetic field data in each of the at least two axes. The thumbwheel is disposed on an upper surface of the remote controller and outside of the watertight compartment. The thumbwheel includes at least one magnet attached to the thumbwheel. The method further includes communicating a control signal to a personal watercraft to control the operation of the personal watercraft based at least in part on the determined position of the thumbwheel.

In some examples, the determining the angular position of the thumbwheel includes identifying whether the magnetic field data is associated with the at least one magnet or caused by magnetic interference and determining the position of the thumbwheel based on the magnetic field data when the magnetic field data is identified as being associated with the at least one magnet.

DETAILED DESCRIPTION

Figure 1A:
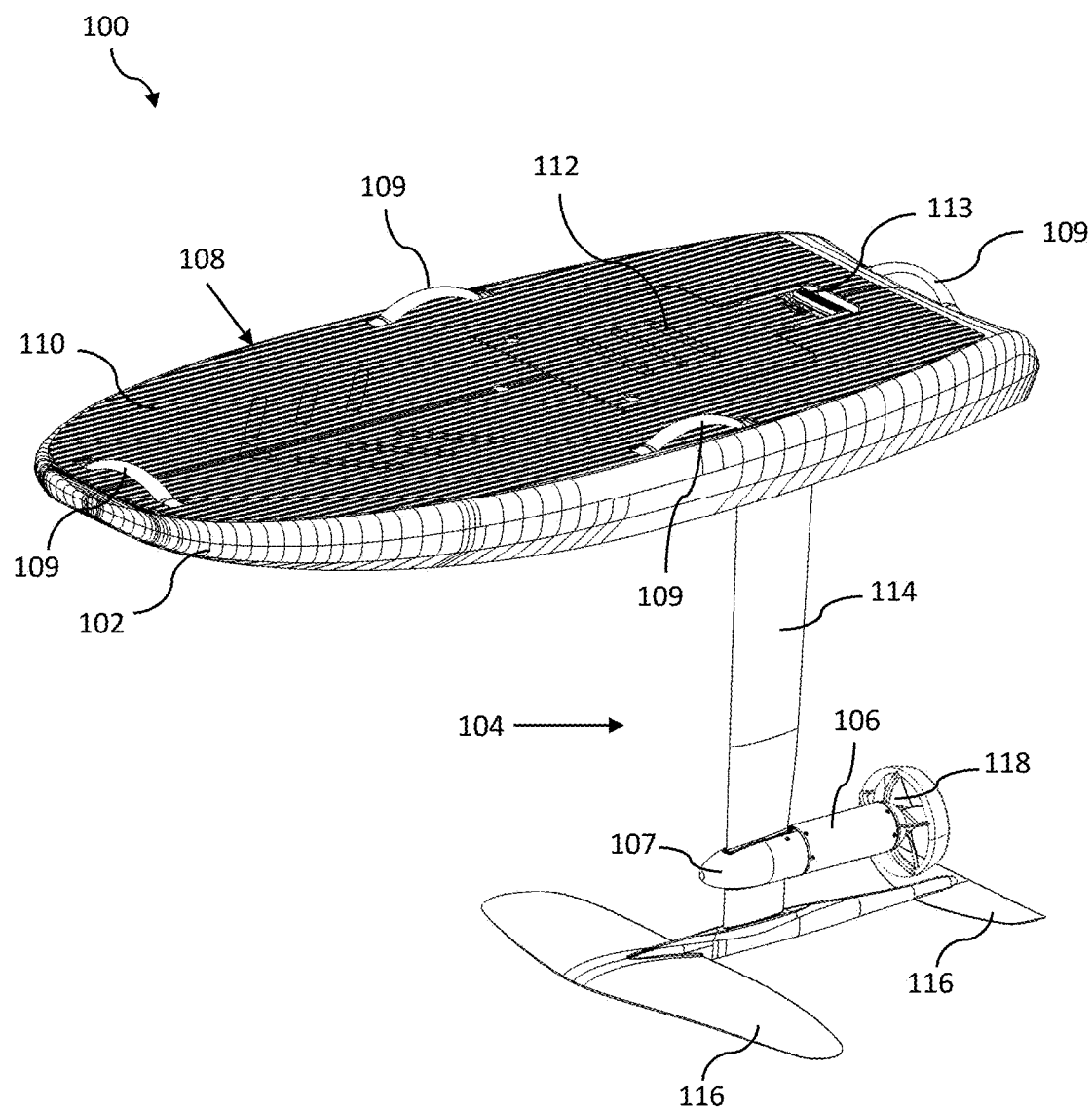
FIG. 1A is a front perspective view of a hydrofoiling watercraft having a board, a hydrofoil, and an electric propulsion system.

With reference to FIGS. 1A-E, a hydrofoiling watercraft 100 is shown having a board 102, a hydrofoil 104, and an electric propulsion unit 106 mounted to the hydrofoil 104. The board 102 may be a rigid board formed of fiberglass, carbon fiber or a combination thereof, or an inflatable board. The top surface of the board 102 forms a deck 108 on which a user or rider may lay, sit, kneel, or stand to operate the watercraft 100. The deck 108 may include a deck pad comprising a rubber layer 110 affixed to the top surface of the board 102 to provide increased friction for the rider when the rider is on the deck 108. The deck 108 may thus aid to prevent the rider from slipping on the deck 108 during operation or when the top surface 108 becomes wet. The rubber layer 110 may include ridges and grooves extending along the length of the deck 108. Water on the top surface of the board 102 may be collected or drain into the grooves of the rubber layer and flow along the grooves and off of the top surface of the board 102. The ridges of the rubber layer may support the rider. Since the water is draining off of the ridges to the grooves, the portion of the deck 108 supporting the rider (i.e., the ridges) may be less wet and thus provide increased grip over a smooth surface. Thus, the rider is less prone to slipping or sliding along the deck 108. The board 102 may further include carrying handles 109 that aid in transporting the board 102. In one embodiment, handles 109 are retractable such that the handles are drawn flush with the board 102 when not in use. The handles 109 may be extended outward when needed to transport the board 102.

The hydrofoiling watercraft 100 may further include a battery box 112 that is mounted into a cavity 113 on the top side of the board 102. The battery box 112 may house a battery for powering the watercraft 100, an intelligent power unit (IPU) that controls the power provided to the electric propulsion unit 106, communication circuitry, Global Navigation Satellite System (GNSS) circuitry, and/or a computer (e.g., processor and memory) for controlling the watercraft or processing data collected by one or more sensors of the watercraft 100. The watercraft 100 may determine the location of the watercraft at any given time using the GNSS circuitry. The communication circuitry may be configured to communicate with a wireless remote controller, such as the wireless handheld remote controllers 200 of FIGS. 6A-B.

The communication circuitry may further be configured to communicate via Bluetooth, cellular, Wi-Fi, Zigbee and the like. The IPU or computer may communicate with remote devices via the communication circuitry. For example, the communication circuitry enables the watercraft 100 to communicate with a server computer. The watercraft 100 may communicate information pertaining to the performance of the watercraft to the server computer for processing and/or storage. For example, the watercraft 100 may communicate information including the location of the watercraft, performance, operating conditions, status of the components of the watercraft, detected problems with the watercraft 100, rider information (e.g., experience level, height, weight). The watercraft may record information regarding trips taken by the watercraft 100 including the route taken, the speed of the watercraft, number of times the rider fell off, etc. In some embodiments, the watercraft 100 may be configured to automatically communicate the location of the watercraft 100 to a remote device when the battery is low or dead, or some other component of the watercraft 100 has been determined to have failed. This may alert or notify another that the rider may be stranded on the watercraft 100 and may need help returning back to shore.

The hydrofoil 104 includes a strut 114 and one or more hydrofoil wings 116. The propulsion unit 106 may be mounted to the strut 114. The propulsion unit 106 may be mounted to the strut 114 by a bracket 107 that permits the propulsion unit 106 to be mounted to or clamped onto the strut 114 at varying heights or positions along the strut. Power wires and a communication cable may extend through the strut 114 from the battery box 112 to provide power and operating instructions to the propulsion unit 106. The propulsion unit 106 may contain an electronic speed controller (ESC) and a motor. In some embodiments, the propulsion unit 106 also includes the battery and/or the IPU. The motor includes a shaft that is coupled to a propeller 118. The ESC provides power to the motor based on the control signals received from the IPU of the battery box 112 to operate the motor and cause the shaft of the motor to rotate. Rotation of the shaft turns the propeller which drives the watercraft through the water. In other forms, a waterjet may be used in place of the propeller to drive the watercraft through the water.

As the hydrofoiling watercraft 100 is driven through the water by way of the motor, the water flowing over the hydrofoil wings 116 provides lift. This causes the board 102 to rise above the surface of the water when the watercraft 100 is operated at or above certain speeds such that sufficient lift is created. While the hydrofoil wings 116 are shown mounted to the base of the strut 114, in other forms, the hydrofoil wings 116 may extend from the propulsion unit 106. The propulsion unit 106 thus may be a fuselage from which hydrofoil wings 116 extend. In some forms, the hydrofoil wings 116 are mounted above the propulsion unit 106 and closer to the board 102 than the propulsion unit 106. In some forms, the hydrofoil wings 116 and/or the propulsion unit 106 include movable control surfaces that may be adjusted to provide increased or decreased lift and/or to steer the watercraft 100. For instance, the movable control surfaces may be pivoted to adjust the flow of fluid over the hydrofoil wing or the propulsion unit 106 to adjust the lift provided by the hydrofoil wing, increase the drag, and/or turn the watercraft 100. The wings 116 may include an actuator, such as a motor, linear actuator or dynamic servo, that is coupled to the movable control surface and configured to move the control surfaces between various positions. The position of the movable control surface may be adjusted by a computer of the watercraft 100, for instance, the IPU or propulsion unit 106. The actuators may receive a control signal from a computing device of the watercraft 100 via the power wires and/or a communication cable extending through the strut 114 and/or the wings 116 to adjust to the position of the control surfaces. The computing device may operate the actuator and cause the actuator to adjust the position of one or more movable control surfaces. The position of the movable control surfaces may be adjusted to maintain a ride height of the board 102 of the watercraft above the surface of the water.

Figure 1B:
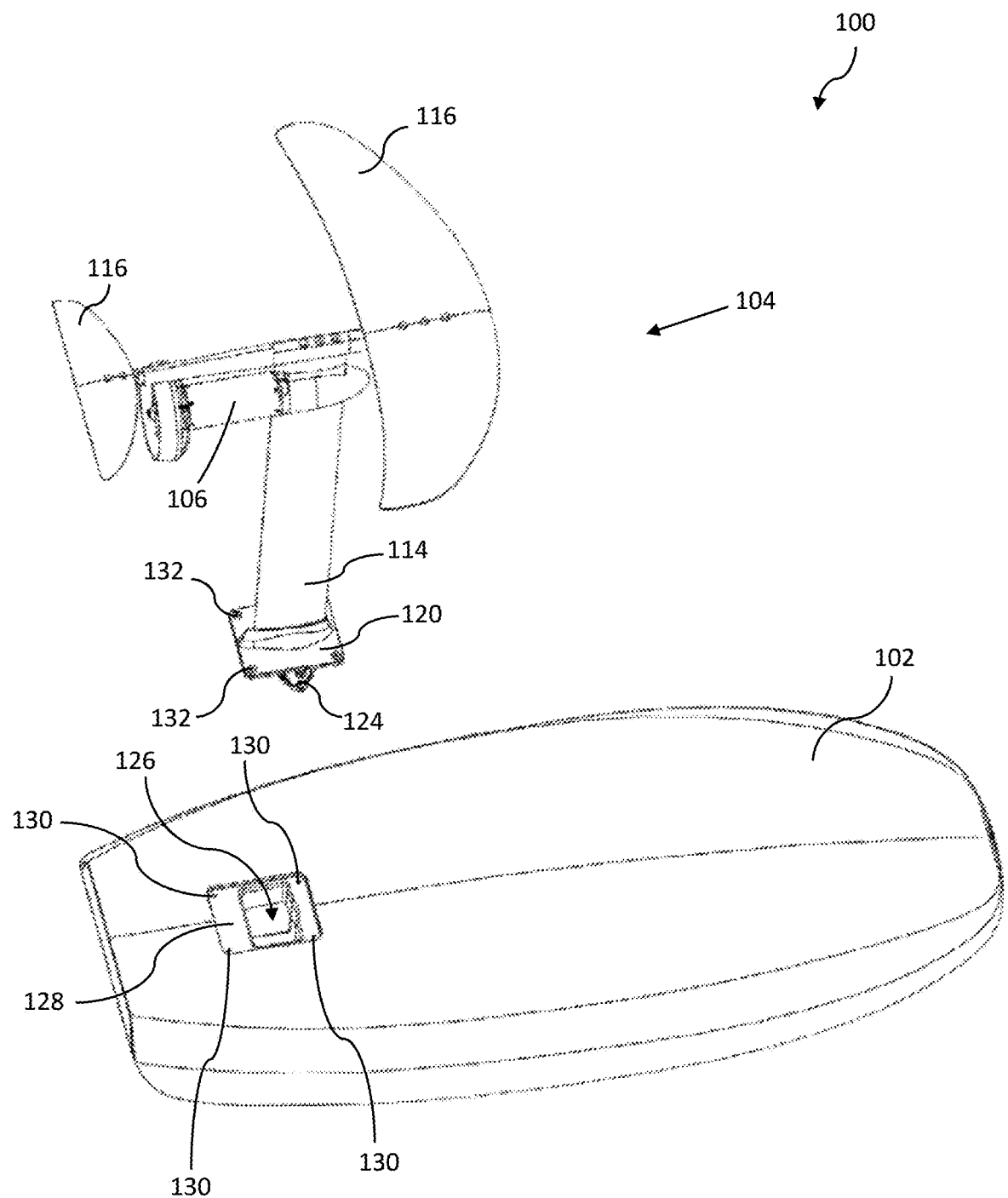
FIG. 1B is a bottom perspective view of the hydrofoiling watercraft of FIG. 1A shown with the hydrofoil detached from the board.
Figure 1C:
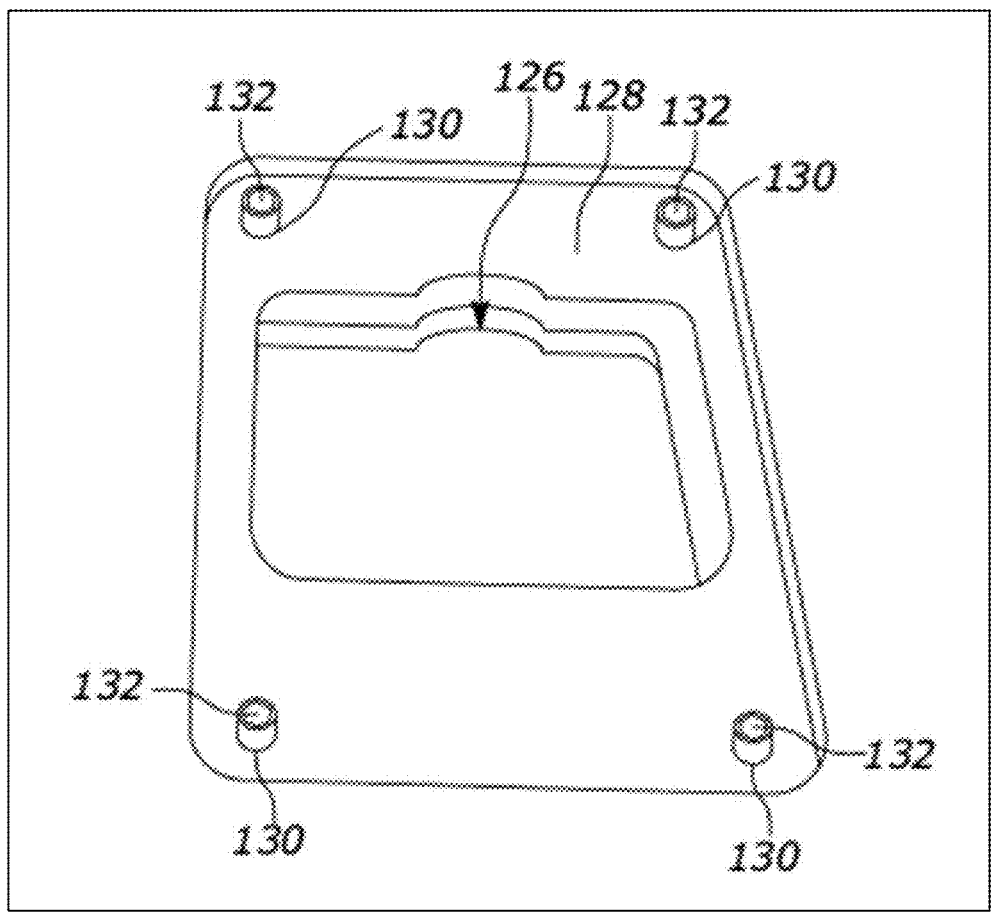
FIG. 1C is a rear perspective view of a hydrofoil attachment portion of the board of the hydrofoiling watercraft of FIG. 1A.
Figure 1D:
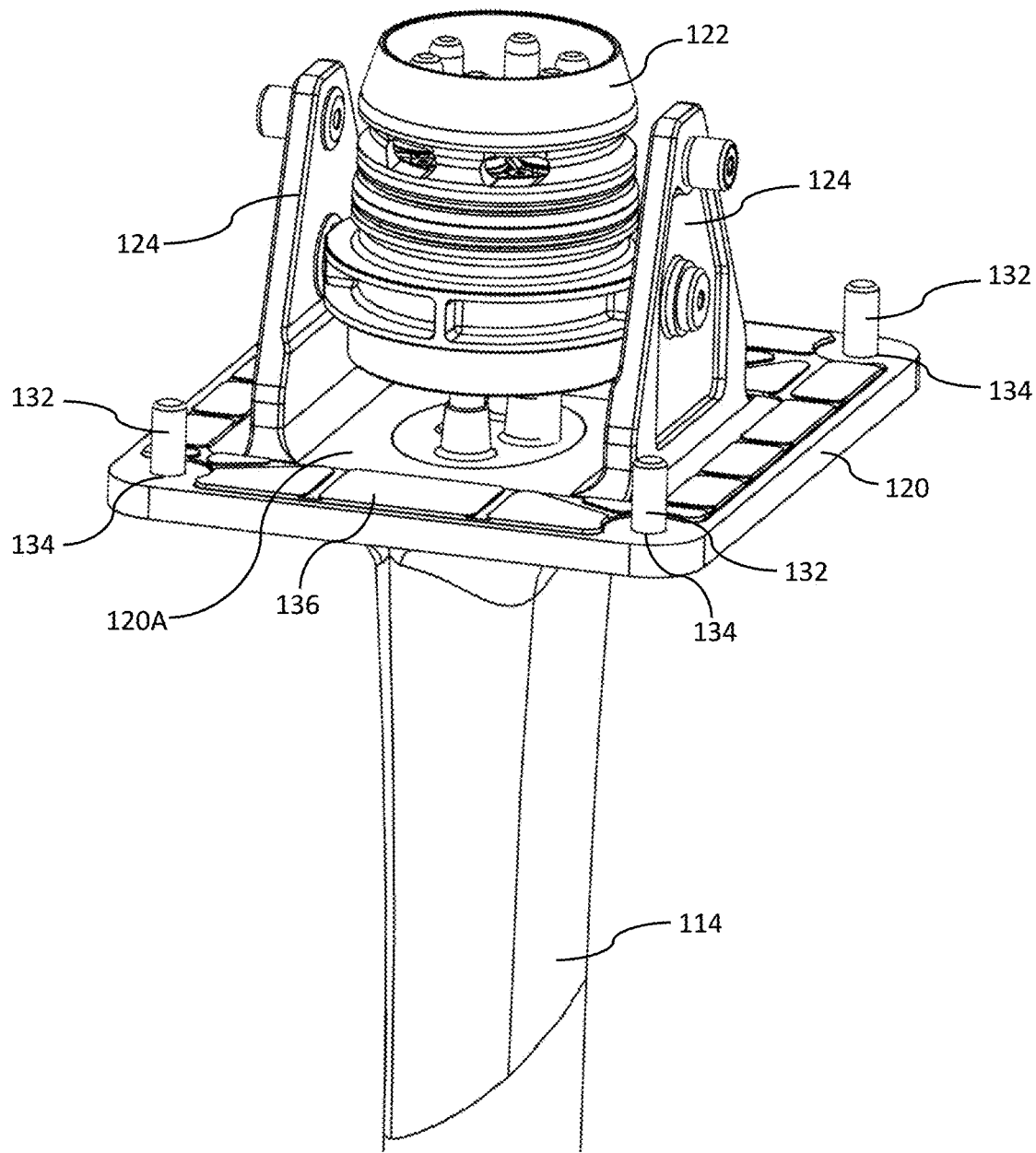
FIG. 1D is a front perspective view of an upper end of a strut of the hydrofoil of the hydrofoiling watercraft of FIG. 1A.

The upper end of the strut 114 may be removably coupled to the board 102. As shown in FIGS. 1B and 1D, the strut 114 includes an attachment plate 120 configured to engage the board 102 to be fastened thereto. The upper end of the strut 114 may include a connector 122 and brackets 124 to which the battery box 112 engages to attach the battery box 112 to the watercraft 100. The board 102 may define a hole 126 extending from the top side of the board 102 to the bottom side of the board 102. The hole 126 may extend from within the cavity 113 in the top side of the board 102. Thus, when the upper end of the strut 114 is mounted to the board 102, the connector 122 and attachment brackets 124 may extend into the cavity 113 into which the battery box 112 is placed. The bottom side of the board 102 may define a recessed portion 128 for receiving the attachment plate 120 of the upper end of the strut 114. The recessed portion 128 may define holes 130 into which fasteners 132 may extend to attach the strut 112 to the board 102. The peripheral edge of the attachment plate 120 may have the same shape or correspond to the shape of the recessed portion 128 such that the attachment plate 120 can be at least partially received within the recessed portion 128. The attachment plate 120 defines holes 134 through which the fasteners 132 (e.g., screws or bolts) may extend. The fasteners 132 may be extended through the holes 134 of the attachment plate 120 and into the holes 130 of the recessed portion 128 to secure the strut 114 to the board 102. The recessed portion 128 may have a depth that is the same or similar to the thickness of the attachment plate 120 such that the attachment plate is flush with the bottom surface of the board 102 when the attachment plate 120 is positioned within the recess portion 128.

In alternative embodiments the strut 114 includes a rotating mast that folds into a compact position when the watercraft is not in use. In some such embodiments, a single screw may be used to release the mast or lock the strut 114 in the operable position. Alternatively, a quick release/attachment mechanism could be used for attaching the strut 114 to the board easily and quickly and without use of additional tools.

In one embodiment, the holes 130 of the board 102 include threaded inserts that are mounted in a composite structural support within the board 102 (e.g., a series of posts or supporting wall within the board 102). The structural support within the board 102 may extend from the top to the bottom surface of the board 102. In one form, a series of direct fiber links between the top and the bottom of the board 102 are created in this area of the board 102 to provide structural rigidity to the board. The structural threaded inserts serve as mounting holes for receiving mounting bolts or fasteners 132.

With reference to FIG. 1D, a vibration dampening layer 136 may be attached to the top surface 120A of the attachment plate 120. When the strut 114 is attached to the board 102, as described above, the vibration dampening layer 136 is positioned between the board 102 and the strut 114. The vibration dampening layer 136 may be formed of an elastomeric material (e.g., rubber) to dampen or filter vibrations or noise. For example, the propulsion unit 106 may cause noise or vibrations that extend along the strut 114 to the board 102. The board 102 may amplify these noises and vibrations similar to the body of an acoustic guitar, creating a noisy riding experience. By including the vibration dampening layer 136, these noises and vibrations can be reduced or eliminated at the interface of the strut 114 and the board 102. The material and thickness of the vibration dampening layer 136 may be selected to filter out specific frequencies of vibrations known to travel along the strut 114.

Figure 1E:
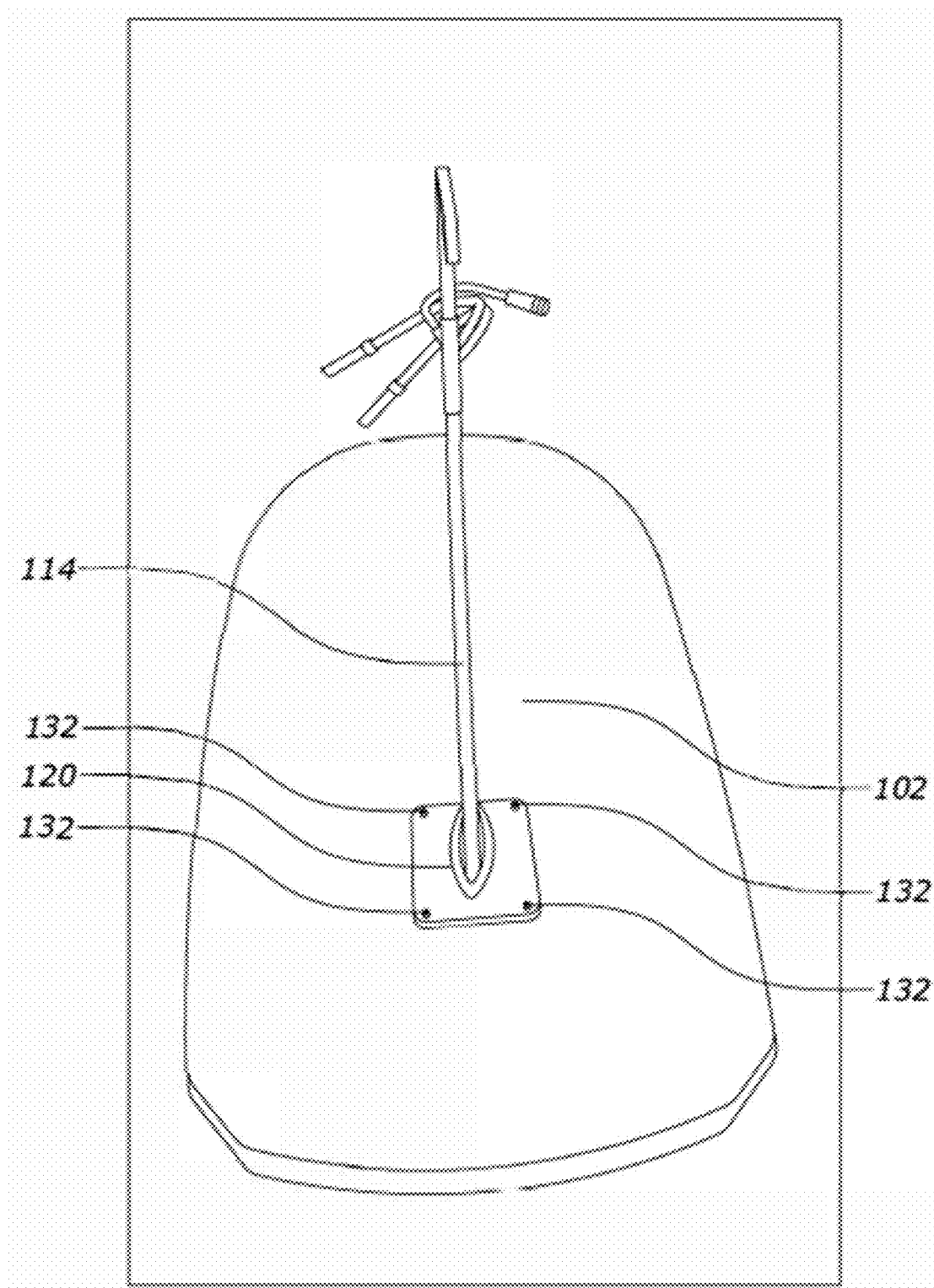
FIG. 1E is a bottom rear perspective view of the hydrofoiling watercraft of FIG. 1A with the strut attached to the board.

FIG. 1E shows the strut 114 attached to the bottom surface of the board 102. Screws 132 secure the strut to the board such that the attachment plate 120 is securely held to the board, holding the strut 114 in substantially fixed relation with the board 102.

In one embodiment, the strut 114 is formed of an upper member and a lower member that are connected by a spring, e.g., in a telescoping configuration. This enables the upper member and lower members of the strut 114 to move relative to one another along the length of the strut 114, for instance when the rider jumps or pumps the board 102. By including a spring in the strut, a rider may somewhat rhythmically shift their weight upward and downward relative to the board 102 to induce foil pumping.

Figure 2:
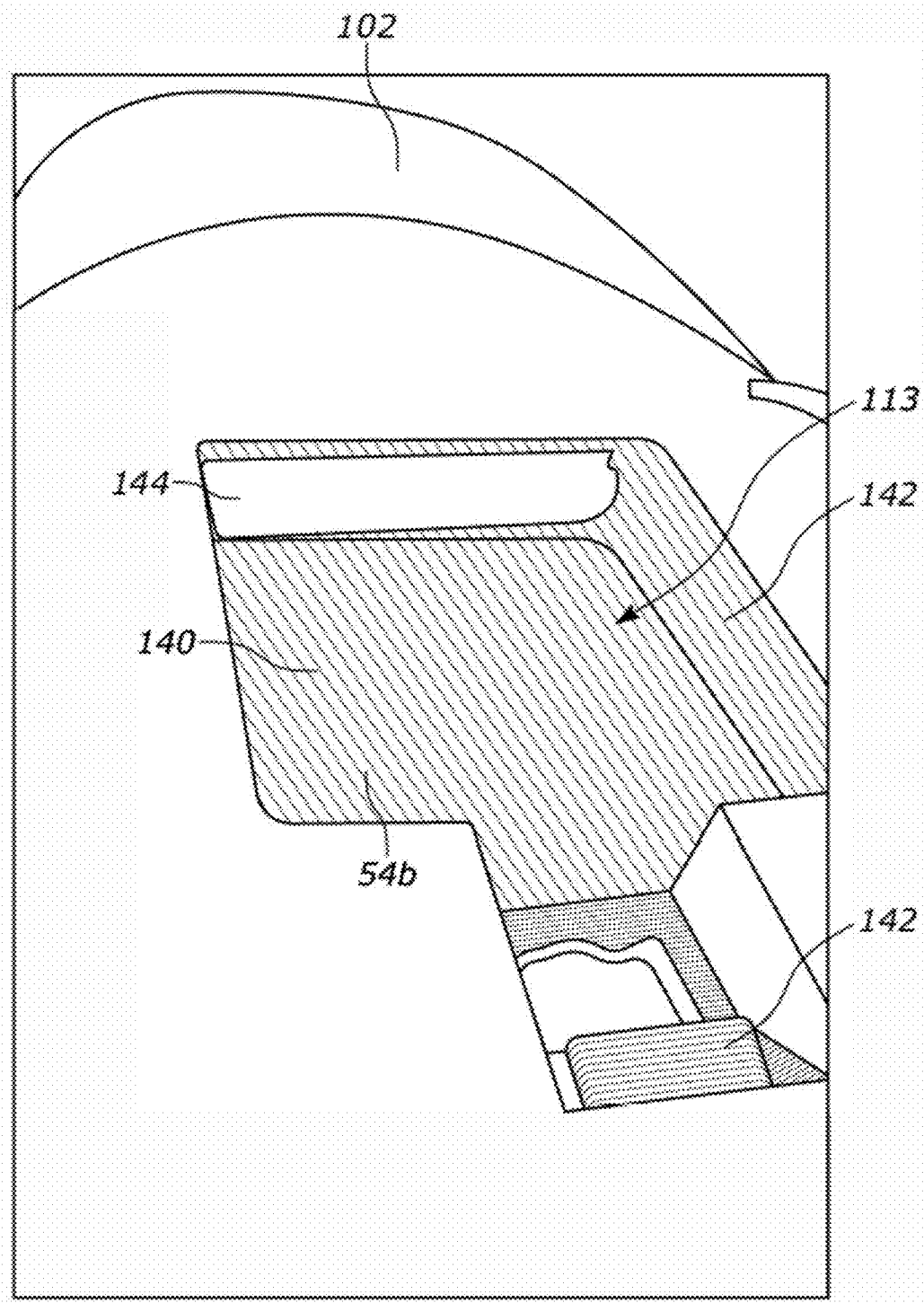
FIG. 2 is a top rear perspective view of a cavity in a top surface of the board of the hydrofoiling watercraft of FIG. 1A.

With respect to FIG. 2, the board 102 may be formed of a combination of non-conductive materials (e.g., glass fiber) and conductive materials (e.g., carbon fiber) to facilitate improved communication via radio frequency transmissions between the watercraft 100, remote controller 200, and other remote devices. As shown, the base 140 and side and rear portion 142 of the cavity 113 in the top surface of the board 102 may be formed of a conductive material (e.g., carbon fiber) or be lined with a conductive layer (e.g., a metal or carbon fiber). Because the material is electrically conductive, the material at least partially blocks electromagnetic waves coming from below the board 102, e.g., those generated from the propulsion unit 106 or motor. This aids to prevent or to reduce the interference caused by the stray electrical noise generated by the propulsion unit 106 or motor.

The front wall 144 of the cavity 113 of the board 102 may be formed of a non-conductive material (e.g., glass fiber) that allows electrical signals such as radio frequency communications to pass through. This allows the communication circuitry of the watercraft 110 to communicate with the remote devices, including, as examples, a wireless controller 200 or a server computer through the portion of the board 102 formed of non-conductive material. This improves communication of the watercraft 100 and/or remote controller 200 via radio frequencies because the front portion of the board 102 and the front wall 144 remain out of the water even when the board 102 is stationary. For instance, when the rider is on the board 102 in the water, but not moving, the rear portion of the board 102 may be submerged in the water. The water, especially saltwater, may interfere with or block the radio frequency communications with the watercraft 100. By having the front wall 144 of the cavity 113, that remains above the water even when stationary, formed of a non-conductive material, the quality and reliability of the radio frequency communications are improved. This is due in part to there being no conductive or radio frequency blocking barriers (e.g., carbon fiber, water) between the communication circuitry of the watercraft 100 and the air.

Figure 3:
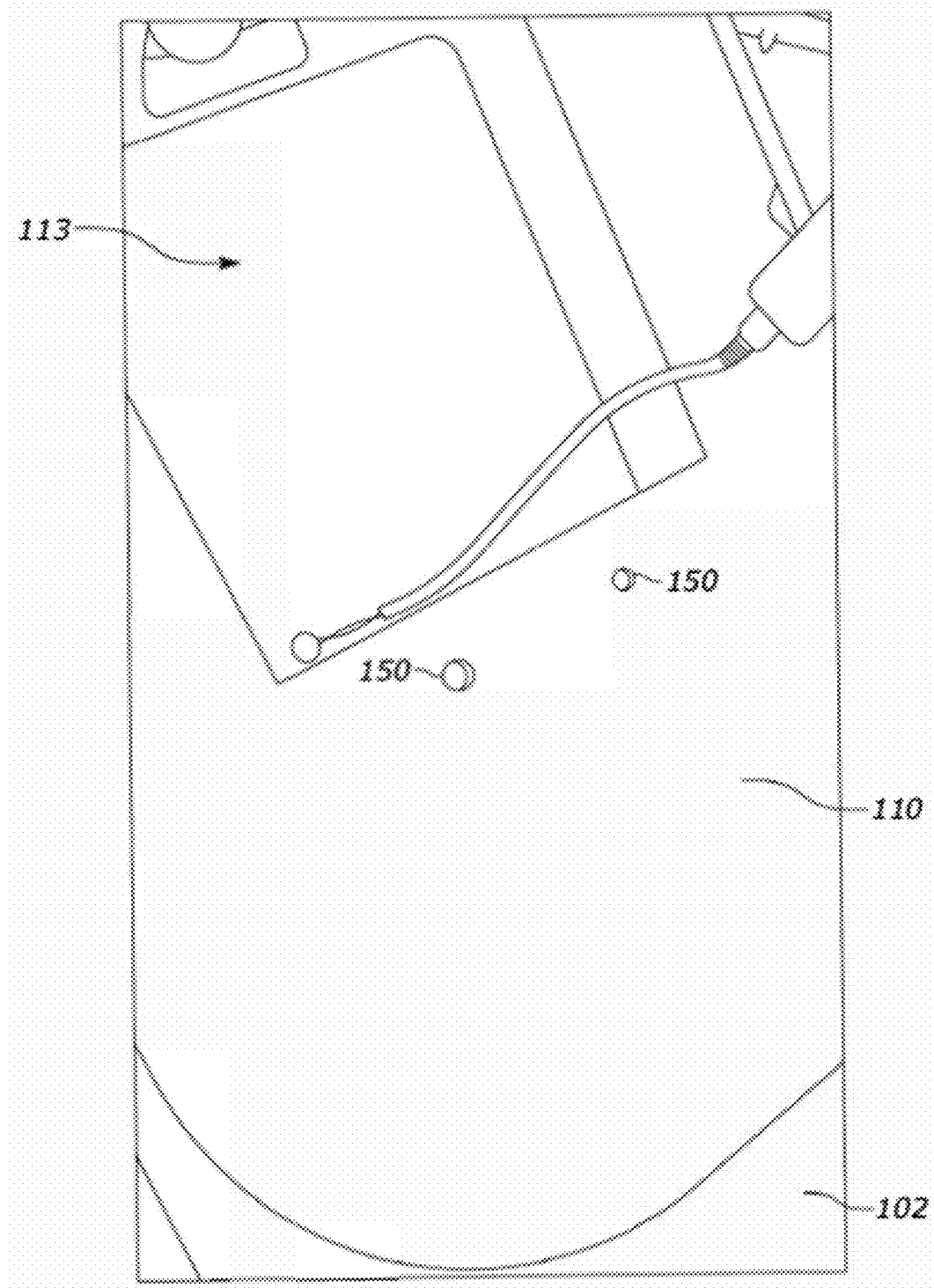
FIG. 3 is a top perspective view of a portion of the top surface of the board of the hydrofoiling watercraft of FIG. 1A.

With respect to FIG. 3, the board 102 may include vents 150 for equalizing the pressure between the cavity in the interior of the board 102 and the ambient pressure. The vents 150 may include a gas permeable membrane (e.g., Gore material) that is permeable to air and other gases, but that is impermeable to fluids such as water. This vent 150 may serve to prevent damage or deformation that could result due to a pressure inbalance between the inner cavity of the board 102 and the outside. For instance, the heat of the sun may cause the air within the board 102 to expand which may cause a portion of the board 102 to bubble or deform.

Figure 4A:
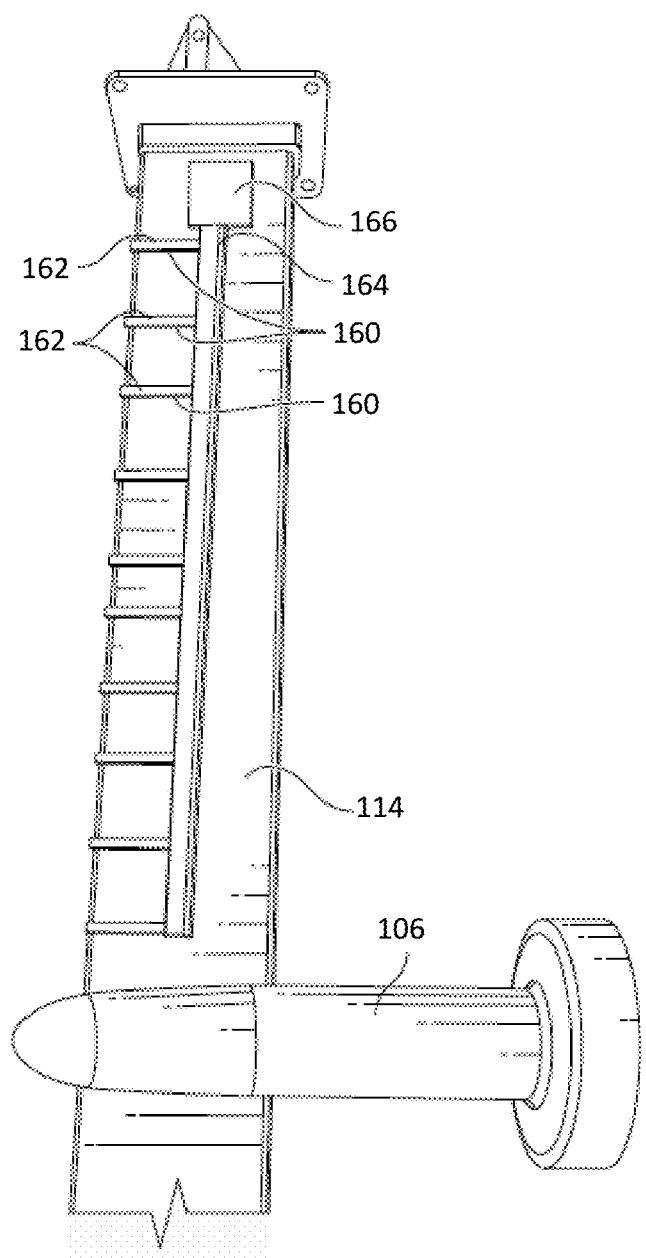
FIG. 4A is a side view of the strut of the watercraft of FIG. 1A including pressure tubes for monitoring the ride height of the watercraft.

With respect to FIGS. 4A-D, various embodiments are provided for determining the ride height of the watercraft 100, i.e., the distance the board 102 is above the surface of the water when the watercraft 100 is operating in the foiling mode. With reference to FIG. 4A, the ride height of the watercraft 100 may be determined via a plurality of pressure tubes 160 disposed along the height of the strut 114. One end 162 of the pressure tube 160 may be positioned at the outer surface of the strut 114. The pressure tube 160 may extend through the interior of the strut or along the exterior surface of the strut 114 to the other end 164 that is coupled to a sensor 166 that monitors the pressure within the pressure tubes 160. When a pressure tube 160 transitions from being above the surface of the water or below the surface of the water, the pressure change within the tube is detected and monitored. By knowing which sensors 166 are monitoring which pressure tubes 160, and where the ends 162 of the pressure tubes 160 terminate along the height of the strut 114, the height of the board 102 above the surface of the water may be estimated. Additionally, the ends 162 of the pressure tubes 160 that are underwater may have different pressure readings that correspond with the depth of each pressure tube 160 within the water. Based on these pressure readings, the ride height of the watercraft 100 may be calculated. In some forms, the sensor 166 may be housed within the propulsion unit 106. In other forms, the sensor is mounted to the strut 114. In still other forms, the sensor 166 is mounted in the board 102 or the battery box 112.

Figure 4B:
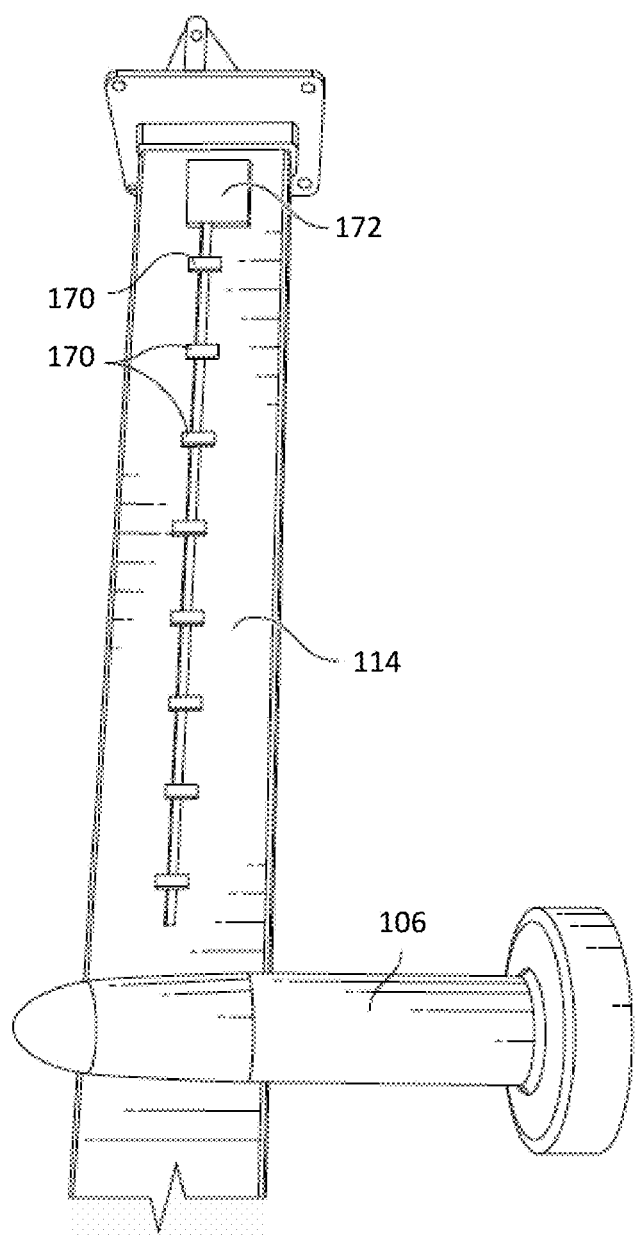
FIG. 4B is a side view of the strut of the watercraft of FIG. 1A including antennas for monitoring the ride height of the watercraft.

In another embodiment, with reference to FIG. 4B, the ride height of the watercraft 100 may be determined via a plurality of receivers 170 disposed along the height of the strut 114 in a linear array. A transmitter 172 mounted at the top end of the strut 114 or within the board 102 may output a radio frequency signal to be detected by each of the receivers 170 and communicated to a controller. Each of the receivers 170 may be connected to the controller via a wire 171 that extends from the receiver to the controller. As the ride height of the watercraft fluctuates, some of the receivers 170 will be underwater and some may be above the surface of the water. The receivers 170 underneath the water will not detect the radio frequency signal of the transmitter 172 or the signal will be very weak, especially if the watercraft is operating in saltwater. Thus, knowing the location of the receivers 170 along the strut 114, and knowing which receivers 170 are underwater because they are not receiving the signal output by the transmitter 172, the ride height of the watercraft 100 may be determined. The radio frequency output by the transmitter 172 may be for example, in the range of 1 kHz to 10 GHz. A higher frequency signal may be used to decrease the propagation of the signal through the water, to ensure that receivers 170 do not receive the signal when under the surface of the water. In other embodiments, a linear array of a plurality of transmitters 172 may be transmitting a radio frequency signal to be detected by a receiver 170 mounted at the top end of the strut or within the board 102. Based on the signals the receiver 170 detects from the transmitters 172, the ride height of the watercraft 100 may similarly be determined.

Figure 4C:
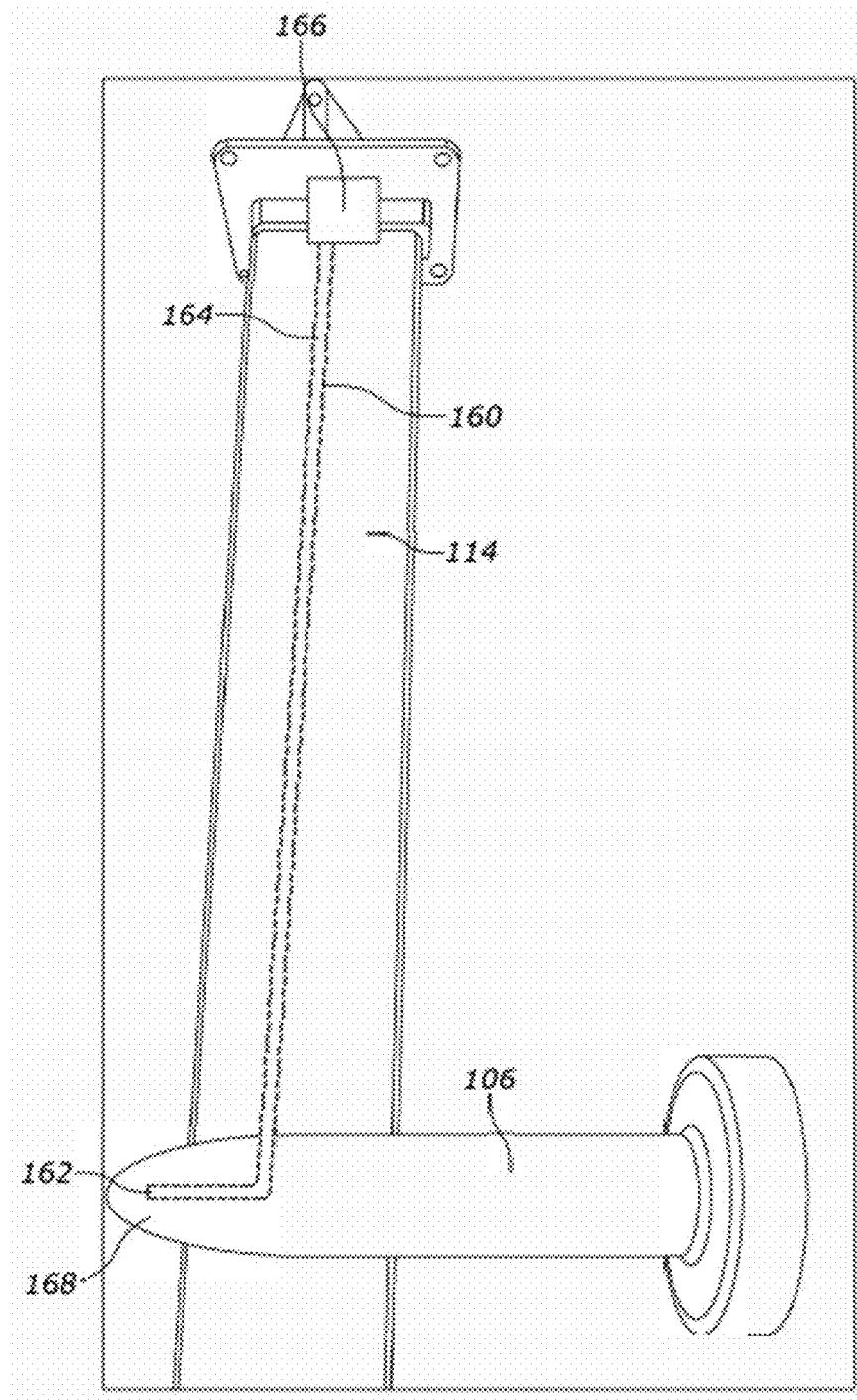
FIG. 4C is a side view of the strut of the watercraft of FIG. 1A including a pressure tube for monitoring the ride height of the watercraft.

In another embodiment, with respect to FIG. 4C, a single pressure tube 160 may be used. The first end 162 of the pressure tube 160 may be positioned within the nose cone 168 of the propulsion unit 106 or terminate at a point along the strut 114. The second end 164 of the pressure tube 160 may be attached to a pressure sensor 166 that monitors the pressure within the tube 160. The pressure within the tube 160 will vary based on the depth of the first end 162 of the tube 160 within the water. By monitoring the pressure within the tube 160, the depth of tube 160 may be estimated and the ride height of the watercraft 100 calculated using the known distance between the end 162 of the tube 160 and the board 102.

Figure 4D:
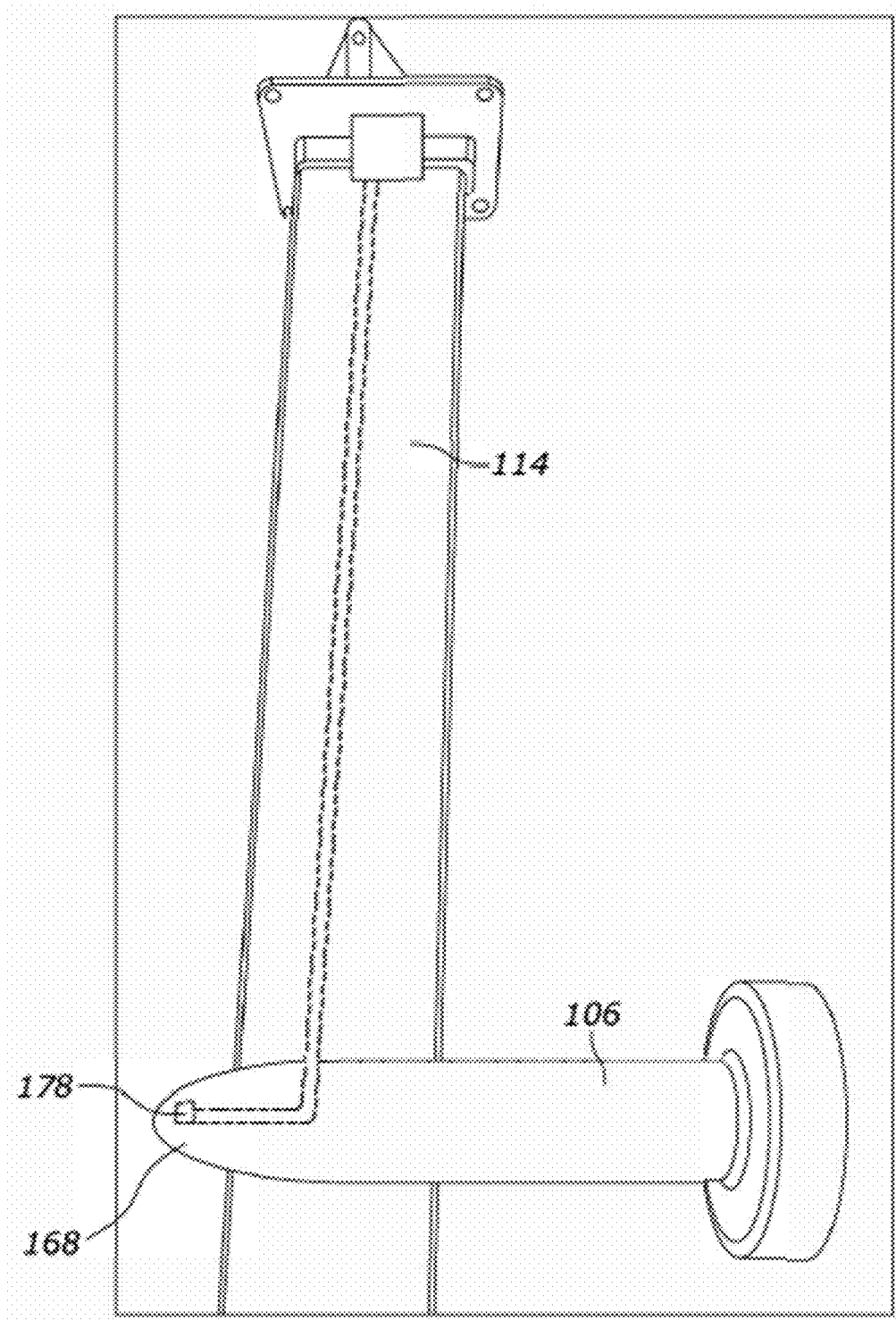
FIG. 4D is a side view of the strut of the watercraft of FIG. 1A including a pressure sensor in a nose cone of the propulsion system.

In another embodiment, with respect to FIG. 4D, an electronic pressure sensor 178 may be positioned within the nose cone 168 of the propulsion unit 106 or at a point along the strut 114. The pressure sensor 178 may be a digital pressure sensor configured to measure the pressure within the water as the height of the watercraft 100 varies during operation of the watercraft 100. The pressure sensor 178 may be connected to a controller of the board 102 (such as a computer within the propulsion pod 106 or the battery box 112) via wires the extend through the nose cone 168, the propulsion unit 160, and/or the strut 114. The pressure sensor 178 may communicate pressure data indicative of the depth of the pressure sensor 178 to the controller. By monitoring the pressure at the pressure sensor 178, the depth of pressure sensor 178 may be estimated and the ride height of the watercraft 100 calculated using the known distance between the pressure sensor 178 and the board 102.

Determining the ride height of the watercraft 100 may be useful in embodiments where the watercraft 100 is configured to automatically navigate or transport the rider. For instance, the rider may select to have the watercraft 100 autonomously take the rider to along a route (e.g., a predefined route). The watercraft 100 may adjust the speed of the motor or movable control surface of the watercraft 100 to maintain a certain ride height. For example, a computing device of the watercraft 100 may receive the ride height data from one or more sensors of the watercraft 100 and adjust the speed of the motor and/or the movable control surface(s) to maintain the ride height at a certain distance or within a certain range. The watercraft 100 may also include a sensor to monitor the height of the waves in the water and adjust the ride height to keep the board 102 above the waves. In another embodiment, the rider may select to have the watercraft 100 automatically maintain the board in a foiling mode while the ride steers the watercraft 100 (e.g., via weight shifting). The rider may, for example, select to have the watercraft 100 automatically maintain the board 102 in a foiling mode via the wireless controller 200. In some forms, the rider may select a ride height for the watercraft 100 to automatically maintain. In other forms, the rider may select a ride height that the user does not desire to exceed. The watercraft 100 may automatically adjust the speed of the motor and/or the movable control surfaces to prevent the user from exceeding the selected ride height.

In one embodiment, the watercraft 100 and/or the wireless controller 200 includes a microphone into which a rider may speak commands. For instance, the rider may speak a command to move forward, turn to the left, turn to the right, increase or decrease the ride height, accelerate, decelerate, stop, and/or travel at a certain speed.

In some embodiments, the watercraft 100 may be controlled by the rider shifting their weight on the surface of the board 102. The board 102 may include weight and/or pressure sensors on the top surface of the board 102 to detect where the rider is placing their weight and how much weight the rider has placed on a certain area of the board 102. The rider may lean their weight forward to increase the speed of the watercraft 100, shift their weight backward or remove their weight from the front of the board 102 to decrease the speed, lean left to steer left, and lean right to steer right. Based on the weight shift or differential across the pressure sensors of the board 102, the watercraft 100 may determine how to operate the watercraft 100. For example, based on the pressure applied toward the front end of the board 102, the watercraft 100 may operate the motor at a certain speed. The speed may correspond to the detected weight differential between the front and rear portions of the board. The watercraft 100 may adjust a movable control surface of the watercraft (e.g., on the hydrofoil wings 116) to cause the watercraft to turn based on the weight differential between the left and right sides of the board 102. The rate at which the watercraft is turned may correspond to the degree of weight difference detected on the right and left sides of the board 102.

Figure 5:
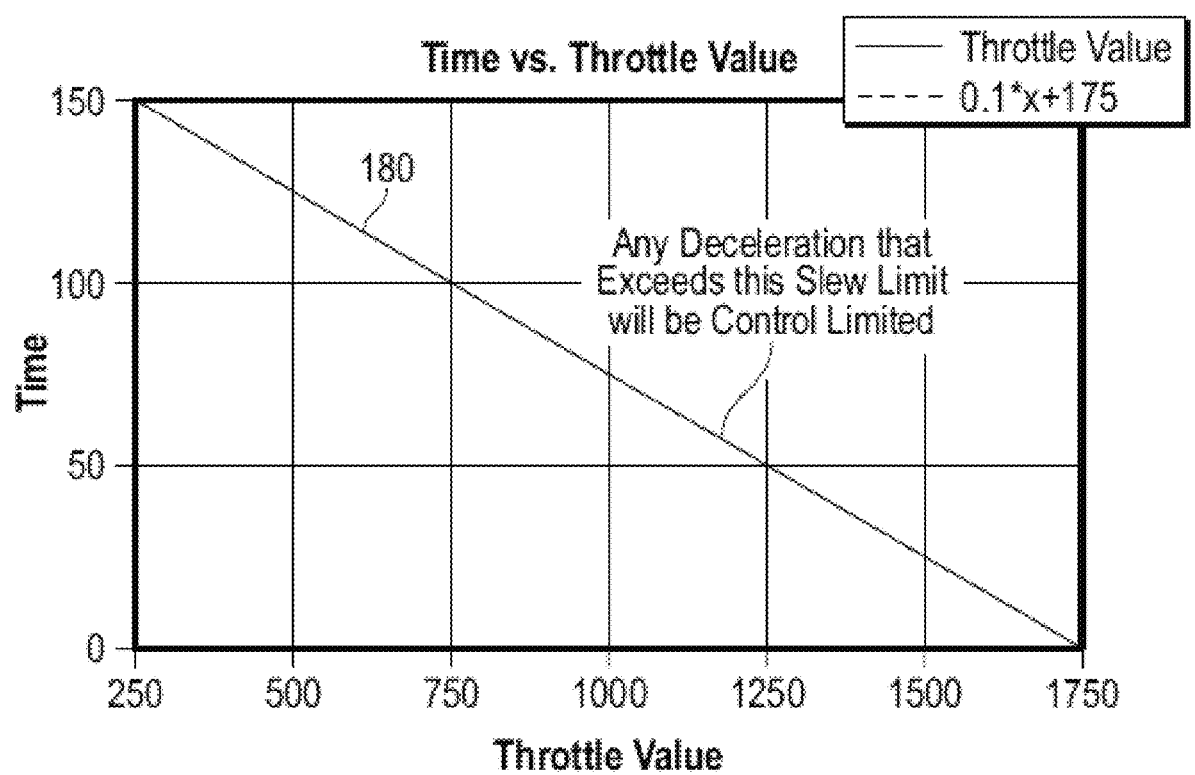
FIG. 5 is a graph indicating an example deceleration limit line permitted by the hydrofoiling watercraft of FIG. 1A according to an embodiment.

The watercraft 100 may be configured to control the rate of deceleration of the watercraft 100 so that the watercraft 100 does not abruptly decelerate (which may cause the rider to fall), but instead has a smooth transition to a slower speed or to a stop. For example, when the rider releases the throttle, the IPU may be configured to continue rotating the propeller at progressively decreasing speeds to lower the rate of deceleration. Using this approach, the rider experiences a smooth transition toward a slower speed without the watercraft 100 jerking in response to the rider easing up on the throttle. The watercraft 100 thus provides an artificial glide to the watercraft 100 when the user disengages or reduces the throttle control value. With reference to FIG. 5, an example graph is provided showing an example slew limit line 180 that may be used to control the rate of deceleration based on the throttle values provided from the throttle controller of a remote controller 200. If the throttle values received from the rider's controller decrease at a rate that is steeper than the slope of the slew limit line 180, then the IPU or motor controller will increase the throttle value provided to the motor to ensure that the motor of the watercraft 100 does slow at a rate slower than the slew limit line 180. The ensures that the watercraft 100 does not slow abruptly, but rather slows at a rate no greater than the slew limit line 180.

The watercraft 100 may include a sensor for determining whether a rider is still on the board 102 or has fallen off. In one example, the sensor is a pressure sensor similar to those used for detecting weight shift control. In another example, the sensor is a radar or ultrasonic sensor directed upward from the board 102. Using a radar or ultrasonic sensor may aid to ensure that the user has actually fallen of the board 102 and has not simply jumped off of the surface of the board 102, since the sensors may determine if the rider is still above the surface of the board 102, even if not currently contacting the board 102. Use of radar or ultrasonic sensors may result in a faster determination that the rider has fallen as compared to pressure sensors since the sensors can detect immediately when the rider is not above the board 102. In the pressure sensor approach, there may be a delay from the time the rider is not detected on the board 102 to ensure that the rider has not simply jumped and will be returning to the board 102 momentarily. In another form, a magleash may be used. One end of the magleash may be affixed to the rider while the other end includes a magnet that is magnetically coupled to a sensor on the board 102. As the rider falls, the magleash pulls the magnet from the board 102. The watercraft 100 may determine the rider has fallen when the sensor does not detect the magnet of the magleash.

The watercraft 100 may further include an inertial measurement unit (IMU) that detects how far the watercraft 100 has tilted. The IMU may be within the strut 114, battery box 112 or board 102 as examples. The angle of the board 102 relative to the surface of the water may be monitored to determine whether the rider has fallen off of the board. For example, if the board 102 tips more than 45 degrees from the vertical, the watercraft 100 may determine that the rider has fallen off and stop the motor.

The IMU may also be used to determine whether the rider is on the board 102 by monitoring the acceleration of the watercraft 100. For example, when the rider is on the board 102, the acceleration (e.g., bouncing due to a wave) of the watercraft 100 has acceleration characteristics that correspond to the total mass of the watercraft 100 and the rider. When the rider has fallen off the board 102, the acceleration of the watercraft 100 has acceleration characteristics that correspond to only the mass of the watercraft 100, i.e., a significantly lower mass. Thus, when the IMU detects acceleration characteristics corresponding to a mass of only the watercraft and not the rider, the IMU may determine that the rider is not on the board and may have fallen off.

The watercraft 100 may be configured to only slow the watercraft or motor at the set rate of maximum deceleration only if it determined that the rider is still on the board 102 based on the sensors. If it is determined that the rider has fallen off the board 102, then the IPU or motor controller may immediately cut the power provided to the motor to stop the motor from spinning the propeller. Under this approach, the motor will not continue to power the propeller after the rider is in the water and potentially in proximity to the propeller. The propeller may be a foldable propeller such that the propeller folds when the motor is not spinning or the user has let off the throttle. In some forms, the propeller folds when the watercraft 100 detects that the rider has fallen or is no longer on the board 102.

Similarly, the rate of acceleration may be limited to prevent the watercraft 100 from accelerating or decelerating too quickly. In some forms, the rider may select or adjust the acceleration and deceleration rate limits via the wireless controller 200. In other forms, these acceleration and deceleration rate limits may be selected or set via an application on a user device (e.g., a smartphone) that is in wireless communication with the watercraft 100, for example, via Bluetooth. Other operational parameters and limits may similarly be set. For example, the watercraft 100 may be configured to set the top speed and or limit the torque output of the motor. The rate at which the watercraft 100 turns via the movable control surface may also be similarly limited.

Figure 6A:
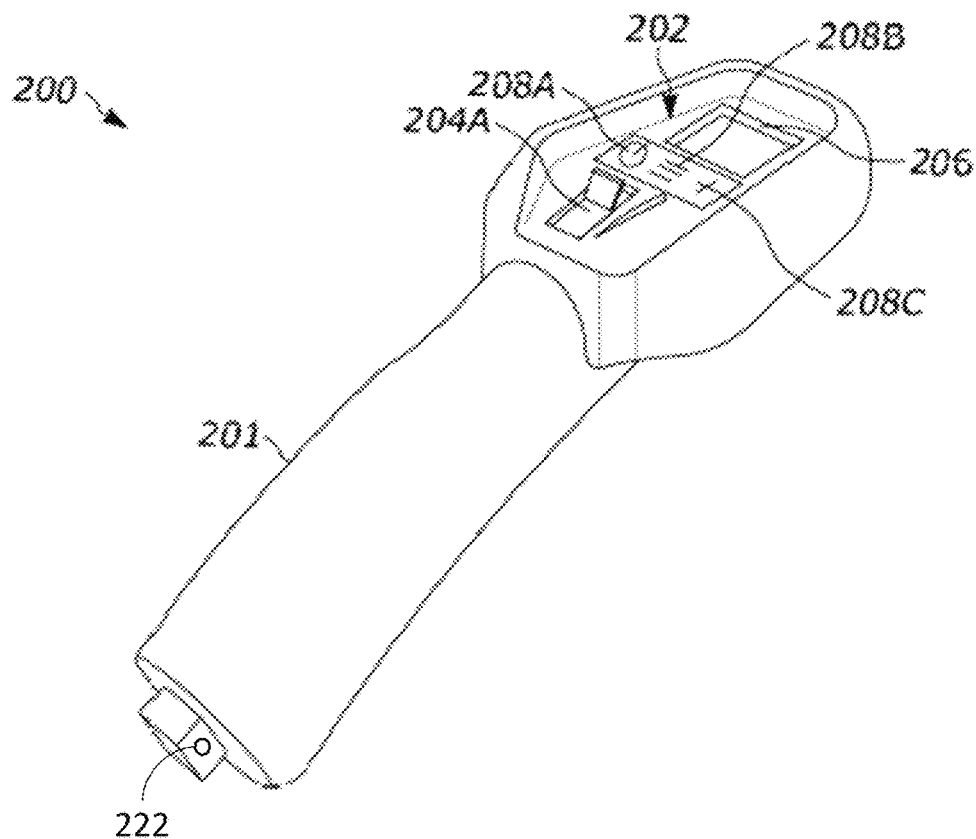
FIG. 6A is a top rear perspective view of a wireless controller for controlling the operation of the hydrofoiling watercraft of FIG. 1A according to a first embodiment.
Figure 6B:
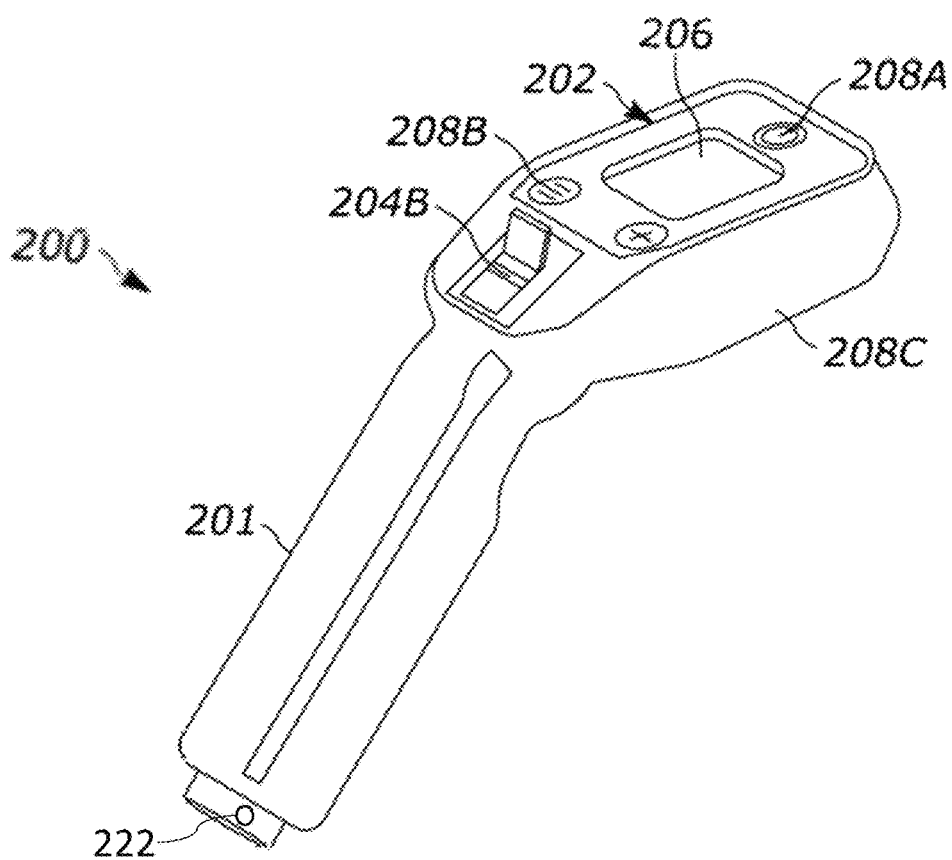
FIG. 6B is a top rear perspective view of a wireless controller for controlling the operation of the hydrofoiling watercraft of FIG. 1A according to a second embodiment.

With reference to FIGS. 6A and 6B, first and second embodiments of wireless remote controllers 200 are shown, respectively. These embodiments operate similarly, with various differences between the embodiments highlighted in the following discussion. The wireless remote controller 200 is a waterproof remote controller that that may include a processor, memory, communication circuitry, user interface 202, a throttle control mechanism 204 (e.g., 204A and 204B), and a battery powering the wireless remote controller 200. The remote controller 200 includes a handle 201 configured to be gripped or held within a rider's hand. The processor, memory, communication circuitry, and battery may be contained within a sealed watertight cavity of the remote controller 200. This wireless remote controller 200 may be communicatively coupled with the communication circuitry of the watercraft 100. The processor of the wireless remote controller 200 may communicate with the watercraft 100 via the communication circuitry. The wireless controller 200 may communicate via one or more of Wi-Fi, Cellular, Bluetooth, Zigbee and the like. The processor is in communication with the user interface 202 and the throttle controller 204 (e.g., 204A and 204B) and configured to receive input from the rider via the user interface 202 and the throttle controller 204.

The throttle control mechanism 204A of the first embodiment of FIG. 6A and 204B of the second embodiment in FIG. 6B is a thumb wheel. The user rests their thumb on the thumb wheel 204A or 204B and rotates the wheel forward or backward with their thumb to control the throttle of the watercraft 200. Using a thumb control is advantageous over controllers that use a trigger to control the throttle because a user's hand is not as easily fatigued as with trigger control mechanisms. Further, a user's thumb is more likely to come off the thumb wheel when falling of the board 102 as opposed to trigger controllers where a user is prone to squeezing the trigger during a fall causing unwanted throttle control signals.

In preferred embodiments, the thumbwheel position is sensed by a 3D magnetic sensor (hall effect). This allows the magnet sensor to detect rotation and/or translation of the magnetic field from the magnets mounted in the thumbwheel (or a joystick). The use of 3D sensors allows actuation of additional features as the thumbwheel is slid to the left/right, for example to change motor response profiles to simulate "gear shifting." An indicator spring mechanism is preferably used to re-center the control mechanism 204. The use of a 3D hall effect sensor also allows detection of false signals arising from stray magnetic fields (random magnets present near the controller). For example, a safety cutoff leash or other magnetic may be used with the watercraft, or other magnetic fields may be present in the environment.

The processor of the wireless remote controller 200 may receive the throttle control input from the rider via the throttle control input mechanism 204 (e.g., 204A and 204B) and communicate the throttle control information to the watercraft 100 via the communication circuitry.

In some embodiments, the remote controller 200 includes a button that causes the watercraft 100 to "shift gears." The rider may operate the watercraft 100 in a first mode where the watercraft 100 has a limited amount of power/speed, then select the button to transition to a second mode where the watercraft 100 has an increased amount of power/speed. The rider may have three, four, or more modes that unlock progressively more power/speed. As one example, in the first mode, moving the throttle to a full throttle position allows the watercraft 100 to travel at about 10 knots. By switching to the second mode, movement of the throttle to the full throttle position allows the watercraft 100 to travel up to 20 knots. Those having skill in the art will readily appreciate that the speed within each mode may be adjusted and that more modes may be used, with each mode having a maximum amount of power/speed at which the watercraft 100 will operate. The user may select the button to "shift up" to the next mode to unlock a greater amount of power/speed to be selected using the thumb wheel. The remote controller 200 may similarly include a button for "shifting down" to the lower power/speed mode.

Figure 6C:
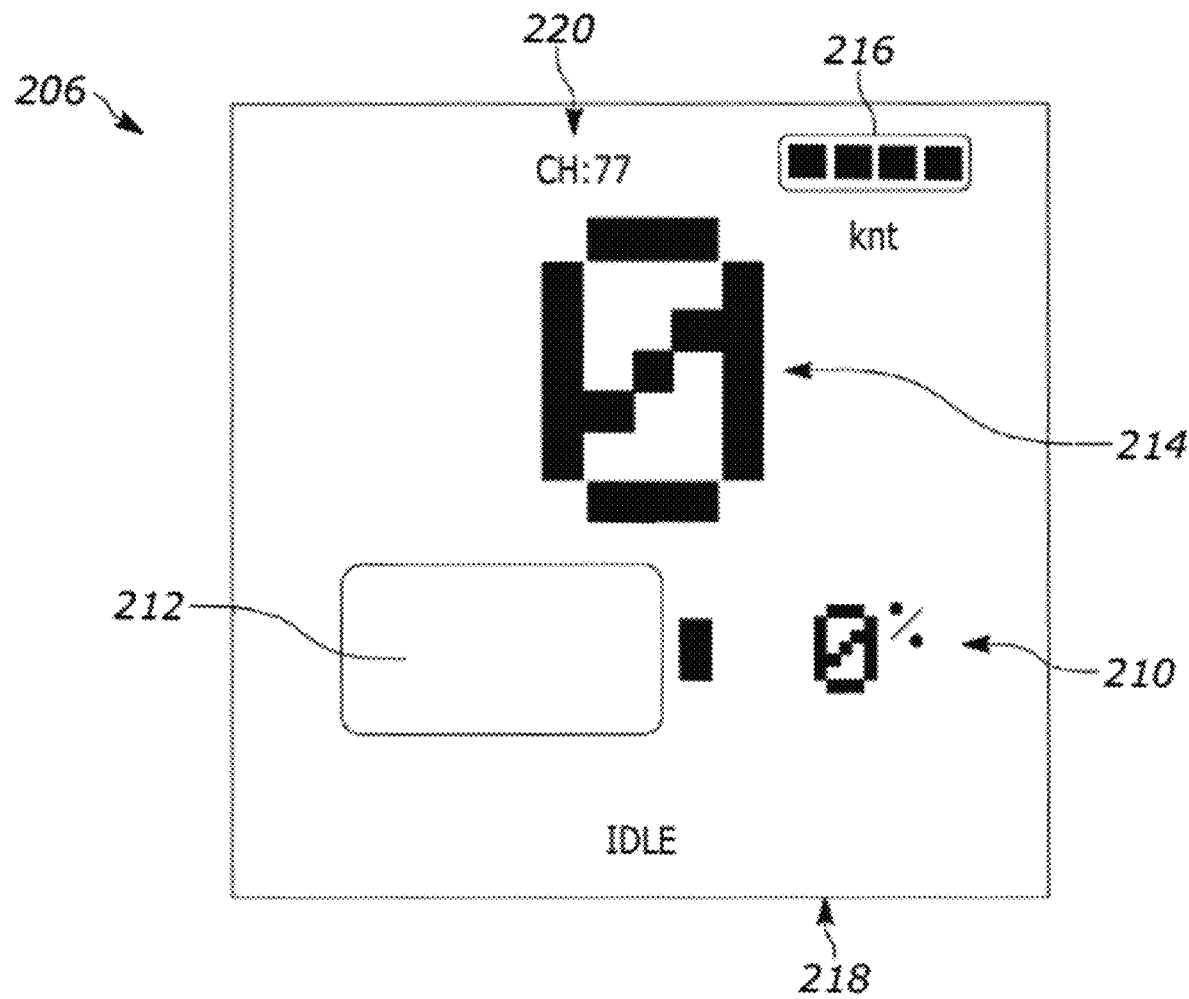
FIG. 6C is an example display of the wireless controllers of FIGS. 6A and 6B.

The user interface 202 may include a display screen 206, one or more buttons 208, a speaker, a microphone, and one or more indicator lights. With reference to FIG. 6C, an example display of the display screen 206 is shown. The display screen 206 may indicate a battery charge percentage 210 of the watercraft 100, a battery charge level graphic 212 of the watercraft 100, the speed 214 of the watercraft 100, the battery charge level 216 of the wireless remote 200, the ride mode 218 of the watercraft 100 (discussed below), and the communication channel 220 the wireless controller is operating on. The wireless remote controllers 200 include buttons 208A-C. Button 208A turns the wireless remote controller 200 on/off. Button 208B causes a menu to be displayed or hid. The user may navigate through the menu to change various settings of the watercraft 100 including the ride mode, adjust an operating parameter of the watercraft 100 (e.g., adjust the deceleration or speed limit), etc. Button 208C is a select button used to select the item displayed on the screen.

The wireless remote controller 200 may include a plurality of profiles or ride modes that are selected to control the operation of the watercraft 100. For instance, a new user may start at a beginner level where the watercraft is limited to lower speed and rates of acceleration. After a period of time, the user may progress through an intermediate, advanced, and expert levels unlocking increasingly more power, higher speeds, rates of acceleration. Additional features may also be unlocked including a wave-riding mode and a reverse mode. In some forms, the watercraft may assist the rider (e.g., provide stability to the board 102 via movable control surfaces) in the lower levels and progressively provide less and less assistance as the user gains more experience.

In some embodiments, the rider's usage and performance data is collected by the watercraft (e.g., the IPU) and/or wireless controller 200. The rider's usage and performance data (e.g., time of use, number of falls, etc.) may be uploaded to a cloud for storage and analysis. A determination of the appropriate ride mode for the rider may be determined based on the rider analysis. The rider may have a profile associated with a smartphone application that enables the user to transfer their rider profile information between different watercraft 100 so that the unlocked ride modes and features are available to that rider on other watercraft 100. The rider profile may include biometric information of the rider including their height, weight, image of their face for facial recognition of a user to authenticate the user, login information, ride style data, and ride height data. The watercraft 100, remote controller 200, and/or cloud may be used to automatically identify and track riders based on their unique rider characteristics.

In the embodiment shown, the remote controller 200 includes an idle mode, lock mode, easy mode, intermediate mode, and advanced mode. In the idle mode, the throttle cannot be applied. This is the default mode of the remote controller 200 on startup. The remote controller 200 may also revert to this mode from any normal ride mode as a failsafe if the user does not provide throttle input after 30 seconds. In the lock mode, the throttle also cannot be applied. This explicitly locks the remote to throttle input for safety around children, pets, or other non-participants on land or water.

The easy mode is for new riders. The easy mode may limit acceleration performance, available power to approximately 60 percent, and top speed to approximately 12 knots or 14 mph. The intermediate mode is for riders proficient in falling. The intermediate mode has higher acceleration performance, limits power to approximately 70 percent, and top speed to approximately 16 knots or 18 mph. The advanced mode is for experienced riders. The advanced mode provides unrestricted acceleration performance and has no limits on power, producing a top speed in excess of 20 knots or 23 mph.

The remote controller 200 may include a pressure sensor that indicates when the remote controller 200 is underwater. The remote controller 200 may stop sending a throttle control signal upon detecting the remote controller 200 is underwater. The remote controller 200 may be underwater when, for example, the rider falls off of the board 102. Thus, by ceasing to transmit a throttle control signal, the motor of the watercraft 100 may be shut off automatically when the rider falls in the water. When the watercraft 100 ceases to receive the throttle control signal from the remote controller 200, the IPU may immediately cease to provide power to the propulsion unit 106, thus causing the propeller to cease rotating. The IPU may be configured to disregard the deceleration limits that may be selected or set to disable the motor if the rider falls overboard.

In some embodiments, the remote controller 200 may include a reed switch or a magnetic sensor that is used to activate the ride mode. For example, the rider may bring a portion of the remote controller 200 into contact with a magnet or contact on the top surface of the board 102. The reed switch or magnetic sensor may detect that the remote controller 200 was brought into contact with the board 102 and switch the remote controller 200 into a ride mode (out of the idle or locked modes). In one example, upon touching the board 102 with the remote controller 200, a countdown is started until the remote controller 200 switches into the ride mode at which point the rider may control the watercraft 100 via the remote controller 200. The ride mode may time out after a period of inactivity. For example, if the user does not engage the throttle control mechanism 204 within 30 seconds, the remote controller 200 may switch back to the idle or locked mode.

In one embodiment, touching the remote controller 200 to the board 102 causes the remote controller 200 and the watercraft 100 to be linked or paired such that the remote controller 200 will send control signals to the watercraft 100 the rider touched the remote controller 200 to. This prevents a user from inadvertently controlling another watercraft 100 with a remote controller 100, which could cause otherwise potentially cause damage to the other watercraft 100 and/or injure someone nearby. The remote controller 200 may unpair or disconnect from the watercraft 100 after a period of inactivity following contact with the board 102. For example, if the user does not engage the throttle control mechanism 204 within 30 seconds, the remote controller 200 may unpair from the watercraft 100. The user will then need to contact the board 102 with the remote controller 200 again to control the watercraft 100.

The remote controller 200 may include a hole 222 for a leash pin or through which a strap or cord may be attached. The strap or cord may be wrapped or loops around a rider's wrist or arm to tether the remote controller 200 to the rider. If the rider falls and drops the remote controller 200, the remote controller 200 may remain attached to the rider. In some forms, the remote controller 200 floats. This may be due in part to the sealed watertight cavity within the controller 200.

In some embodiments, the remote controller 200 is wirelessly tethered to the watercraft 100 so that the remote controller 200 and the watercraft 100 remain linked and in communication with one another. The watercraft 100 may determine the distance that the remote controller 200 is from the watercraft 100 which the watercraft 100 may use in determining whether the rider has fallen off of the watercraft 100. If the remote controller 200 is more than a predetermined distance (e.g., 8 feet) from the watercraft 100, the watercraft 100 may cease operation.

In some embodiments, the remote controller 200 includes a summon feature where the rider can send a signal to the watercraft 100 to cause the watercraft 100 to autonomously operate and move toward the rider. This may be beneficial to the rider when the rider falls off the watercraft 100. The rider then does not have to swim after the watercraft 100 when the rider falls off, but can simply summon the watercraft 100 to return to the rider. The rider may summon the watercraft 100 by pressing a button on and/or speaking a command to the remote controller 200. The watercraft 100 may determine the location of the remote controller 200 and automatically navigate toward the remote controller 200. The location of the remote controller 200 may be determined via the Bluetooth communication with the remote controller 200 to determine the distance the watercraft 100 is from the remote controller 200 and the angle at which the watercraft 100 is approaching the remote controller 200. As another example, the remote controller 200 further includes GNSS circuitry to determine the location of the remote controller 200. The remote controller 200 may communicate its location to the watercraft 100 and the watercraft 100 may navigate toward the remote controller 200. The watercraft 100 may determine its location also using the GNSS circuitry of the watercraft 100. In some forms, the watercraft 100 cannot be summoned when the remote controller 200 is within a certain distance, e.g., 10 feet to reduce the risk of collision between the rider and the watercraft 100. Similarly, when summoned, the watercraft 100 may head toward the user, but cease operating when the remote controller 200 is within a predetermined distance, e.g., 10 feet. This summon feature is particularly beneficial when there is a strong wind or current that could cause the watercraft 100 to get carried away from the rider when the rider falls off.

Figure 7A:
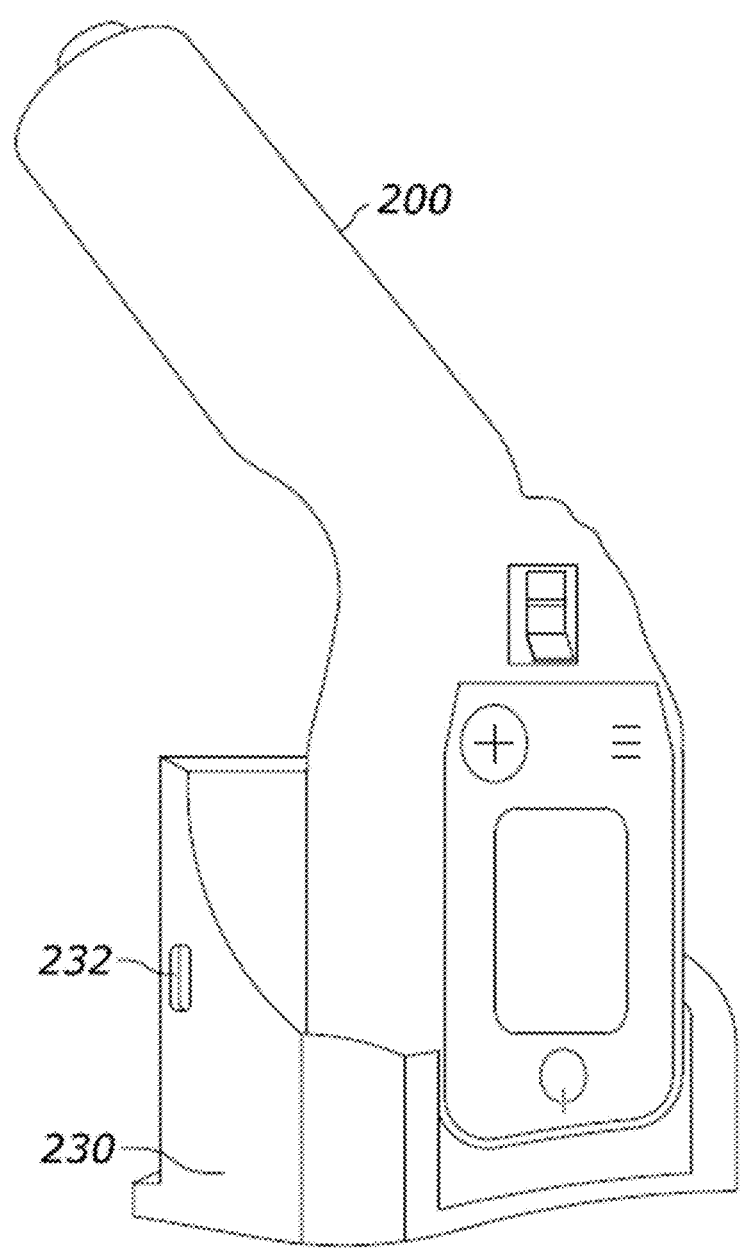
FIG. 7A is perspective view of the wireless controller of FIG. 6B positioned within a wireless charging dock.

With respect to FIG. 7A, the battery of the remote controller 200 may be charged by placing the remote controller 200 on a charging dock 230. The battery of the remote controller 200 may be charged inductively. This enables the battery and other components to remain sealed within the watertight cavity of the remote controller 200 without including any opening for wires to extend across the fluid tight seal. The charging dock 230 may include a port 232 into which a charging cable may be inserted. The charging cable may be plugged into a wall outlet to provide power to the charging dock 230 via the port 230. The charging dock 230 may include a primary coil for charging the remote controller 200. The remote controller 200 may include a secondary coil that is aligned with the primary coil of the charging dock 230 when the remote controller 200 is placed in the charging dock 230 to enable the remote controller 200 to be charged inductively.

Figure 7B:
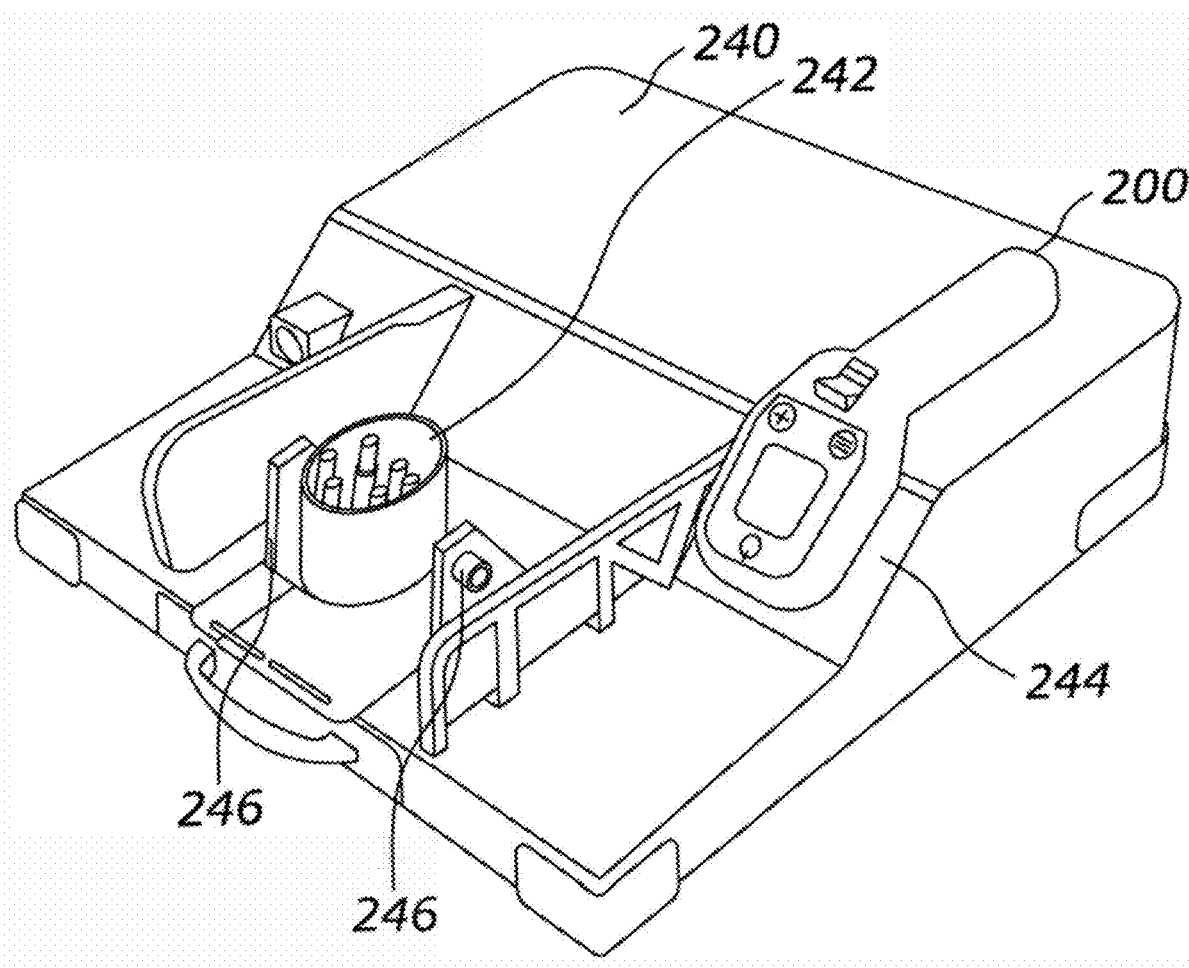
FIG. 7B is a perspective view of an integrated charging station for the wireless controller of FIG. 6A or 6B and a battery of the hydrofoiling watercraft of FIG. 1A.

With respect to FIG. 7B, the battery of the remote controller 200 may be charged on a charging dock 240 of another embodiment. The charging dock 240 includes a connector plug 242 that the battery box 112 of the watercraft 100 may be plugged into for charging the battery box 112. The connector plug 242 may be similar to the connector plug 122 of the strut 114. The charting dock 240 may also include attachment brackets 246 similar to the attachment brackets 124 of the strut 114. Thus, to attach the battery box 112 to the charting dock 240, the battery box 112 may be attached similar to the attachment of the battery box 112 to the strut 112. The remote controller 200 may rest on a portion or a pad 244 of the charging dock 240 to be charged inductively, similar to that described above with regard to FIG. 7A. The charging dock 240 may include a port that a charging cord plugs into. The charging cord may be plugged into a wall outlet to supply power to the charging port 240.

Figure 8A:
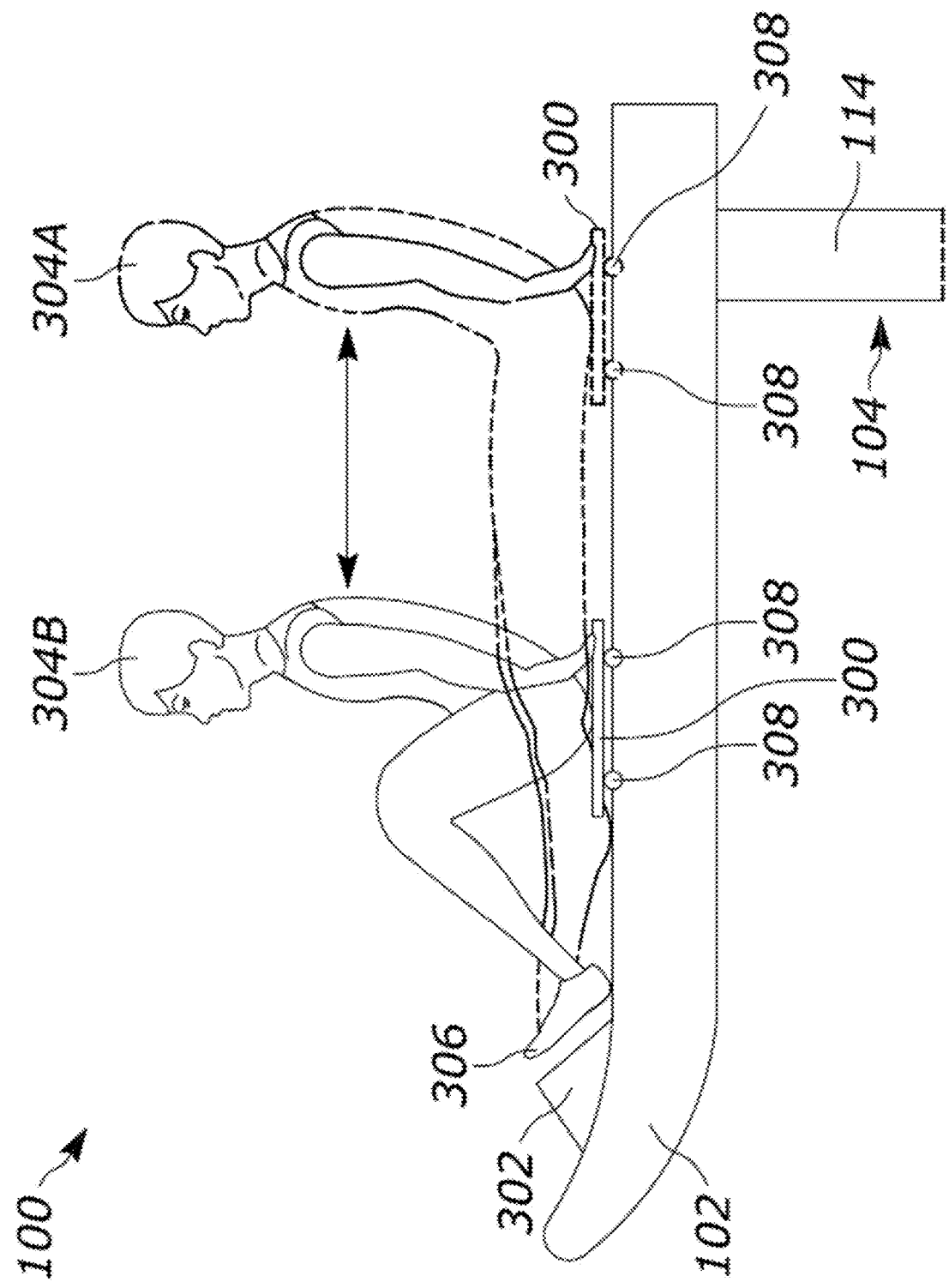
FIG. 8A is a side schematic view of the hydrofoiling watercraft of FIG. 1A including a movable portion according to a first embodiment.
Figure 8B:
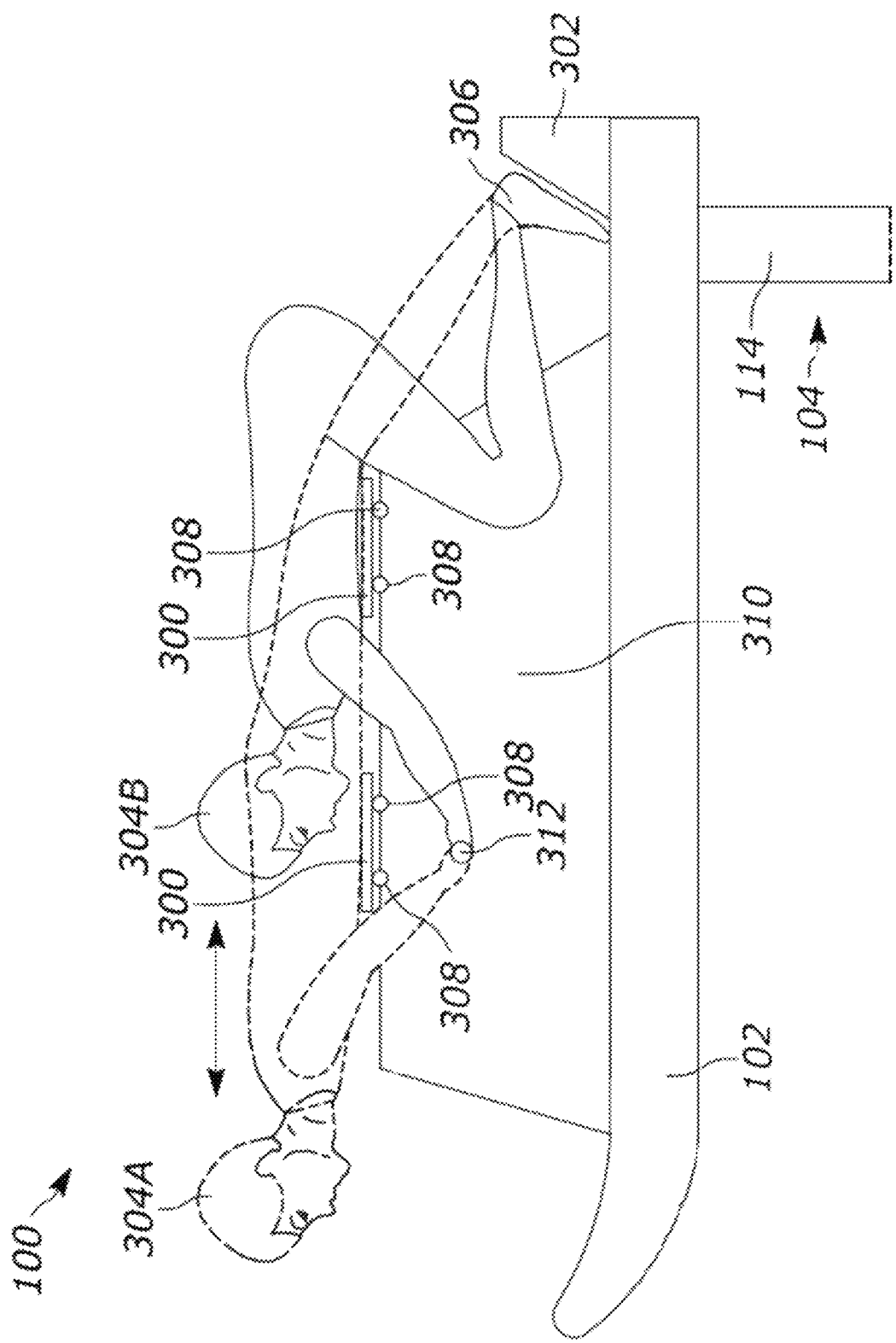
FIG. 8B is a side schematic view of the hydrofoiling watercraft of FIG. 1A including a movable portion according to a second embodiment.

With respect to FIG. 8A-B, the hydrofoiling watercraft 100 is shown according to another embodiment. This hydrofoiling watercraft 100 provides a rider with a sliding plate 300 on the board 102 which the rider can use to slide along the board 102 to shift their weight to adjust the center of gravity of the board and/or to steer the watercraft 100. In each of the embodiments described below, the watercraft 100 includes a fixed portion (e.g., the board, strut) and a movable portion (e.g., a slide plate, seat, saddle) that is able to move relative to fixed portion. The rider may sit, kneel, or lay on the movable portion and place a substantial portion of their weight on the movable portion. The rider may user their arms and/or legs to engage the fixed portion of the watercraft 100 to move the movable portion relative to the fixed portion to shift their weight relative to the fixed portion and adjust the center of gravity of the watercraft 100 during operation of the watercraft. With respect to FIG. 8A, the hydrofoiling watercraft 100 includes the board 102, hydrofoil 104, a sliding plate 300, and a pushing block 302. The sliding plate 300 is the movable portion that is movable relative to other portions of the watercraft 100. In the embodiment shown in FIG. 8A, the sliding plate 300 may serve as a seat on which the rider 304 sits, similar to a rowing seat. The plate 300 may be sized and shaped for a rider 304 to sit on. In some forms, the plate 300 includes padding to reduce the soreness of the rider when sitting on the plate 300 for extended periods of time.

The rider may position their feet 306 to rest against and engage the pushing block 302. The pushing block 302 may include a layer disposed thereon to increase the friction of the surface the rider engages with their feet to prevent the rider's feet from slipping. This layer may be formed of rubber or a non-slip grip pad. The position of the pushing block 302 may be adjustable to accommodate riders of varying heights. As shown, the sliding plate 300 may move longitudinally along the board 102 allowing the rider 304 to shift their weight between the front (shown by rider 304B) and rear (shown by rider 304A) of the watercraft 100. For example, the rider 304 may extend their legs as shown by rider 304A, pushing off the pushing block 302 with their feet 306 to slide the sliding plate 300 toward the rear of the board 102. This causes the weight of the rider 304 to shift toward the rear of the board 102 which changes the center of gravity of the watercraft 100 toward the rear of the watercraft 100. To shift their weight toward the front of the board 102, the rider 304 may bend their legs 304 as shown by rider 304B to allow themselves to slide toward the front of the board 102 on the sliding plate 300. In some forms, the board 102 may include a handle the rider 304 may grab to pull themselves forward. By sliding along the length of the board 102, the rider 304 is able to finely and easily adjust the center of gravity of the watercraft 100.

The sliding plate 300 may be a seat on which the rider 304 sits on the watercraft 100. The board 102 may include a track or rails extending along the length of the board 102 that guide the sliding plate 300 as it slides along the board 102. The plate 300 may include wheels or rollers 308 that engage the track or rails of the board 102. The rails may be a channel into which wheels 308 of the sliding plate 300 extend into. The channel may guide the wheels 308 of the sliding plate 300 longitudinally as the plate 300 slides along the board 102. In some embodiments, the sliding plate 300 includes one or more low friction feet or skis on which the sliding plate 300 slides along the channel or a track. The one or more feet or skis may be positioned within the guide channel to guide the sliding plate 300 as it moves along the board 102. In some forms, the rails are below the top surface of the deck 108 and set within the board 102. In the embodiment shown, the plate 300 slides slightly above the surface of the deck 108. In other embodiments, the top surface of the plate 300 may be flush with the deck 108. In yet other embodiments, the plate 300 may be elevated from the deck 108. For example, the plate may be elevated in the range of about two to about 12 inches off the board 102.

In some embodiments, the plate 300 includes two or more sets of wheel assemblies similar to those of a roller coaster. Each wheel assembly includes three wheels that engage a rail of the board 102, such as a rod, bar, or tube. Each wheel assembly may include a top wheel that engages the top side of the rail, a bottom wheel that engages the bottom side of the rail, and a side wheel that engages the inner or outer side of the rail. In still other embodiments, the plate 300 is coupled to a plurality of linear bearings that are configured to slide along the rails of the board 102.

The watercraft 100 may include one or more springs biasing (e.g., pulling) the plate toward the front of the board 102. This keeps tension on the plate 300 so that when the rider desires to shift their weight forward the spring pulls or aids in pulling the rider toward the pushing block 302. Additionally, this aids to ensure that the rider's feet are always engaging the pushing block 302 so that the rider is always able be in control of where their weight is shifted along the board. Thus, to shift their weight forward, a rider may only need to bend their knees and allow the plate 300 to slide forward due to the force of the springs. To slide toward the rear of the watercraft 100, the rider may extend their legs and push off the pushing block 302 to overcome the biasing force of the springs.

In some embodiments, the watercraft 100 includes a locking mechanism to lock the sliding plate 300 to a position on the board 102. For instance, if the rider desires to sit on the plate 300 but does not desire to slide along the length of the board 102, the rider may lock the plate 300 in place relative to the board 102. The locking mechanism may engage the rail, the board 102 or both to lock the plate 300 in place.

In some forms, the sliding plate 300 may have a longitudinal length sized to enable the rider 304 to lay down on the sliding plate 300 to operate the watercraft 100 when desired. The watercraft 100 may include a handle for the rider to grab at the rear and/or front of the watercraft 100 to enable the user to push and/or pull themselves to shift their weight and ride in various alternative positions.

With reference to FIG. 8B, another embodiment of a watercraft 100 having a sliding plate 300 is shown. In this embodiment, the pushing block 302 is at the rear end of the board 102. The board 102 further includes an elevated platform 310 extending upward from the deck 108 on which the plate 300 slides. The platform 310 may extend upward from the deck 108 about six inches to about 2 feet. The platform 310 may include the rails at the upper end that the sliding plate 300 slides along which may be similar to the rails and sliding assemblies described in detail above. In this embodiment, the rider 304 faces forward positioning their chest on the sliding platform and their feet on the pushing block 302. The platform 310 may include a handle 312 extending laterally from either side or both sides of the elevated platform 310 that a rider 304 may grip with their hands. To shift their weight forward, the rider pushes off the pushing block 302 by extending their legs as shown by rider 304A and/or pulls on the handles to slide their weight forward toward the front end of the watercraft 100. To shift their weight backward, the rider 304 bends their legs as shown by rider 304B and allows their body to slide toward the rear of the watercraft 100 on the sliding plate 300.

The sliding plate 300 may include wheels or linear bearings that slide along rails as described with regard to FIG. 8A. The sliding plate 300 may be locked at a certain position along the rails to stop the sliding plate 300 form moving relative to the board 102. One or more springs may bias (e.g., pull) the sliding plate 300 toward the rear of the watercraft 100 so that the rider can simply bend their legs and allow themselves to slide toward the rear of the watercraft 100 by, at least in part, the force of the springs.

Figure 8C:
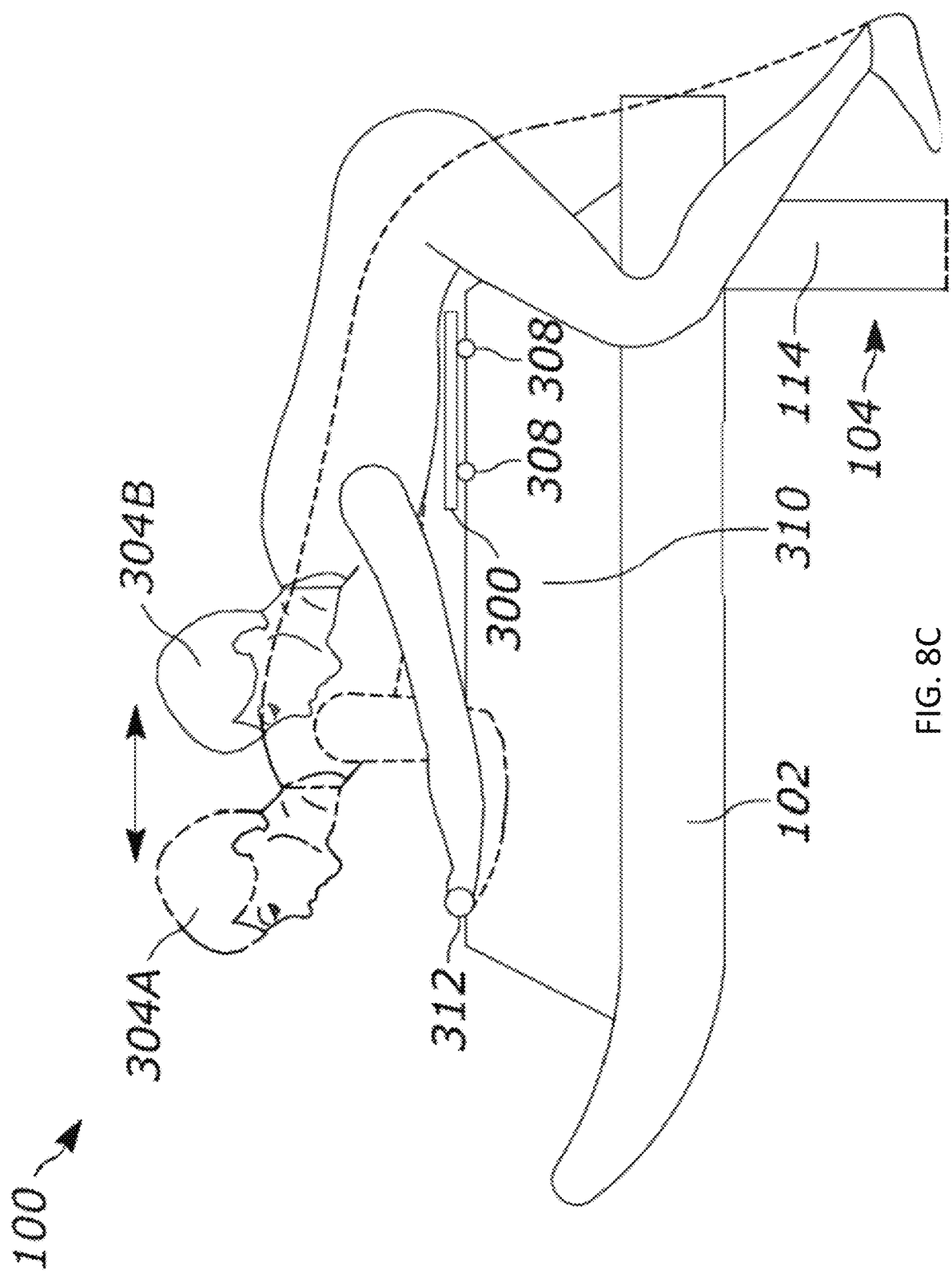
FIG. 8C is a side schematic view of the hydrofoiling watercraft of FIG. 1A including a movable portion according to a third embodiment.

With reference to FIG. 8C, another embodiment of a watercraft 100 having a sliding plate 300 is shown. Similar to the embodiment illustrated in FIG. 8B, the embodiment in FIG. 8C includes a platform upon which the plate 300 slides. In this embodiment, however the pushing block is absent and the user's legs are free to dangle off the sides of the watercraft. Further, in this embodiment, the handle 312 is fixed to the platform 310 or the board 102, allowing the operator to control balance with their arms. Any combination of the fixed portion 302 and handlebars 312 that are fixed or slidable may be used without departing from the spirit of the invention.

In addition or alternative to any of the embodiments described herein, the plate 300 may be able to slide laterally or side-to-side relative to the board 102. This may enable the rider to shift their weight from one side to the other to steer the hydrofoiling watercraft 100. For example, a rider may shift their weight to the left or right side of the board 102 to cause the board 102 to tilt and turn the watercraft in the direction the board 102 is tilting. In some embodiments, the board 300 includes rails that extend laterally. The plate 300 may include wheels or linear bearings that travel along the rails enabling the plate 300 to move laterally across the board 102 similar to rails facilitating longitudinal motion described above. Where the plate 300 is able to move longitudinally and laterally, the plate 300 may be mounted to a first set of rails extending laterally enabling the plate 300 to move laterally. The first set of rails may include wheels or linear bearings attached thereto that engage a second set of rails enabling the first set of rails to move longitudinally along the second set of rails. The plate 300 may thus move laterally and longitudinally relative to the board. In some forms, the plate 300 may include wheels configured to move in all directions (e.g., swivel caster wheels, spherical wheels, or the like) enabling the plate 300 to slide longitudinally and/or laterally relative to the board 102. The plate 300 may include a linkage coupling the plate 300 to the board 102 and preventing the plate 300 from moving substantially vertically relative to the board 102 or becoming detached.

In one form, the rails are arcuate or parabolic. The rails may extend substantially laterally across the board 102. As the rider slides the plate 300 left or right relative to the board 102, the plate 300 may follow the arcuate path of the rails. For example, as the user moves left of right of the center of the board 102 on the plate 300, the user moves slightly forward. This may enable the user to keep their feet planted against or anchored to the pushing block 302, with the remainder of their body pivoting about their feet/the pushing block 302. This ensures that the rider's feet remain in contact with the pushing block 302 so that the rider remains in control of the watercraft 100.

In yet another embodiment, the watercraft 100 may include a saddle or swing seat on which the rider sits during operation of the watercraft 100. The rider may straddle the saddle to sit thereon and place their feet on the top surface of the board 102. The watercraft 100 may include one or more posts at the front of the board 102 and one or more posts at the rear of the board 102 that support the saddle above the top surface of the board 102. The front end of the saddle may be coupled to the front post(s) and the rear end of the saddle may be coupled to the rear post(s) by linkage. The linkage may be flexible and/or elastic to allow the rider to move the saddle longitudinally and laterally relative to the board 102. For example, the linkage may be a rope, elastic cord (e.g., a bungee cord) or chains. In other forms, the linkage includes a rigid bar that attaches to a post and the saddle to form a joint enabling the bar to move or pivot relative to the post and/or saddle. Thus during operation, the rider may sit on the saddle and shift their weight longitudinally (e.g., forward and backward) and/or laterally (e.g., left and right) relative to the board 102. The rider may user their feet that rest on the board 102 to push off the board and shift their weight in a direction relative to the board 102 to adjust the center of gravity of the board 102.

With respect to FIGS. 9A-13B, a remote controller 400 according to another embodiment is provided.

Figure 9A:
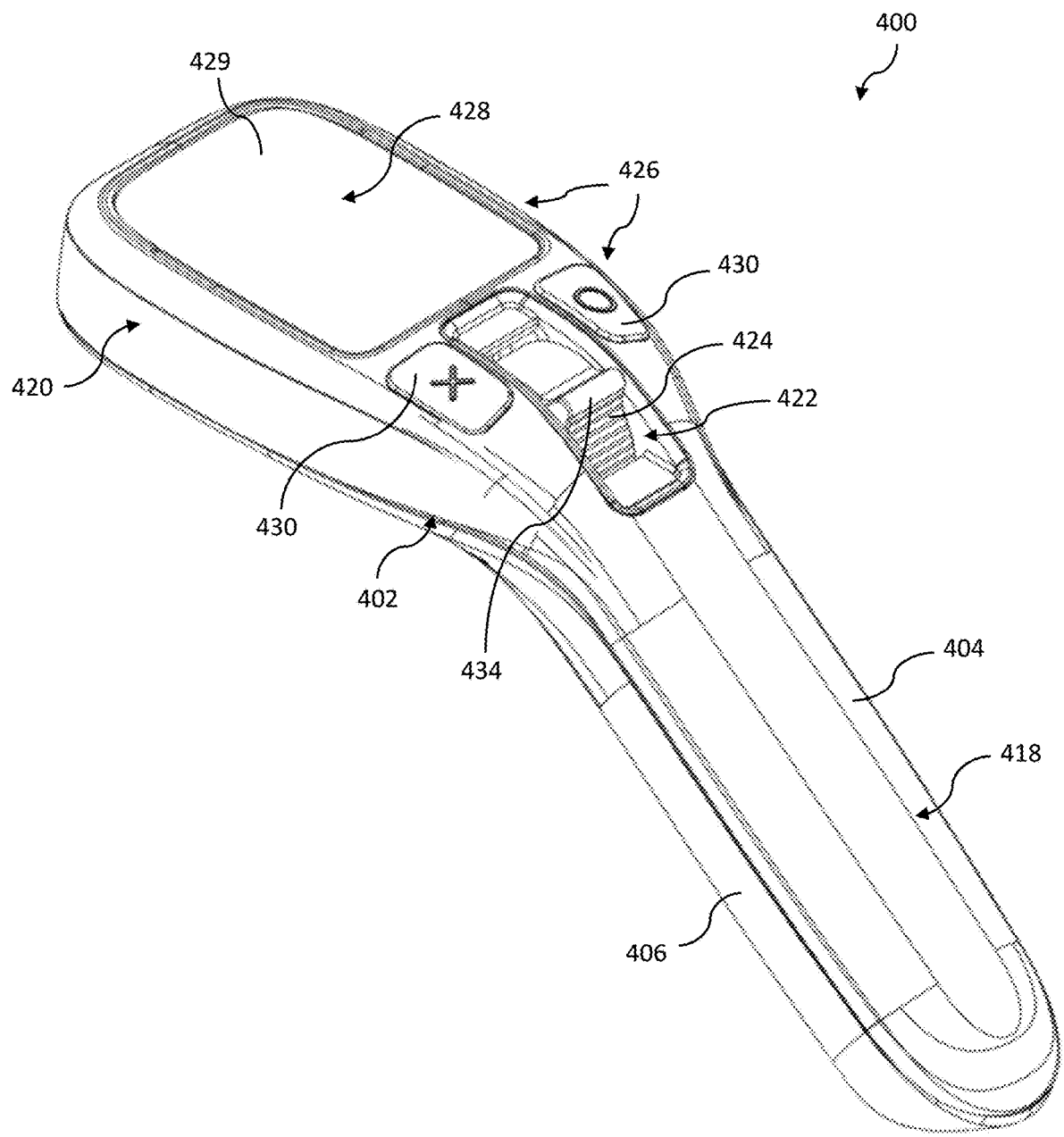
FIGS. 9A-9C are top perspective, top plan, and side elevational views, respectively, of a wireless controller for controlling the operation of the hydrofoiling watercraft of FIG. 1A according to a third embodiment.
Figure 9B:
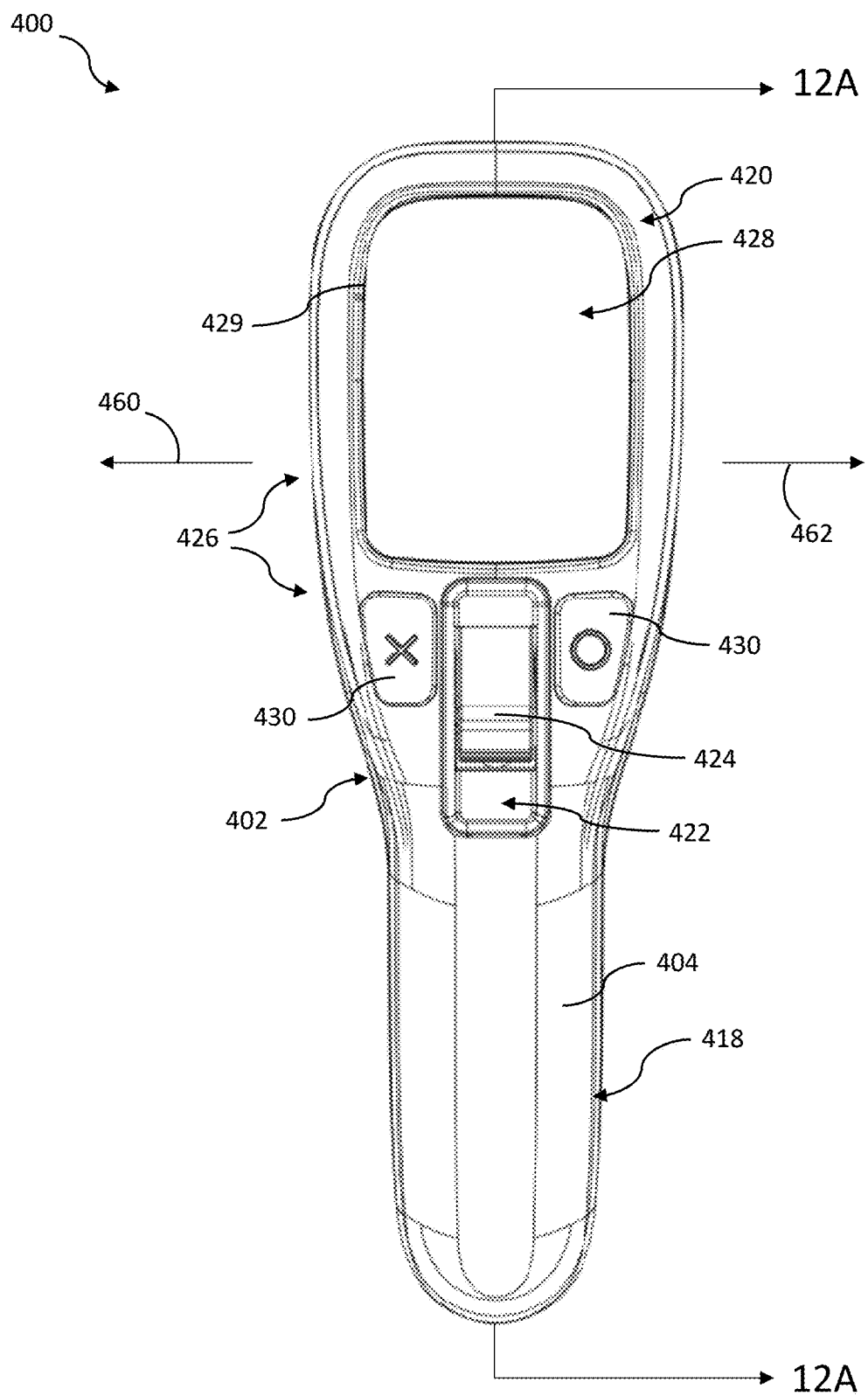
Figure 9C:
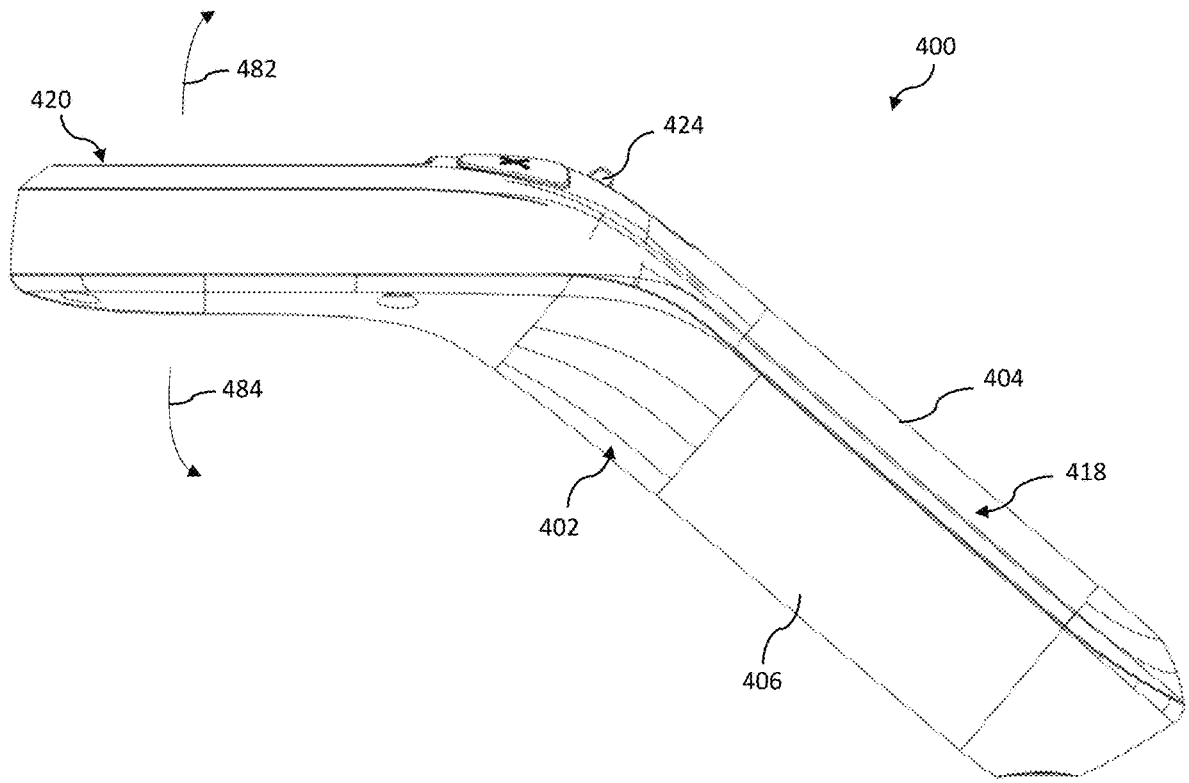

With reference to FIGS. 9A-9C, the remote controller 400 includes a housing 402 including an upper portion 404 and a lower portion 406 that are joined together to form a watertight cavity 408 (see FIG. 12A) within the housing 400. The housing 402 includes a gripping portion or handle 418, a display portion 420, and a recess 422 for receiving a throttle control mechanism or thumbwheel 424. The handle 418 is an elongate portion of the housing 402 defining a longitudinal axis of the remote controller 400 that the user may grasp with their hand such that their thumb is positioned proximate the thumbwheel 424. The user may then move or rotate the thumbwheel 424 with their thumb while gripping the handle 418. The display portion 420 extends from the handle 418 at an angle (e.g., an obtuse angle) and includes the user interface 426.

The user interface 426 includes a display screen 428 for displaying a graphical user interface (GUI) and input buttons 430 that a user may press to make selections and navigate through the screens displayed on the display screen 428. The display screen 428 is bonded to a clear overlay 429 that protects the display screen 428 from damage while permitting a user to view the display screen 428 through the clear overlay 429. The display screen 428 may be bonded to the clear overlay 429 such that no air or fluid is able to get in between the display screen 428 and the clear overlay 429 which aids to ensure the display screen 428 does not fog up or otherwise have condensation build up below the overlay 429 that would obscure the display screen 428. The clear overlay 429 may be made of a polycarbonate or tempered glass material as examples. The user interface 426 may also include a speaker for providing information and alerts audibly to the user. The user interface 426 may also include a microphone for receiving voice commands from the user.

Figure 10A:
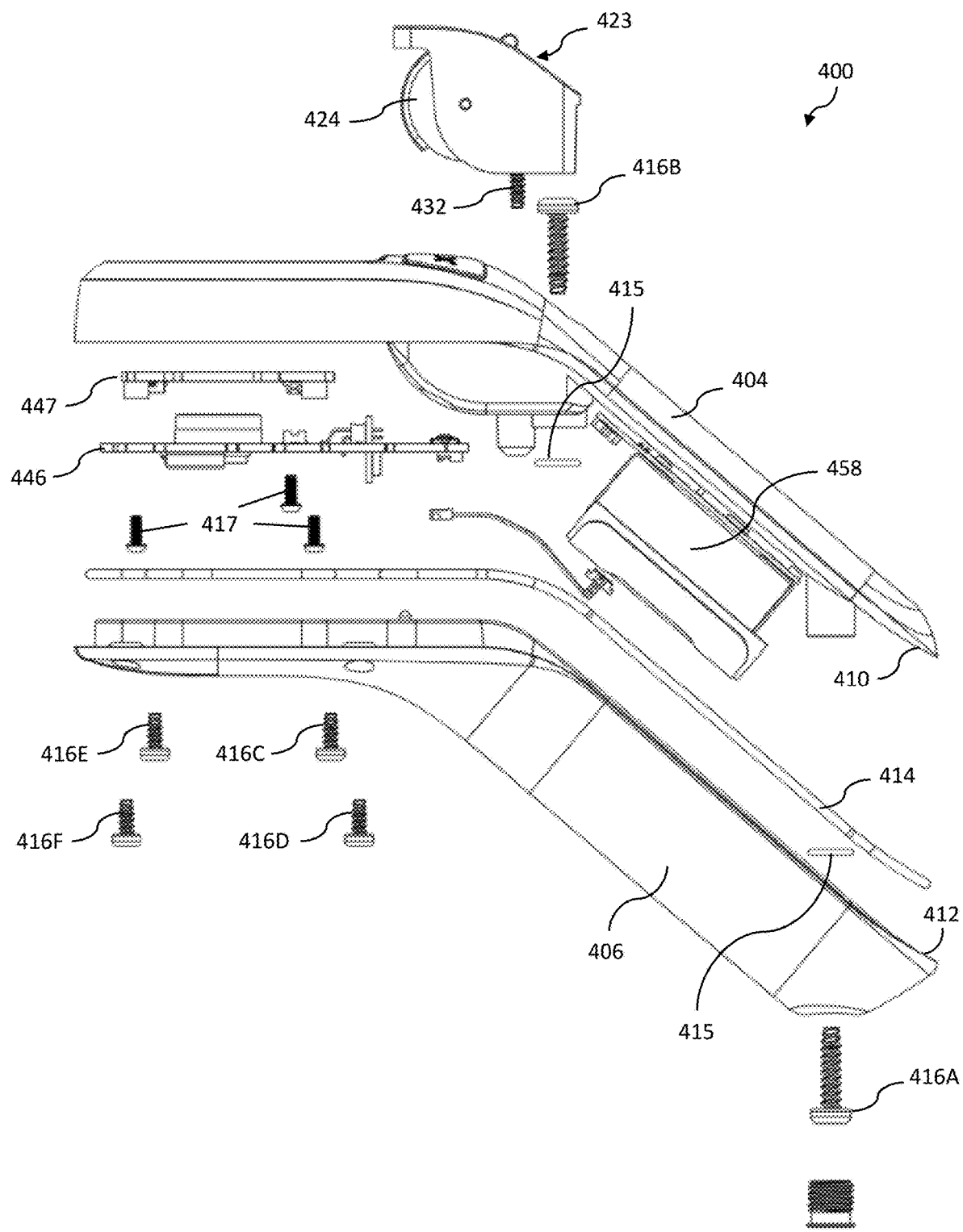
FIG. 10A is an exploded, side elevational view of the wireless controller of FIG. 9A.
Figure 10B:
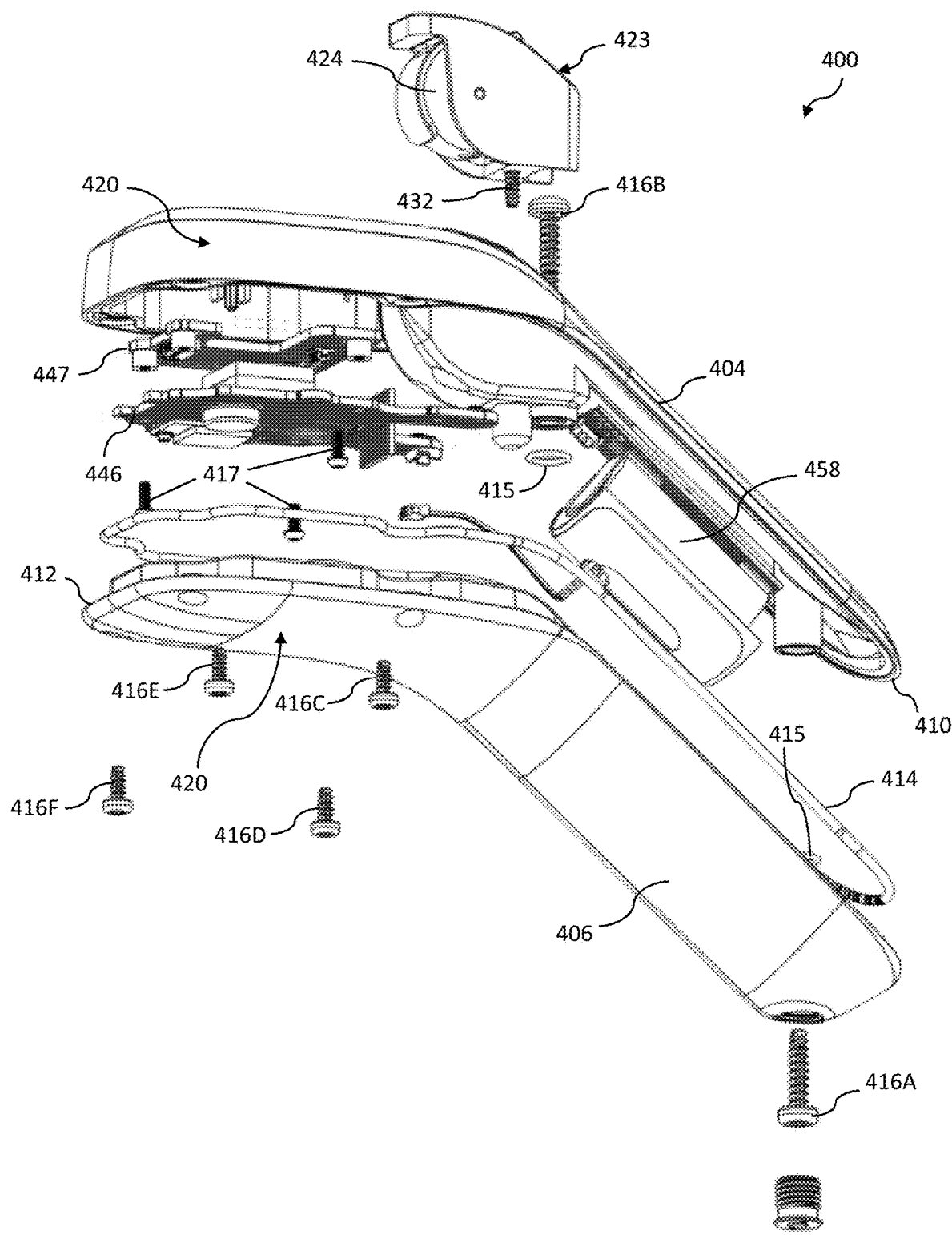
FIG. 10B is an exploded, bottom perspective view of the wireless controller of FIG. 9A.

The recess 422 of the housing 402 is sized to receive the thumbwheel 424, which may be enclosed in a thumbwheel module 423 (as illustrated in FIGS. 10A-10B). The thumbwheel 424 is attached to the housing 402 outside of the sealed cavity 408. The thumbwheel 424 is substantially cylindrical and has a substantially circular cross-section (see FIGS. 12A-B). The thumbwheel 424 includes a protrusion 434 extending radially outward that the user may engage and use as a lever to rotate the thumbwheel 424 about its axis. The thumbwheel 424 is configured to be rotated approximately a quarter turn, or 70-100 degrees in preferred embodiments, about its axis. In other forms, the thumbwheel 424 may be configured to be rotated through a different range of angles. The axis of the thumbwheel 424 may extend perpendicular to the longitudinal axis of the housing 402. The protrusion 434 may be moved substantially along the longitudinal axis of the housing 402, e.g., the protrusion 434 may be moved toward the front of the housing 402 and toward the rear of the housing 402. In some embodiments, the thumbwheel 434 is configured to slide along its rotational axis or move laterally relative (e.g., in the direction of arrows 460, 462 of FIG. 9B) to the longitudinal axis of the housing 402 to receive an input from a user.

With reference to FIGS. 10A and 10B, the upper portion 404 and the lower portion are assembled using a series of screws 416. A thumbwheel module 423 is affixed within the recess 422 of the upper portion 404, using the screw 432. the display screen 428 of the user interface 426 may be electrically connected to a first circuit board 447 that is stacked on the second circuit board 446 within the display portion 420 of the housing 402. By stacking the circuit boards 446, 447, the length and width of the circuit boards 446, 447 may be reduced enabling the size of the cavity 408 for housing these electronic components to be reduced. Additionally, because the display screen is connected to a separate circuit board 447, the display screen 428 may be bonded to the clear overlay 429 as described above and then later connected to the second circuit board 446 during assembly. The circuit board 446 may include the IMU 454 and the processor 448. Further, the circuit board 446 may be rigidly mounted to the upper portion, e.g., using screws 417, such that it is contact with the housing 402 of the remote controller 400 to better conduct vibrations to the IMU 454 (e.g., for fall detection). The circuit board 446 may further include a vibration motor for providing haptic feedback to the user through the remote controller. The remote controller 400 may also include a pressure sensor that monitors the pressure within the sealed cavity 408 and/or the pressure about the remote controller 400, for example, for detecting when the remote controller 400 is under water. In some forms, the pressure sensor is within the sealed cavity 408 and monitors the change in pressure within the sealed cavity 408 caused by compression of the housing 402 from being under water or caused by a user gripping the remote controller 400. In some forms, the pressure sensor is positioned on the outside of the housing 402 or exposed to the outside of the housing 402 for sensing the ambient pressure. As one example, the housing of the remote controller 400 may include a throughole extending through the housing 400 to the pressure sensor mounted within the housing 402. If the remote controller 400 detects it is under water, the remote controller 400 may cease communicating throttle control signals or may communicate the throttle control signals along with an error flag.

A seal 414 (e.g., an O-ring) is positioned between a peripheral edge 410 of the upper portion 404 and a peripheral edge 412 of the lower portion 406 to seal the interface between the upper and lower portions 404, 406 and inhibit water and debris from entering the housing 402 when the upper and lower portions 404, 406 are joined together. O-rings 415 may be used to seal bosses that receive screws, e.g., screws 416A and 416B. Moreover, the seal 414 traps air within the cavity 408 (see FIG. 12A) and prevents the air from escaping the remote controller 400, for example, when the remote is under water. The cavity 408 of the remote controller 400 is sized such that the volume of the cavity 408 that is not occupied by components of the remote controller 400 is sufficiently large such that the remote controller 400 is buoyant in fresh and salt water due to the volume of air within the housing 402. The peripheral edge 410 of the upper portion and/or the peripheral edge 412 of the lower portion 406 may include a groove for receiving the seal 414 therein. Fasteners 416 may be extended into the upper and lower portions 404, 406 to secure the upper portion 404 to the lower portion 406 and to draw the upper portion 404 toward the lower portion 406 to clamp the seal 414 therebetween. The upper and lower portions 404, 406 may be formed of a rigid, plastic material. The upper portion 404 and/or the lower portion 406 may include a rubber overlay or a rubber layer (or hydrophobic material) disposed over the plastic layer on the outer surface of the housing 402. The plastic layer of the upper portion 404 may include openings through which a user may access and press buttons 430 by pressing on the rubber overlay extending over the openings in the plastic layer.

The electronic components of the remote controller 400 are powered by the battery 458. The battery 458 is disposed within the cavity of the housing 408. The battery 458 is preferably positioned within the handle 418 of the remote controller 400. By placing the battery 458 in the handle of the remote controller 400, a substantial portion of the weight of the remote controller 400, for example, more than half of the weight of the remote controller 400, is positioned within the portion of the remote controller 400 held by the user. Reducing the weight of the remote controller 400 that is distal from the user's hand may make the remote controller 400 feel more balanced within the user's hand and easier to hold onto for long periods of time. For example, the torque on the user's hand due to the weight of the remote controller 400 in the display portion 420 is reduced, which may reduce the fatigue a user experiences when holding the remote controller 400. The remote controller 400 may include charging coil within the cavity 408 enabling the battery 458 to be charged wirelessly similar to the embodiments of FIGS. 6A-B discussed above. Because the remote controller 400 may be wirelessly charged, the remote controller 400 does not need a charging port or cables that extend through the housing 402 and into the sealed cavity 408. This eliminates another potential opening through which water and debris could potentially enter the housing 402.

Figure 12A:
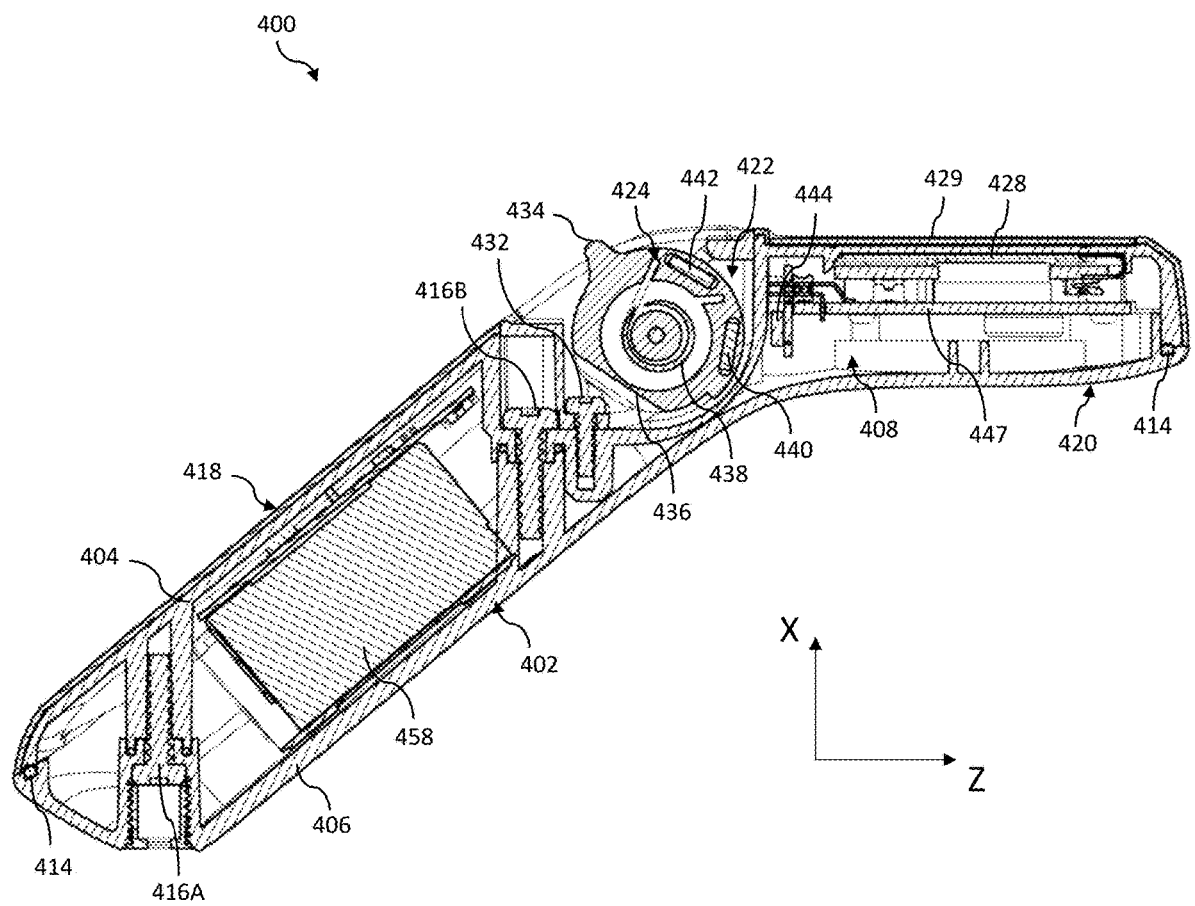
FIG. 12A is a cross-sectional view of the wireless controller of FIG. 9A taken along lines 12A-12A of FIG. 9B.
Figure 12B:
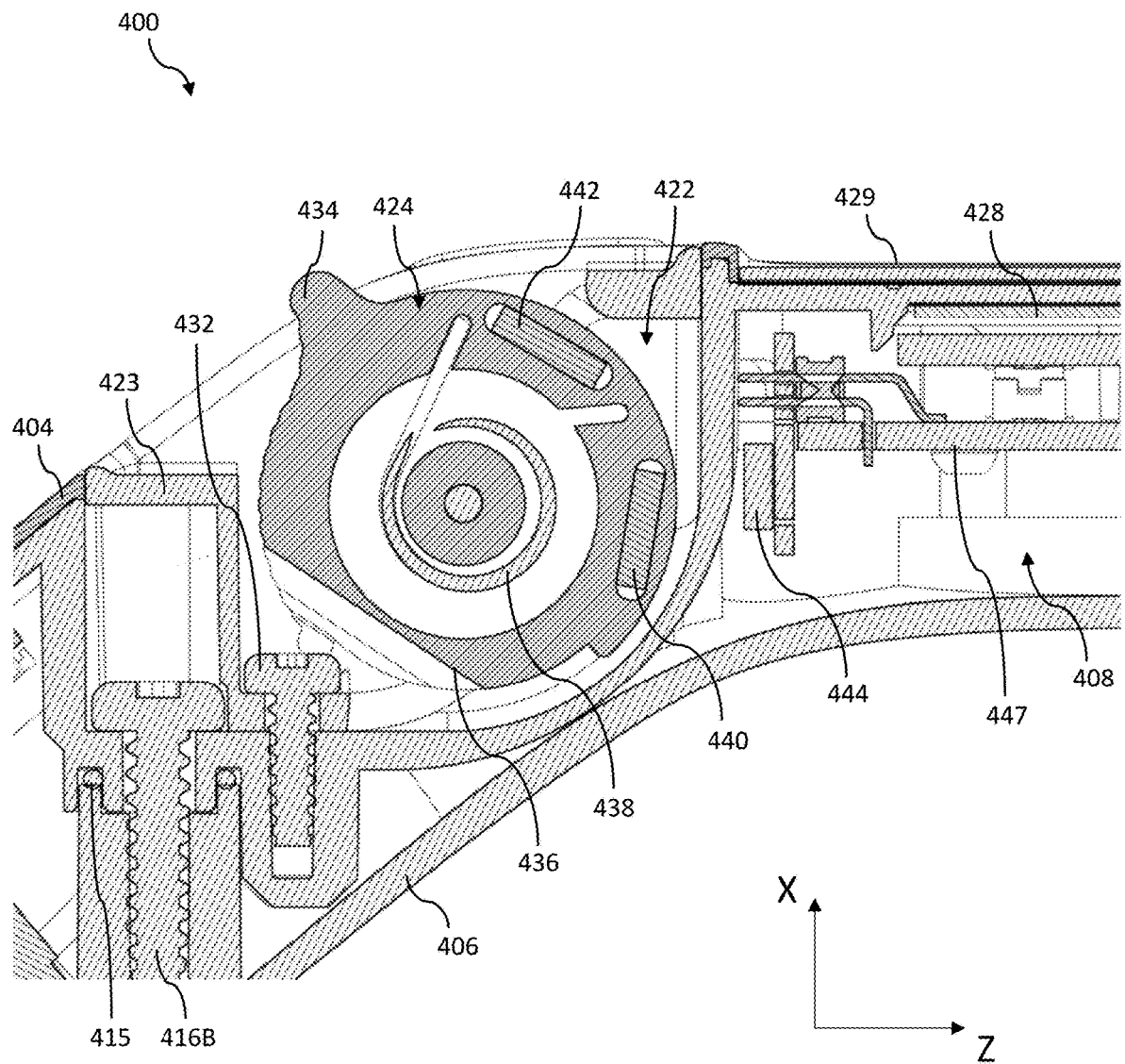
FIG. 12B is a closeup view of a portion the cross-section of the wireless controller shown in FIG. 12A.

With reference now to FIGS. 12A and 12B, the assembled controller 400 is shown in cutaway view to illustrate how the components fit together. As shown, the o-ring 414 seals the upper portion 404 and the lower portion 406. A thumbwheel module 423 installs within the recess 422 in the upper portion 404. The thumbwheel 424 further includes magnets 440, 442 that interact with a hall effect sensor 444 mounted on a circuit board 446 within the cavity 408 of the housing 402. In the embodiment shown in FIGS. 12A-B, the magnets 440, 442 are mounted or positioned in cavities at the outer edge of the thumbwheel 424 such that the magnets 440, 442 are positioned proximate the wall of the recess 422 of the housing 402. The first magnet 440 is mounted approximately perpendicular to the second magnet 442. The first magnet 440 is spaced apart about the thumbwheel 424 from the second magnet 442 about a quarter of the way around the thumbwheel 424 such that the first magnet 440 is proximate the hall effect sensor in the resting position (see FIG. 13A) and the second magnet 442 is proximate the hall effect sensor 444 in the full throttle position (see FIG. 13B). In some forms, the magnetic pole of the first magnet 440 facing radially outward of the thumbwheel 424 is opposite of the magnetic pole of the second magnet 442 that is facing radially outward of the thumbwheel 424. For example, the north pole of the first magnet 440 faces radially outward and the north pole of the second magnet 442 faces radially inward or vice versa. This create a greater change in the magnitude and direction of the magnetic flux as the thumbwheel 424 is rotated between the resting position and full throttle position which may aid in determining the orientation of the thumbwheel 424. In another form, the magnetic pole of the first magnet 440 facing radially outward of the thumbwheel 424 is the same as the magnetic pole of the second magnet 442 that is facing radially outward of the thumbwheel 424. In still other forms, a single magnet may be used.

The thumbwheel module 423 includes a spring 438 that biases the thumbwheel 424 away from a "full throttle" position with the protrusion 434 at a forward position as shown in FIG. 12B toward a "resting" or "off" position with the protrusion 434 at a rearward position as shown in FIG. 12A. The user may rotate the thumbwheel 424 by applying a force to overcome the biasing force of the spring 438 to move the thumbwheel 424 from the resting position. When the user releases the thumbwheel 424 (or applies a force less than that of the spring 438), the spring 438 rotates the thumbwheel 424 back toward the resting position. The spring 438 may be housed within the thumbwheel 424 such that it is protected from the elements.

The Hall effect sensor 444 may be positioned proximate the wall of the recess 422 to detect the magnetic flux of the magnets 440, 442. As the thumbwheel 424 is rotated between the resting and full throttle positions, the orientation of thumbwheel 424 and the orientation of the magnets 440, 442 relative to the hall effect sensor 444 changes. The change in orientation of the magnets 440, 442 changes the magnetic flux detected by the hall effect sensor 444. The hall effect sensor 444 may be a three-dimensional hall effect sensor or magnetometer configured to detect the magnetic flux in three directions. The change in magnetic flux is processed via a processor 448 using algorithms and programs stored in memory 450 to determine the orientation of the thumbwheel 424 and to generate a throttle control output to send to the watercraft via the communication circuitry 452. For instance, when the thumbwheel 424 is in the resting position the processor 448 may determine the thumbwheel is rotated 0 degrees and send a signal to the watercraft that no throttle input is received. When the thumbwheel is in the full throttle position, the processor 448 may determine the thumbwheel is rotated 80 degrees and send a signal to the watercraft of indicating that a high throttle input has been received from the user. The processing of the magnetic flux detected by the hall effect sensor 444 is described in further detail below.

The hall effect sensor 444 is configured to detect the magnetic flux of the magnets 440, 442 of the thumbwheel 424. The processor 448 receives the magnetic flux data generated by the hall effect sensor 444. The processor 448 may be configured to process the magnetic flux data to determine the orientation of the thumbwheel 424 and to generate a throttle value to send to the watercraft 100. As described above, the hall effect sensor 444 is positioned within the cavity 408 of the housing 402 near the recess 422 in which the thumbwheel 424 is positioned. The hall effect sensor 444 may be a two-axis or a three-axis hall effect sensor that is configured to detect the magnitude of the magnetic flux in two or three directions. For example, the hall effect sensor 444 may detect the strength of the magnetic flux in the X-axis, Y-axis (coming out of the page), and/or Z-axis (see FIGS. 12A-13B). The processor 438 may determine the angle of the magnetic flux of the magnets 440, 442 at the hall effect sensor 444 to determine the physical orientation or angular position (e.g., 0-80 degree rotation in the embodiment shown) of the thumbwheel 424 relative to the housing 402. The processor 438 may be configured to determine the angle of the magnetic flux based on the magnitude of the flux in two or three dimensions. Because the thumbwheel 438 rotates about an axis that is parallel to the Y-axis, the thumbwheel 424 rotates primarily in the XZ plane. The magnets 440, 442 are also aligned in the XZ plane and rotate primarily within the XZ plane as the thumbwheel 424 rotates. The processor 438 may thus determine the angular position of the thumbwheel 424 by detecting the angle of the magnetic flux in the XZ plane. Where the polarity of the magnets 440, 442 facing radially outward of the thumbwheel 424 are opposite one another, rotating the thumbwheel about 90 degrees (the range of motion of the thumbwheel in the embodiment shown) results in a change in angle of the magnetic flux of about 180 degrees. For example, where the south pole of the first magnet 440 faces radially outward and the north pole of the second magnet 442 faces radially outward, by rotating the thumbwheel from the resting position of FIG. 13A to the full throttle position of FIG. 13B, the direction of the magnetic flux at the hall effect sensor 444 is reversed due to the polarity change of the magnet proximate the hall effect sensor 444. The angle of the magnetic flux in the XZ plane may be calculated using the function a tan 2(X, Z) as will be described in further detail below.

Figure 13A:
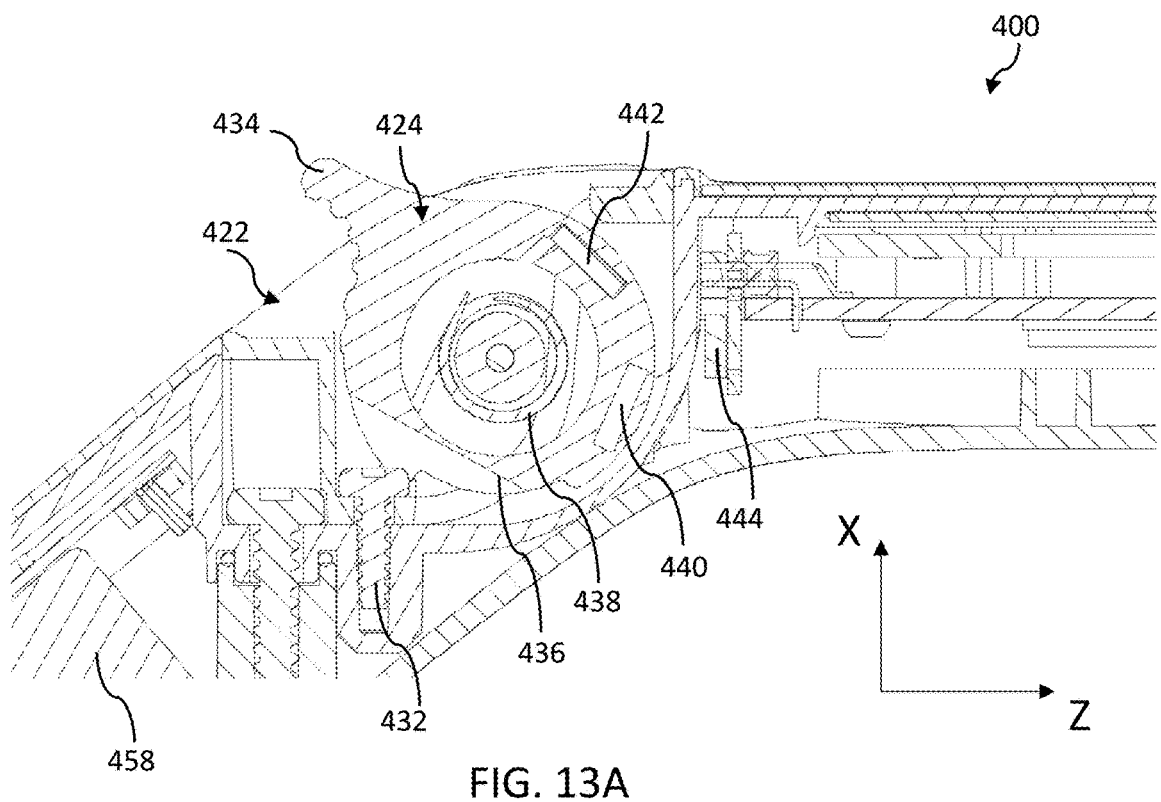
FIG. 13A is a cross-section view of a wireless controller similar to that of FIG. 9A shown with a thumbwheel rotated to a first position.
Figure 13B:
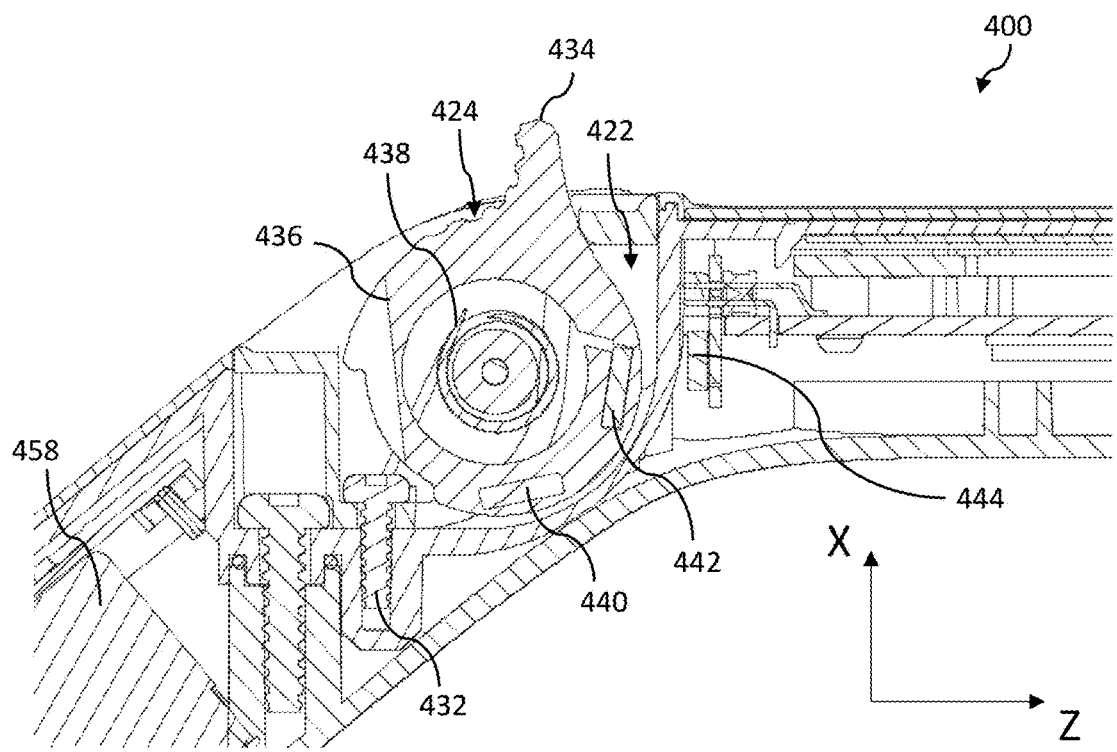
FIG. 13B is a cross-section view of the wireless controller of FIG. 12A shown with the thumbweel rotated to a second position.

FIGS. 13A and 13B illustrate the thumbwheel in the resting position and the full throttle position, respectively. In the embodiment shown, the thumbwheel 424 includes a flat side 436 (see FIG. 12B) that enables access to the fastener 432 (e.g., screw) that secures the thumbwheel to the housing 402. The thumbwheel 424 may be removably attached to the housing 402 by a single fastener 432 to permit the thumbwheel 424 to be quickly removed and/or replaced. For example, if the thumbwheel 424 becomes damaged or debris enters the recess 422 or the thumbwheel 424, the thumbwheel may quickly be replaced by removing the fastener 432 to detach the thumbwheel 424 from the housing 402. To remove the thumbwheel 424, the thumbwheel 424 is rotated toward a "full throttle" position (see FIG. 13B) until the flat side 436 of the thumbwheel 424 creates a channel between the thumbwheel 424 and the wall forming the recess 422 of the housing thereby provides access to the fastener 432. A tool (e.g., a screwdriver) may then be extended into the channel to remove the faster 432. The thumbwheel 424 may then be withdrawn from the recess 422. When the thumbwheel 424 is removed, the recess 422 may be cleaned of any debris that may have entered the recess 422. The thumbwheel 424 or a replacement thumbwheel may be inserted into the recess 422 and secured to the housing 402 by the fastener 432 upon rotating the thumbwheel toward the full throttle position to create the access channel between the thumbwheel and the wall forming the recess 422. The user may then use the thumbwheel to provide a throttle input to their watercraft or other motor driven device. The thumbwheel 424 is able to be attached and detached from the remainder of the remote controller 400 without opening the housing 402 or removing the seal 414. Thus, the thumbwheel 424 is able to be removed and/or replaced without exposing the components within the cavity 408 of the remote controller 400 to water and/or debris.

Figure 11:
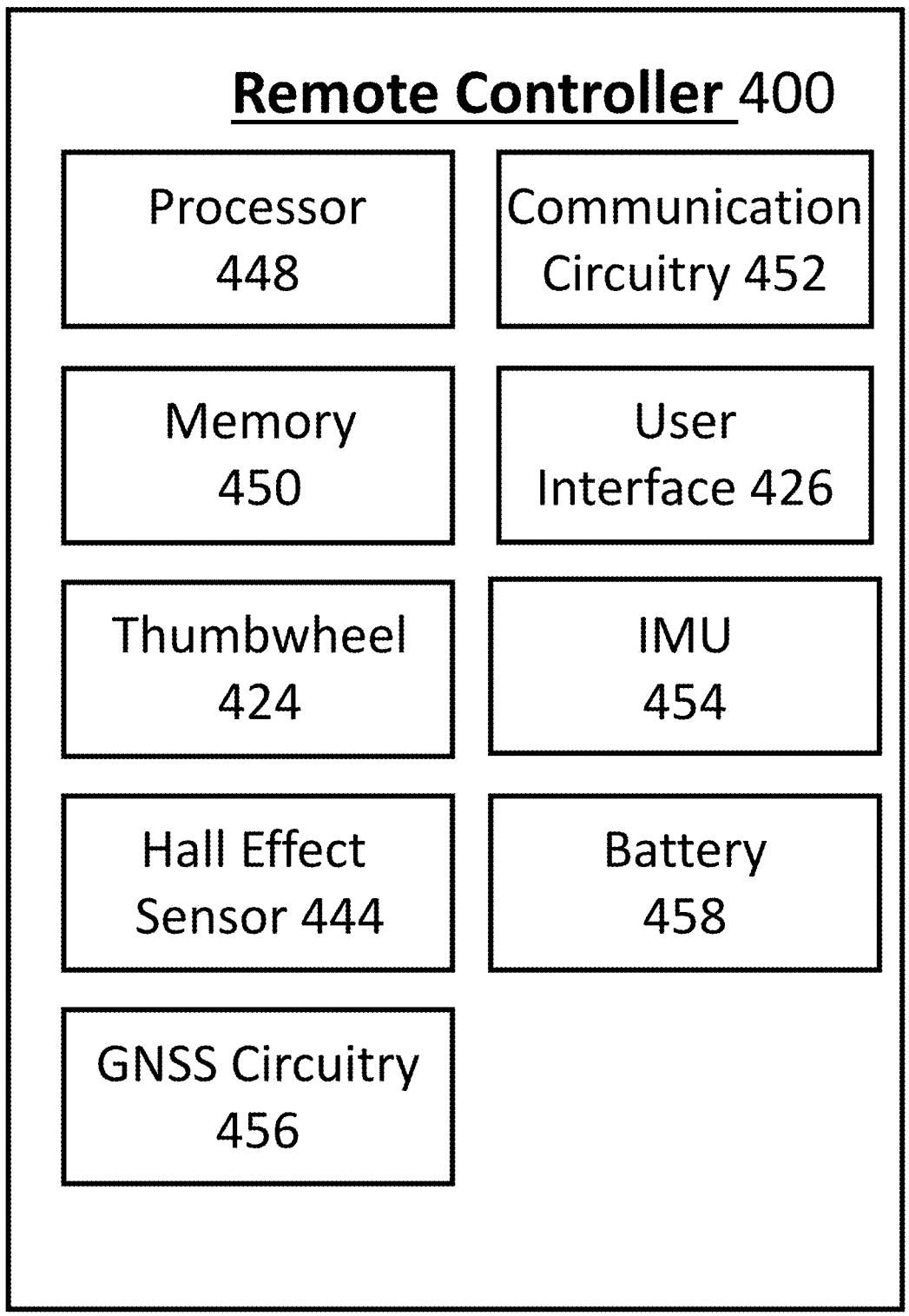
FIG. 11 is a block diagram of the wireless controller of FIG. 9A.

With respect to FIG. 11, the remote controller 400 includes a processor 448 that is communicatively coupled to the memory 450, the communication circuitry 452, the user interface 426, the hall effect sensor 444, the inertial measurement unit (IMU) 454, the GNSS circuitry 456, and the battery 458. The processor 448, memory 450, communication circuitry 452, the hall effect sensor 444, the IMU 454, and the GNSS circuitry 456 may be mounted to the circuit board 446 within the cavity 408 of the housing 402.

The memory 450 stores programs, settings, and data accessible by the processor 448 to provide functionality to the remote controller 400 including communicating with remote devices, presenting information to the user, receiving user input, and processing data received from the sensors of the remote controller 400. The processor 448 is operatively coupled to the communication circuitry 452 such that the processor 448 is able to communicate with remote devices via the communication circuitry 452. The communication circuitry 452 is configured to communicate via one or more wireless protocols such as Bluetooth, cellular, Wi-Fi, Zigbee and the like. The communication circuitry 452 enables the remote control to communicate with a computer of the watercraft. For example, the processor 448 of the remote controller 400 is able to communicate throttle control signals to the watercraft 100 via the communication circuitry 452 to operate the watercraft. The processor 448 may communicate other information to the watercraft and receive other information and data from the watercraft 100 via the communication circuitry 452. For example, the remote controller 400 may receive watercraft battery charge information, error messages, user rider profile information, location information, and speed information from the watercraft 100. The processor 448 of the remote controller 400 may receive this information and store it in memory 450 and/or display it to the user via the user interface. The remote controller 400 may similarly send information to the watercraft 100 such as throttle input data, remote controller battery 458 charge information, location data (e.g., determined using the GNSS circuitry 456), speed data and the like.

The processor 448 may determine the location of the remote controller 400 via the signals received by the GNSS circuitry 456. The processor 448 may further monitor the determined location of the remote controller 400 over time to determine the speed of the remote controller 400 and/or track the path the user takes with the watercraft (e.g., to determine a total distance traveled in a trip). The processor 448 may communicate the determined location of the remote controller 400 to the watercraft 100 for a comparison of the location between the remote controller 400 and the watercraft 100. If the distance between the watercraft 100 and the remote controller exceeds a predetermined distance, the watercraft 100 may determine the user is not on the watercraft 100 (or perhaps has dropped or lost the controller 400) and may cease responding to control signals from the remote controller 400. In some embodiments, the watercraft 100 may be configured to autonomously travel toward the location of the remote controller 400 (e.g., upon input from the user at the remote controller 400) when the remote controller 400 is more than a predetermined distance away from the user. This reduces the distance a user may have to swim to get back to the watercraft 100 where the user falls off the watercraft 100 and, for example, the watercraft 100 is being swept away by waves and/or a current. The watercraft 100 may similarly determine that a user is no longer on the watercraft 100 when the watercraft 100 is no longer in communication with the remote controller 400 or the signal strength of the wireless connection between the watercraft 100 and the remote controller 400 falls below a threshold (e.g., because the remote controller 400 is too far away from the watercraft 100). The remote controller 400 may be used similarly to a magleash in that once the signal strength between the remote controller and watercraft is too low, is lost, or indicates the remote controller is more than a predetermined distance from the watercraft 100, the watercraft 100 determines the user has fallen off the watercraft 100 or is no longer on the watercraft 100 and no longer responds to throttle control signals of the remote controller 400. In some forms, the watercraft 100 is configured such that the signals communicated by the watercraft 100 are directed upward from the deck of the watercraft 100 where the user is when riding the watercraft 100. The watercraft 100 may include a cavity 113 with walls formed of conductive material (e.g., carbon fiber) or other material that inhibits RF signals from traveling into or out of the cavity 113 from the sides and below the watercraft 100. Thus, the watercraft 100 may be configured to lose communication with the remote controller 400 when the remote controller 400 is not above the deck 108 of the watercraft 100.

The processor 448 may be configured to distinguish magnetic flux of the magnets 440, 442 of the thumbwheel 424 from magnetic interference caused by an external magnet or signal. In other words, the processor 448 may be configured to identify the magnetic interference and reject throttle control signals determined to be caused by an external magnet or source other than the thumbwheel. For example, the watercraft 100 may include magnets or otherwise emit magnetic flux. The hall effect sensor 444 may detect the magnetic flux from the watercraft when the remote controller 400 is brought into proximity with the watercraft 100. The processor 448 may identify the magnetic flux is caused by a magnet other than those of the thumbwheel 424 and reject the input as noise. Identifying magnetic flux from external sources as noise is advantageous because the remote controller 400 will not cause the watercraft to operate in response to these signals from external magnets. As described in further detail below, the magnetic interference is able to be identified in part by evaluating the magnitude of the magnetic flux and the angle of the magnetic flux in multiple dimensions. While the remote controller 400 shown includes a thumbwheel 424, those having skill in the art will readily appreciate that the methods and techniques disclosed herein for identifying and filtering out noise can readily be applied to remote controllers having other throttle input mechanisms, such as a trigger or a joystick. Those having skill in the art will further appreciate that while the remote controller 400 is disclosed as being used in the context of controlling a watercraft 100, the remote controller 400 may be adapted for uses with other motorized devices including electric jetboards, boats, trolling motors, electric skateboards, electric longboards, RC cars, drones. Moreover, while the remote controller 400 shown includes two magnets 440, 442, in other embodiments, the remote controller 400 may include a single magnet or three, four, or more magnets.

Example methods and steps for identifying magnetic interference and noise are presented with reference to FIGS. 14A-16. It should be understood that the values provided herein are provided merely as exemplary values. The flux magnitude values and flux angles produced by a throttle control mechanism with vary based on the type and structural configuration of throttle control mechanism. Persons having skill in the art will recognize the techniques demonstrated herein and how they can be broadly applied to other remote controllers having different types of throttle control mechanisms and configurations. As mentioned above, the processor 448 calculates the angle of the magnetic flux to determine the throttle input or orientation of the thumbwheel 424 rather than relying solely on a magnitude of the magnetic flux in one direction. Using the angle of the magnetic flux rather than the magnitude in a single dimension is advantageous because magnetic interference may more easily be identified. For instance, the processor 448 may identify an expected range of flux angles from known, valid throttle inputs from the thumbwheel 424 as it is rotated. An external magnet is less likely to produce the requisite flux angle at the hall effect sensor 444 than to simply produce a magnitude in a single direction. Moreover, because the angle of the flux from valid inputs progressively increase or decrease as the thumbwheel is rotated (e.g., moving the thumbwheel from 0 degrees to 90 degrees causes the flux angles to change progressively from 0 degrees to 180 degrees), by monitoring the angle of the magnetic flux over time, the processor 448 is able to determine whether the flux angles leading up to the currently measured flux angles are consistent with those generated by the thumbwheel. For instance, if a flux angle of 170 degrees is currently measured, but the previously measured flux angles are not, for example, 140, then 150, then 160, the processor 448 may determine the flux is generated by an external magnet and not the thumbwheel, and thus is not a valid throttle input. Alternatively or additionally, if the rate of change in the flux angle exceeds a predetermined limit, the processor 448 may determine the calculated angle is not a valid throttle input. Those having skill in the art will appreciate that measuring the angle of the flux generated by one or more magnets mounted to a trigger or other throttle control mechanism throughout its range of motion could similarly use the above approach to identify and filter out magnetic interference.

In another approach to distinguish magnetic interference from a valid throttle input of the thumbwheel 424, the processor 448 may compare the magnetic flux detected by the hall effect sensor 444 with stored data known to be associated with valid throttle inputs. For example, the memory 450 may include magnetic flux data captured by the hall effect sensor 444 as the thumbwheel is moved through its full range of motion. The processor 448 may compare data captured by the hall effect sensor 444 with the data of known valid throttle inputs, for example, evaluating the magnitude of the flux, the angle of the flux relative to the hall effect sensor, and the magnitude of the flux at the detected angle.

Figure 14A:
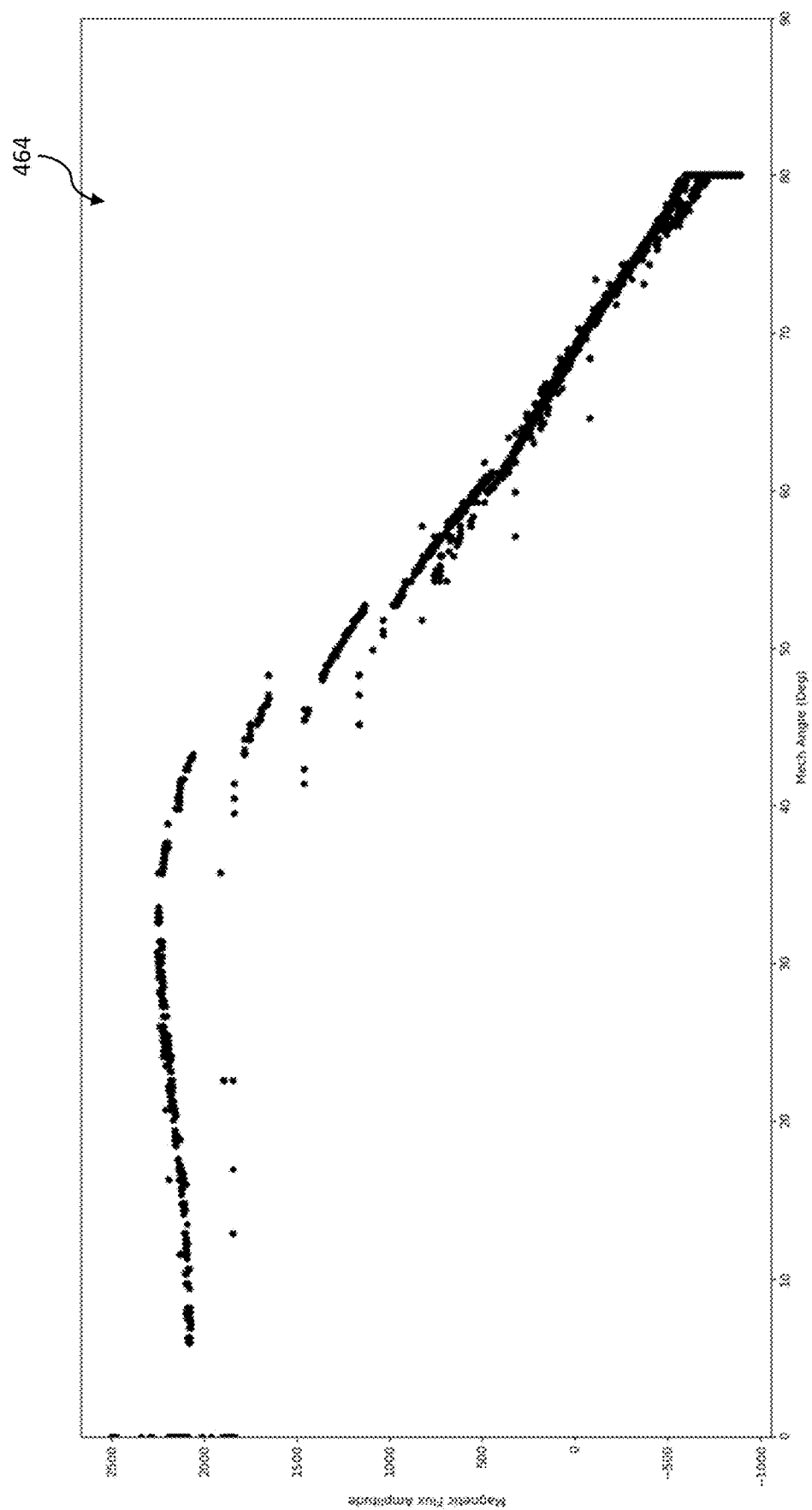
FIGS. 14A-14C are graphs showing the magnitude of the magnetic flux of the thumbwheel in the X-axis, Y-axis, and Z-axis, respectively, as the thumbwheel is rotated through its range of motion as measured by a sensor of the wireless controller of FIG. 9A.
Figure 14B:
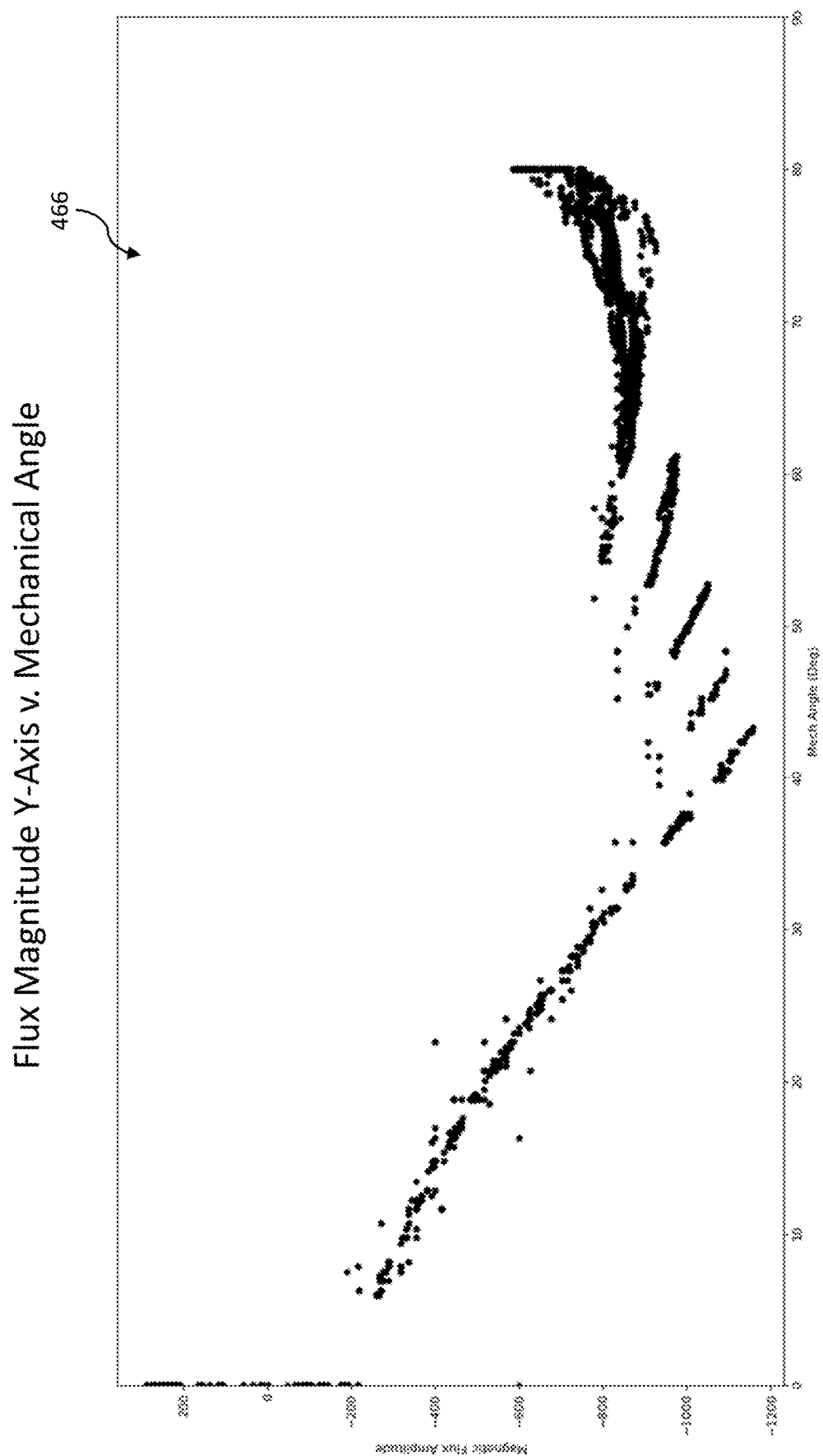
Figure 14C:
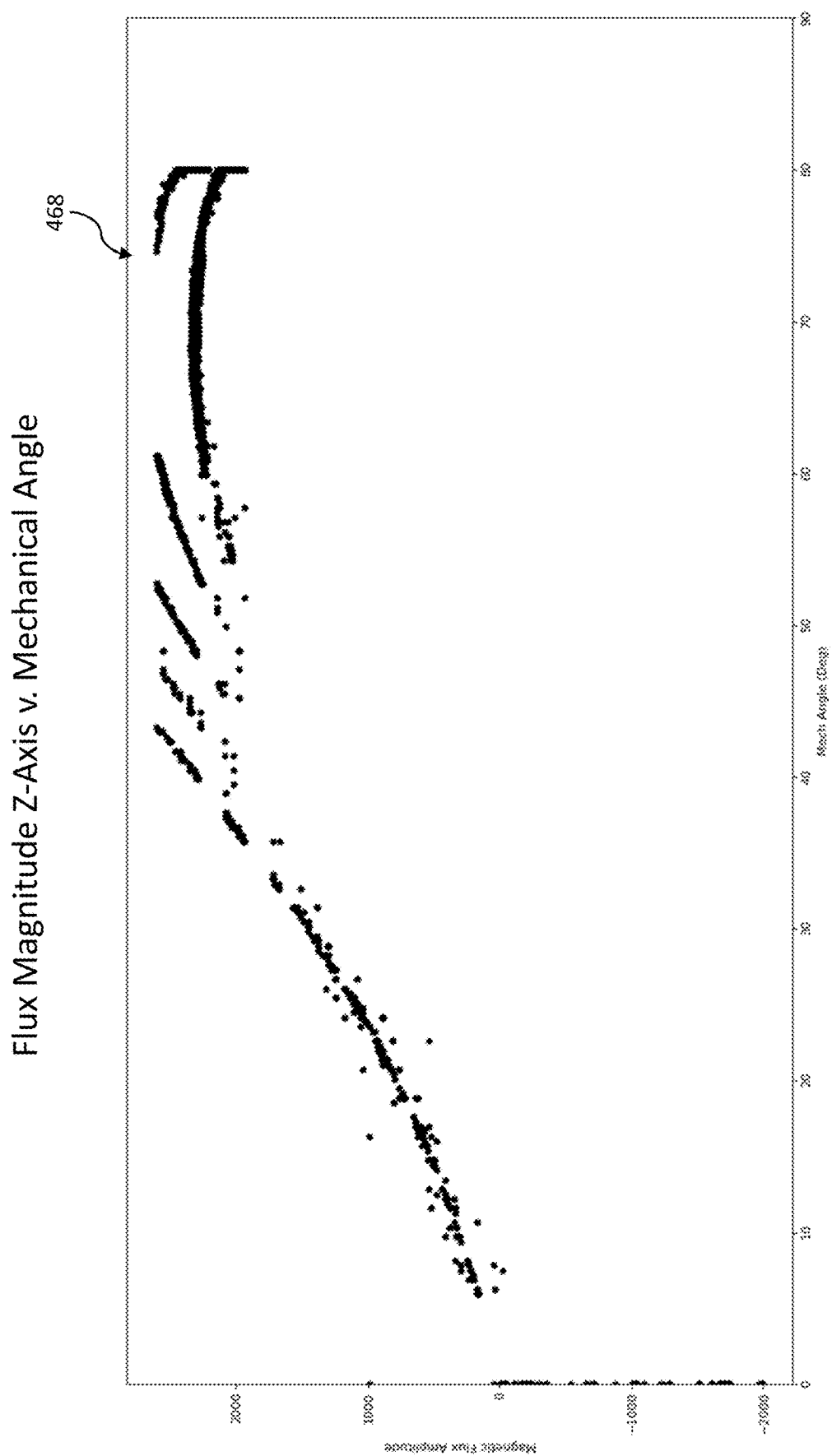

FIGS. 14A-C show example scatter plots 464, 466, 468 of expected flux magnitudes in the X, Y, and Z axes, respectively, as the thumbwheel 424 is rotated throughout its range of motion multiple times. This data may be generated by rotating the thumbwheel 424 and measuring the detected flux magnitude in each direction when no external magnet is present. With respect to FIGS. 14A-C, the processor 448 may evaluate the magnitude of the flux in the X-axis, Y-axis, and Z-axis to determine if the detected flux falls within a range of magnitudes expected from the magnets of the thumbwheel 424. In the example embodiment of the thumbwheel 424 provided in FIG. 9A, the thumbwheel 424 may be rotated from the resting position to the full throttle position, which is approximately from 0-80 degrees, however, in other embodiments the thumbwheel may have a greater or smaller range of motion. In a preferred embodiment, the Hall effect sensor 444 is model number MLX90363 manufactured by Melexis of Ypres, Belgium. This device outputs flux magnitude values using an 8-bit (i.e., 0-255) or 12-bit (i.e., 0-4095) value. With respect to FIG. 14A, the data known to be caused by the thumbwheel 424 being rotated indicates that a valid throttle input (e.g., one that is actually caused by rotation of the thumbwheel 424) will have a magnitude in the X-axis in the range of about −1000 to about 2500 (the magnitude values referenced herein are values output by the sensor 444, e.g., from −16,383 to 16,383). Similarly, with respect to FIGS. 14B-C, valid throttle inputs will have a magnitude in the Y-axis in the range of about −1200 to about 200 and a magnitude in the Z-axis of about −2000 to about 2500. Thus, the processor 448 may determine that any input received at the hall effect sensor 444 that is outside of the ranges of expected values (e.g., by more than a predetermined percent, such as 10%) is likely to be caused by magnetic interference or an external magnet and should be rejected.

The processor 448 may further evaluate whether an input is valid, even if it falls within the expected ranges noted above, by evaluating whether the magnitude of the flux in one dimension corresponds with the expected magnitude of the flux in another dimension. For example, when the flux in the Z-axis is 1000 (see FIG. 14C), the processor 448 may determine that a flux in the Z-axis corresponds with an angular position of the thumbwheel of 20 degrees. At an angular position of 20 degrees, the thumbwheel 424 expects a flux magnitude in the Y-axis of about −600 (see FIG. 14B) and a flux magnitude in the X-axis of about 2100 (see FIG. 14A). The processor 448 may determine if the flux magnitude in two or three dimensions sufficiently corresponds with the flux magnitudes that are expected from a valid throttle input (e.g., +/−10%). Continuing the example above, if the measured flux magnitude was 200 in the Y-Axis and −200 in the X-axis, the processor 448 may determine that the flux value does not sufficiently correspond with the expected values and reject the input as caused by magnetic interference.

Figure 15A:
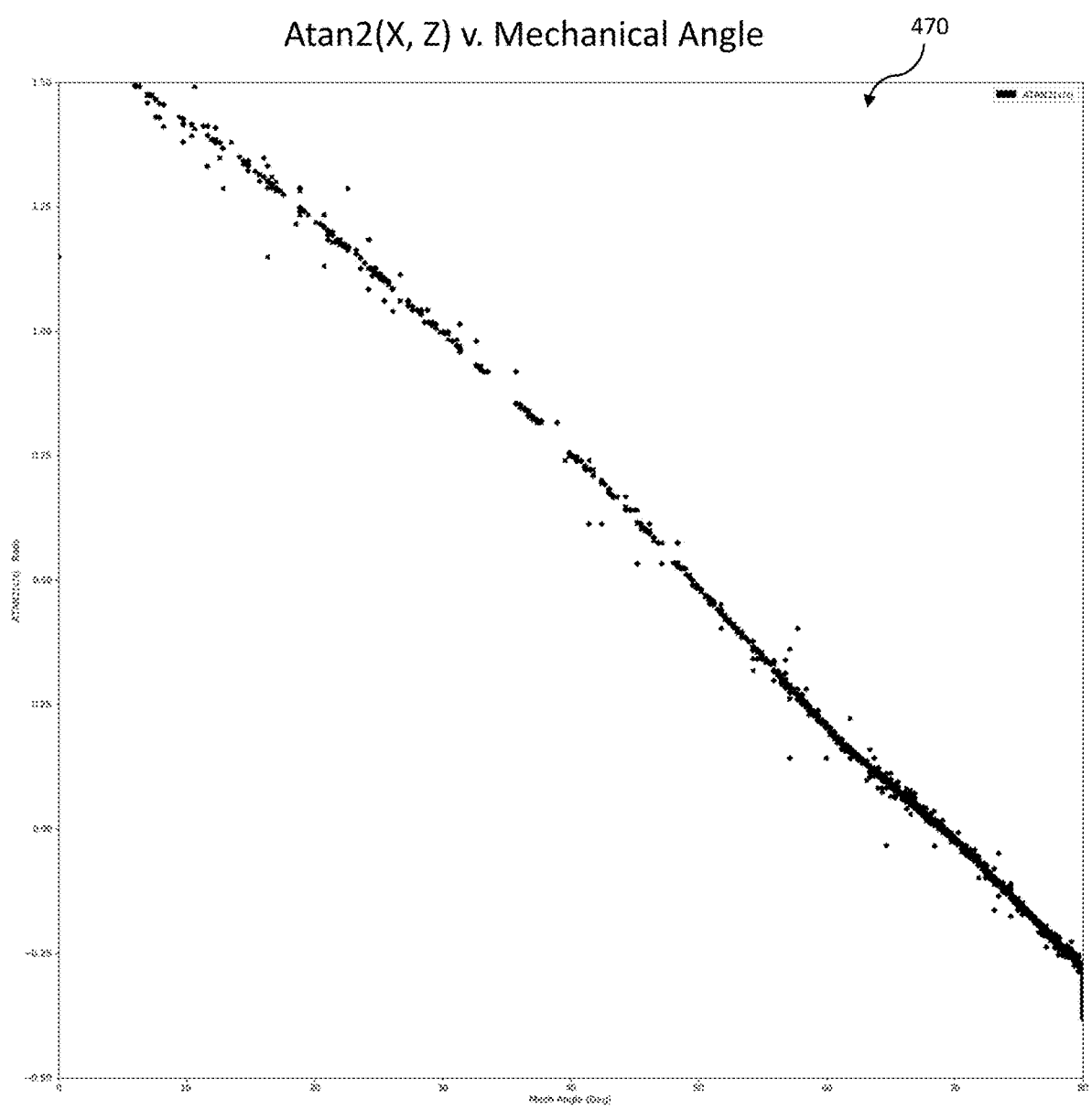
FIG. 15A is a graph showing a tan 2(X, Z) output values calculated from the magnetic flux of the thumbwheel as the thumbwheel is rotated through its range of motion as measured by a sensor of the wireless controller of FIG. 9A.

With reference to FIG. 15A, the processor 448 may be configured to compute the angle of the flux in the XZ plane. The processor 448 may compute the angle by using the arc-tangent function to calculate an angle from the measured flux in the X-direction and the measured flux in the Z-direction. For example, the known A TAN 2 function can be used to calculate an angle in degrees from magnitudes of flux in the X and Z directions, i.e., a tan 2(X,Z). FIG. 15A provides an example scatter plot 470 showing the output of the a tan 2(X,Z) calculation versus the known mechanical angle or angular position of the thumbwheel 424. For the remote controller 400, the angle of the flux in the XZ plane corresponds directly to the how far the thumbwheel 424 has been rotated. As shown, the scatter plot is substantially linear, with a very strong correlation between the throttle position and the calculated angle. Thus, by calculating a tan 2(X,Z), the angle the thumbwheel 424 has been rotated may be determined by comparing the a tan 2(X,Z) value with a graph or table indicating the corresponding mechanical angle of the thumbwheel for that a tan 2(X,Z) value.

Figure 15B:
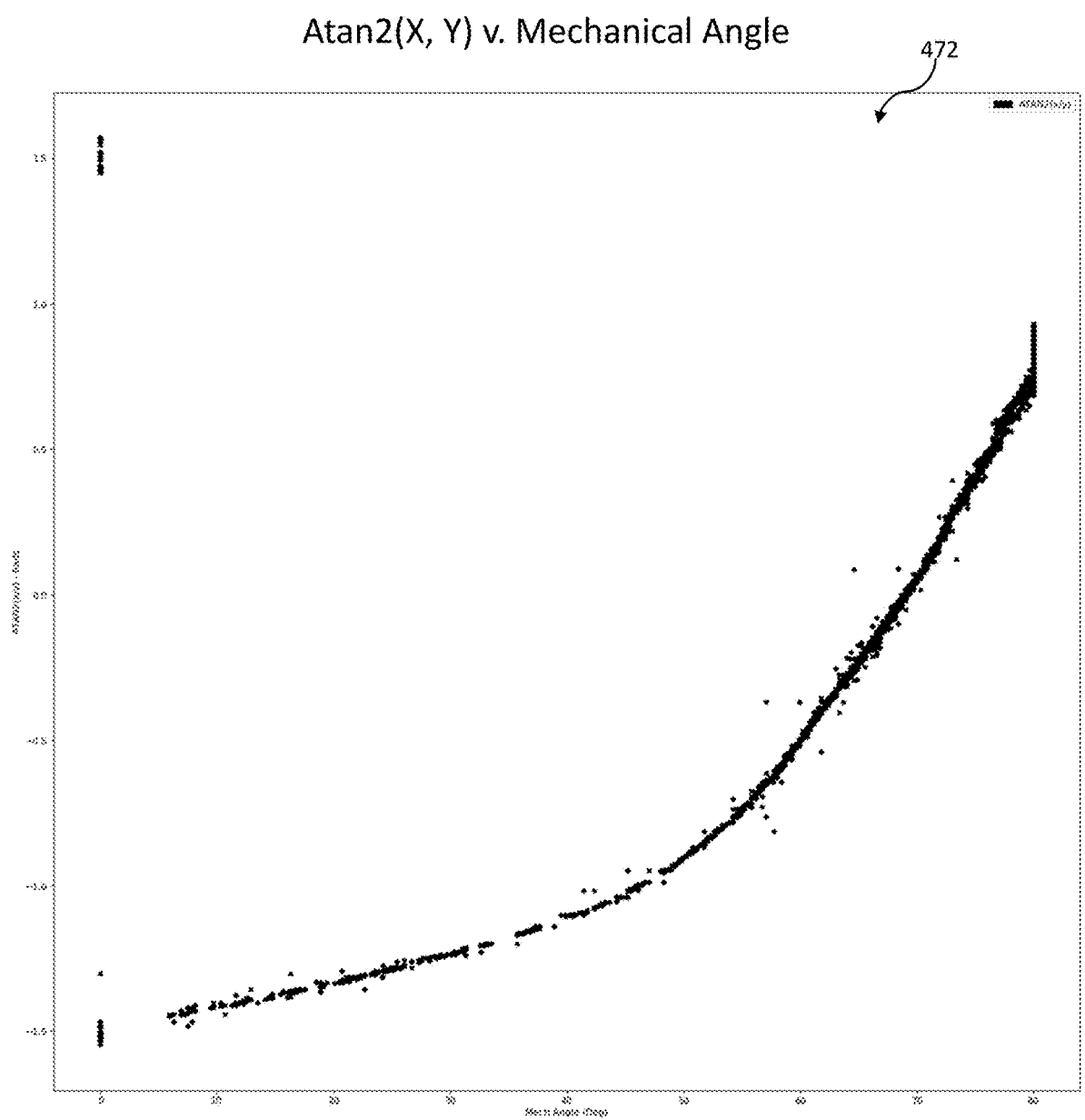
FIG. 15B is a graph showing an a tan 2(X, Y) output values calculated from the magnetic flux of the thumbwheel as the thumbwheel is rotated through its range of motion as measured by a sensor of the wireless controller of FIG. 9A.

Similarly, with reference to FIG. 15B, the processor 448 may compute the angle of the flux in the XY plane, for example. FIG. 15B provides an example scatter plot 472 showing the output of the a tan 2(X,Y) calculation versus the known mechanical angle or angular position of the thumbwheel. For the remote controller 400, the magnitude of flux in the Y-direction will depend up on how well-aligned the magnets 440 and 442 are, relative to the 3D hall effect sensor 444. Thus, the angle of the flux in the XY plane may not correspond as directly to the how far the thumbwheel 424 has been rotated. FIG. 15B illustrates this. Although the scatter plot values are not as linear as the calculated XZ angle illustrated in FIG. 15A, the values in FIG. 15B are tightly clustered around a curve.

As another approach for evaluating whether the input received from the hall effect sensor is valid, the processor can be used to compare the XZ flux angle to the XY flux angle. The processor 448 may be configured to compare whether the measured flux angle in the XZ plane corresponds to the expected measured flux angle in the XY plane. Or, in other words, whether the calculated a tan 2(X,Z) value and the a tan 2(X,Y) value both correspond with approximately the same mechanical angle or angular position of the thumbwheel 424. For example, and with reference to FIGS. 15A and 15B, if the a tan 2(X,Z) is about 0.75, the mechanical angle is determined to be about 40 degrees (see FIG. 15A). The processor 448 may then determine if the calculated a tan 2(X,Y) value corresponds to a thumbwheel mechanical angle of 40 degrees. With respect to FIG. 15B, if the a tan 2(X,Y) value was about −1.2, the processor 448 may determine there is sufficient correspondence and the input is valid, but if the a tan 2(X,Y) value was about 0.5 the processor 448 may determine the input is caused by noise and reject the input. As another example, if the a tan 2(X,Z) value indicates the thumbwheel is rotated 80 degrees, but the a tan 2(X,Y) value indicates the thumbwheel is rotated 30 degrees, the processor 448 may determine the input is caused by an external magnet or noise and reject the input.

Figure 16:
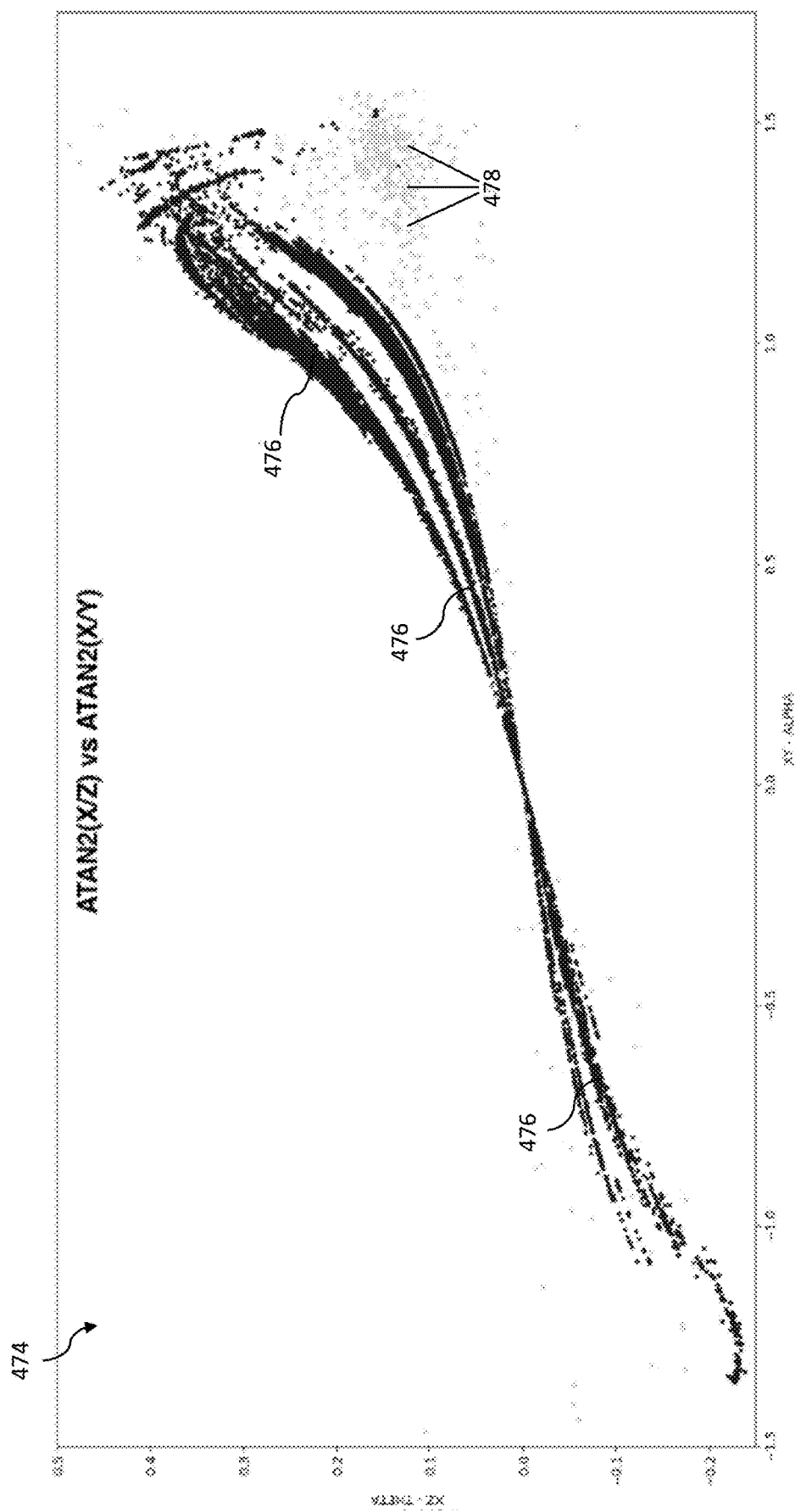
FIG. 16 is a graph showing the a tan 2(X, Z) output values versus the a tan 2(X, Y) values along with noise values.

The relationship between XZ flux angle and the XY flux angle is illustrated with respect to FIG. 16, which is an example scatter plot 474 showing calculated a tan 2(X,Z) versus the corresponding calculated a tan 2(X,Y) across the full range of motion in a multitude of tests. The graph includes first data 476 showing the expected correspondence between the angle of the flux in the XZ and XY planes. The graph further includes second data 478 showing data known to be caused by an external magnet. The processor 448 may be configured to determine the correspondence between input values received by the hall effect sensor 444 with the first data 476. In other words, the processor 448 may determine whether detected flux has an angle in both the XZ plane and XY plane that corresponds to angles of flux in the XZ and XY planes of known valid inputs. For example, with reference to FIG. 16, input received at the hall effect sensor 444 having an angle of about 0.3 radians in the XZ plane and also having an angle of 1.0 radians in the XY plane would be determined to correspond to a valid input because it corresponds with the angles of known, valid inputs. Input having an angle of about 0.3 radians in the XZ plane and 0.25 radians in the XY plane, however, may be determined to be noise or caused by an external magnet because it does not sufficiently correspond with the values expected for a valid input based on the first data 476 of known valid inputs.

Figure 17:
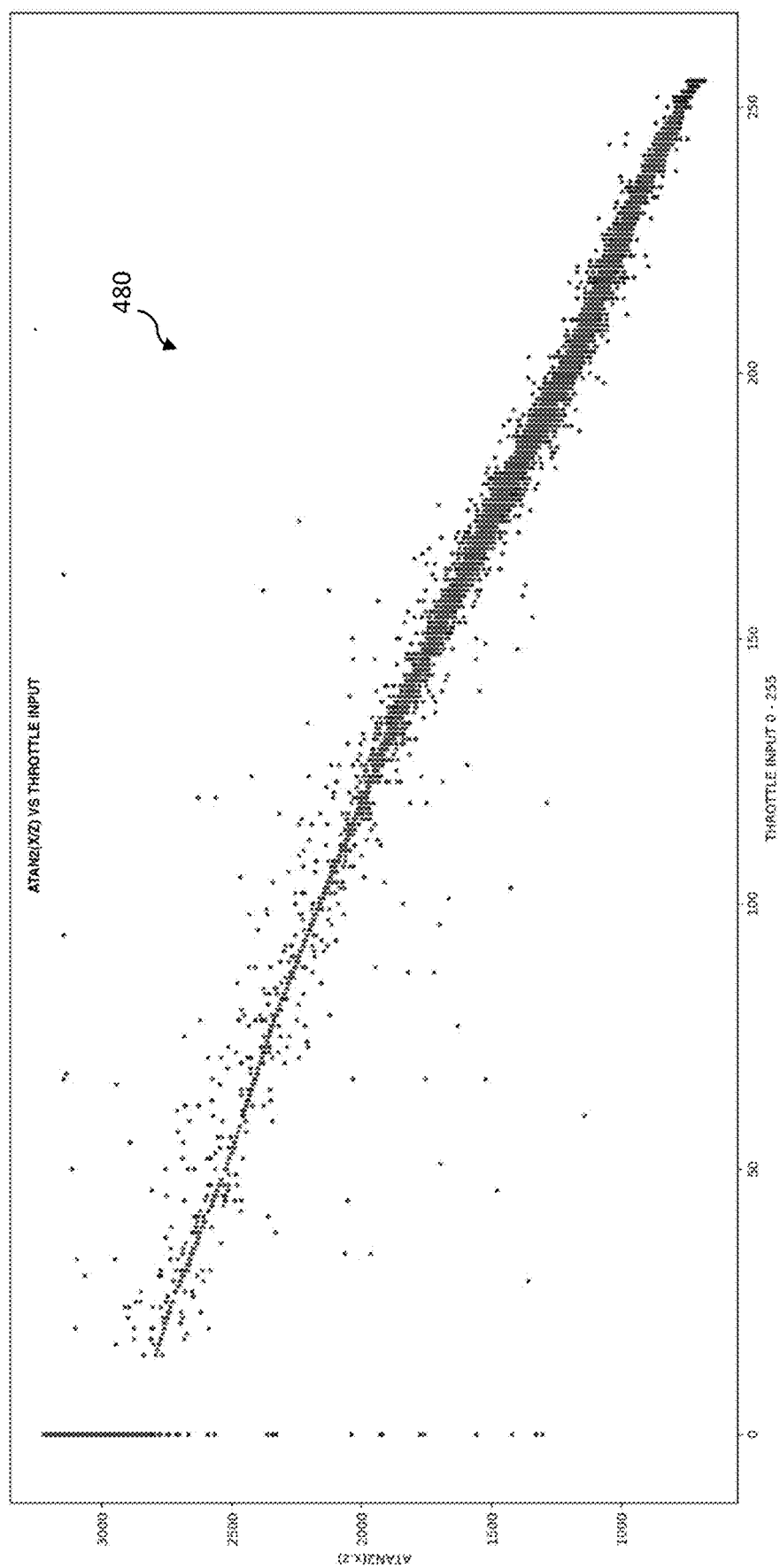
FIG. 17 is a graph showing the a tan 2(X, Z) output values mapped to throttle input values.

Once the input received by the hall effect sensor 444 is determined to be a valid input, (e.g., using the methods described herein), the processor 448 may determine the throttle input to send to the watercraft 100 based on the detected angular position of the thumbwheel 424. With reference to FIG. 17, a graph 480 is provided showing how the angle of the flux in the XZ plane or a tan 2(X,Z) may correspond to a throttle input value. In the example shown, for an 8-bit throttle value, the throttle output values range from 0-255 where a throttle value of 0 is sent when the thumbwheel 424 is determined to be in the resting position (see FIG. 13A) and a throttle value of up to 255 is sent as the thumbwheel 424 is rotated to the full throttle position (see FIG. 13B). The remote controller 400 may then send the determined throttle value (e.g., 0-255) to the watercraft 100. The remote controller 400 may send an 8-bit signal to the watercraft 100 with the throttle value. The remote controller 400 may send a flag along with the 8-bit signal to the watercraft 100 if noise or interference is determined to have caused the throttle input. The watercraft 100 may receive the throttle control signal and determine whether to carry out the throttle control command. The watercraft may provide power to the motor of the watercraft 100 to execute the throttle control command. The watercraft 100 may determine how much power to provide to the motor based on the ride mode selected by the user. For example, if the user selected a beginner mode with limited power, a full throttle input signal from the user may provide less than full power to the motor, e.g., 60% of full power.

In some forms, the evaluation of whether a throttle input is valid is performed by the processor of the watercraft 100. For example, the processor 448 may communicate the raw hall effect sensor 444 data to the watercraft 100 for processing, evaluation of valid throttle input, and output of throttle commands. In other forms, some of the processing may be performed by the processor 448 of the remote controller 400 while other steps are performed by the processor of the watercraft 100.

The remote controller 400 may be configured to receive voice commands from a rider to control the watercraft 100. As explained above, the user interface 426 may include a microphone into which the user may speak control commands that are received by the remote controller 400. The processor 448 of the remote controller 400 may include voice recognition software to process the user's voice commands. The remote controller 400 may determine the user's voice command, identify a control input corresponding to the user's voice command, and generate a throttle input or other control command to send to watercraft 100. The voice commands may include, as examples, to "move forward," "reverse," "move forward at 10 knots," "bring me home," "maintain ride height," "steer left," "call for help." In some forms, the user may be required to press an input button 430 or move the thumbwheel 424 to the full throttle position to speak a voice command. The remote controller 400 may begin listening for voice commands in response to the user pressing the input button 430 or moving the thumbwheel 424. The user may be required to hold the thumbwheel 424 in the full throttle position while the watercraft 100 operates in response to voice commands of the user. The thumbwheel 424 may thus serve as an enabling switch causing the watercraft 100 to cease operation when the user releases th thumbwheel 424, for example, when the user has fallen off of the watercraft 100. In some forms, the processor receives the voice command from the user and communicates the voice command data to the watercraft 100 for further processing. For example, the watercraft 100 may include voice recognition software for identifying voice commands from the user's spoken commands received by the microphone. The watercraft 100 may then identify the control command corresponding to the user's voice command and adjust the operation of the watercraft 100 accordingly.

In some forms, the watercraft 100 additionally or alternatively includes a microphone such that the watercraft 100 (e.g., a computer of the watercraft 100, such as battery box 112) directly receives the user's voice commands, identifies the corresponding control input associated with the voice command, and implements the control input. Including a microphone on the watercraft 100 may be advantageous in situations where the user loses the remote controller 400 or the remote controller 400 stops working (e.g., the battery charge is too low). The user may then use voice commands, for example, to drive the watercraft 100 back to shore. As mentioned above, the user may speak a command to "bring me home" which the watercraft 100 may be configured to autonomously bring the user back to a starting location such as a dock or beach where the user started using the watercraft 100, for example, location data collected by GNSS circuitry. The user may also use the microphone to call for help. The remote controller 400 or watercraft 100 may then call for help to have someone rescue or assist the user. In some forms, the remote controller 400 or watercraft 100 places a phone call to support staff or emergency personnel permitting the user to explain their problem.

The remote controller 400 may be configured to receive control commands through gestures made by the user holding the remote controller or by moving, twisting, or tilting the remote controller 400. As one example, and with reference to FIG. 9C, the user may tilt the remote controller 400 downward and upward as indicated by arrows 982, 984 to control the watercraft 100. For instance, the user may tilt the remote controller 400 downward in the direction of arrow 984 to cause the watercraft 100 to move forward. In some forms, the further the user tilts the remote controller 400, the faster the watercraft 400 travels. The user may tilt the remote controller 400 in the direction of arrow 982 to slow the watercraft 400 and/or cause the remote controller 400 to move in reverse. Similarly, the remote controller 400 may be tilted from side-to-side, for example in the direction of arrows 460, 462 of FIG. 9B, to provide control commands, such as throttle input, steering input, and the like. The remote controller 400 may use the data generated by the IMU 454 to determine the orientation of the remote controller 400, to identify gestures may by the user, and to output corresponding control commands to the watercraft 100. For example, the processor 448 may use data from the IMU to determine the orientation of the remote controller 400 and to generate control commands as explained above for the watercraft 100. In some forms, the user may be required to move the thumbwheel 424 to the full throttle position before tilting the remote controller 400 to send a control command to the watercraft 100. The remote controller 400 may use the orientation of the remote controller 400 when the thumbwheel 424 is moved to the full throttle position as the base or reference orientation (e.g., to mitigate the effect of sensor drift). The orientation of the thumbwheel 424 may then be measured relative to the measured orientation when the user pressed the thumbwheel 424. The user may be required to hold the thumbwheel 424 in the full throttle position while the watercraft 100 operates in response to control inputs by the user moving, twisting, or tilting the remote controller 400. The thumbwheel 424 may thus serve as an enabling switch causing the watercraft 100 to cease operation when the user releases the thumbwheel 424, for example, when the user has fallen off of the watercraft 100. Controlling the watercraft 100 by tilting the remote controller 400, instead of by moving the thumbwheel

424, may be easier for beginners who are still learning to maintain their balance on the watercraft 100 as then they do not also have to learn to move the thumbwheel 424 with the degree of finesse that may be required. Likewise, controlling the watercraft 100 by tilting the remote controller 400 may be advantageous for individuals who lack dexterity or strength in their thumb.

As another example, the remote controller 400 may use data generated by the accelerometer of the IMU 454 for controlling the watercraft 100. As one example, the watercraft 100 may be configured to operate in a series of operational modes that each have progressively more power and speed. The operational modes may be similar to the "gears" of a transmission of an automobile, where "shifting up" to a higher operational mode unlocks a higher top speed and/or a greater rate of acceleration and "shifting down" to a lower operational mode reduces the top speed and/or lowers the rate of acceleration. For instance, in the lowest "gear" or operational mode, the watercraft 100 may only be able to travel up to a certain maximum speed when the thumbwheel 424 is moved to the full throttle position. The user may then shift up to the next gears or operational modes to travel at greater speeds or with greater rates of acceleration. Likewise, the user may shift down to the lower gears or operational modes to have a more limited top speed and/or rates of acceleration. In one form, the user may shift between gears by rapidly moving or flicking the display portion 420 of the remote controller 400, for example, in the directions indicated by arrows 460, 462 of FIG. 9B or in the directions indicated by arrows 482, 484 of FIG. 9C. For instance, the user may flick the remote controller 400 to the right to shift up and to the left to shift down during operation of the watercraft 100. The processer 448 may receive data generated by the accelerometer of the IMU 454 and determine when the user has gestured to shift up or down. The remote controller 400 may communicate the gear selection to the watercraft 100 or may adjust the throttle control signals sent to the watercraft 100 based on the gear or operational mode the user is operating in. Those having skill in the art will understand that while the processing of the IMU 454 data is described as being processed on the remote controller 400, the IMU data may similarly be communicated to the watercraft 100 or another processing device to determine whether the user has gestured or otherwise moved the remote controller 400 to provide a control input or command.

As mentioned above, in some forms the thumbwheel 424 may be configured to slide or be tilted laterally or in the direction of arrows 460, 462 of FIG. 9B. For example, the user may use their thumb to slide or tilt the thumbwheel 424 toward the left or right side of the remote controller 400. This motion of the thumbwheel 424 may be used to provide another input to the remote controller 400 or watercraft 100. The processor 448 may receiving data from the hall effect sensor 444 and determine when the thumbwheel 424 has been moved laterally. In some forms, moving the thumbwheel laterally may move between GUI screens or options displayed on the display screen 428 of the remote controller 424. In some forms, the thumbwheel 424 may be moved laterally to "shift up" and "shift down" between operational modes similar to that described above with the use of accelerometers. For example, the user may slide or tilt the thumbwheel 424 to the right side of the remote controller 400 to shift to a higher gear or operational mode and slide or tilt the thumbwheel 424 to the left side of the remote controller 400 to shift to a lower gear or operational mode.

The processor 448 is configured to cause the display screen 428 of the user interface 426 to display a GUI providing information to the user. The processor 448 is configured to receive input from the input buttons 430 of the user interface 426 to receive input and selections from the user, for example, based on what is displayed on the GUI of the display screen 428. The user may be able to view information pertaining to the remote controller 400 and/or the watercraft 100 on the display screen 428, for example, the information shown in FIG. 6C above. The user interface 426 may permit the user to select the different ride modes such as those discussed above with respect to the other remote controller embodiments of FIG. 6A-B. The input buttons 430 may be within the housing 402 and accessible through holes or openings in the plastic body of the housing 402. The rubber layer extends over the holes or openings keeping the cavity 408 of the housing 402 sealed while permitting access to the input buttons 430 such that the buttons 430 may be actuated by depressing a portion of the rubber layer.

The watercraft 100 may have standard ride modes or profiles that a user may select when operating the watercraft 100. As described above, the ride modes or profiles may provide the user with varying amounts or power, top speeds, and rates of acceleration. For instance, a beginner ride mode may have a limited amount of power, a lower top speed and a slower rate of acceleration as compared to the more advanced ride modes or profiles. The user may use the remote controller 400 to select the ride mode or profile. In some forms, the remote controller 400 does not store the options selectable by a user (such as ride modes), but instead communicates with the watercraft 100 to receive the options for the user to select and the corresponding GUI to display to the user on the display screen 428. The remote controller 400 may serve as a user interface of the computer in the watercraft 100 through which the user is able to make selections of ride modes, features, and view data stored in the computer of the watercraft 100. Such a configuration of remote controller 400 where the remote controller serves as a "window" into the computer of the watercraft 100 is advantageous as the remote controller 400 may not need to be updated to unlock new features and ride modes. Instead, the computer of the watercraft 100 may receive the software and firmware updates for implementing new features (e.g., ride modes, etc.) without needing to also update the remote controller 400 (e.g., provide firmware or software updates). This also permits users to create their own custom ride modes and upload them to the watercraft 100. For example, a user may create a custom ride mode tailored to their riding style. A user may, for example, create a custom table for the amount of power provided to the motor based on the detected angular position of the thumbwheel or the throttle input received from the remote controller 400. A user may create their custom ride mode on a smartphone application or via a computer program and load the custom ride mode to the computer of their watercraft 100. The user may load the custom ride mode directly to the computer of the watercraft 100 (e.g., via Bluetooth or Wi-Fi) or indirectly via a server computer associated with the watercraft 100 and application.

In some forms, a wearable device may be used to control the watercraft 100. The wearable device may be for example, a smartwatch, smart jewelry, smart clothing, and smart eyewear. The wearable device may communicate with the watercraft 100 to provide control commands. For example, the wearable device may include a microphone for receiving voice commands from the user. The wearable device may include a speaker and/or display screen for providing information to the user, for example, the speed of the watercraft 100, the charge of the battery of the watercraft 100, and other information such as that shown in FIG. 6C above. The wearable device may communicate the voice commands to the watercraft 100. As another example, the wearable device may include an IMU that detects gestures of the user and communicate the gestures or commands to the watercraft based on the detected gestures. The gestures may be similar to those described above with respect to the remote controller 400, for example, the user may tilt the wearable device to provide an input to move forward, backward, and/or steer.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A wireless remote controller for a personal watercraft, the remote controller comprising:
    a watertight body forming a watertight compartment;
    a thumbwheel disposed on an upper surface of the watertight body and outside of the watertight compartment, the thumbwheel defining an axis of rotation, wherein the thumbwheel is rotatable about the axis relative to the watertight body;
    one or more magnets affixed to the thumbwheel such that the one or more magnets rotate with the thumbwheel relative to the watertight body;
    a magnetic sensor disposed within the watertight compartment configured to output magnetic field data in a first direction and magnetic field data in a second direction perpendicular to the first direction;
    a processor disposed within the watertight compartment and operably coupled to the magnetic sensor, the processor configured to calculate an angle of magnetic flux between the first direction and second direction based at least in part on the magnetic field data in the first direction and magnetic field data in the second direction and determine an angular position of the thumbwheel relative to the watertight body based at least in part on the angle of magnetic flux, the processor generating a control signal based at least in part on the determined position of the thumbwheel; and
    communication circuitry operably coupled to the processor configured to communicate control signals to an associated personal watercraft.

2. The remote controller of claim 1 wherein the processor is further configured to identify whether the magnetic field data is associated with the one or more magnets or caused by magnetic interference, wherein the processor determines the angular position of the thumbwheel based on the magnetic field data when the magnetic field data is identified as being associated with the one or more magnets.

3. The remote controller of claim 2 wherein the processor is configured to identify magnetic interference based at least in part on a magnitude of a magnetic field in one of the first direction and second direction.

4. The remote controller of claim 3 wherein the one of the first direction and second direction is parallel to the axis of rotation of the thumbwheel.

5. The remote controller of claim 2 wherein the processor is configured to identify magnetic interference based at least in part on an angle of magnetic flux in a first plane and an angle of magnetic flux in a second plane perpendicular to the first plane.

6. The remote controller of claim 1 wherein the thumbwheel rotates in a direction substantially parallel with a longitudinal axis of the body, and the thumbwheel is able to move laterally relative to the longitudinal axis of the body to receive an input from a user.

7. The remote controller of claim 6 wherein the processor is further configured to determine a lateral position of the thumbwheel, wherein the processor determines the angular position of the thumbwheel based on the magnetic field data along a first axis and second axis of the magnetic field data and determines the lateral position of the thumbwheel based at least in part on the magnetic field data along a third axis of the magnetic field data, the first axis and the second axis and the third axis being perpendicular to one another.

8. The remote controller of claim 1 wherein the one or more magnets includes a first magnet and a second magnet.

9. The remote controller of claim 8 wherein a north pole of the first magnet faces radially outward of the thumbwheel and a north pole of the second magnet faces radially inward of the thumbwheel.

10. The remote controller of claim 1, the watertight body further comprising a hard-shell overlayed with a rubberized layer.

11. The remote controller of claim 10, further comprising at least one button accessible through the hard-shell such that the button can be actuated by depressing a portion of the rubberized layer.

12. The remote controller of claim 1, further comprising:
    a battery disposed in the watertight compartment; and
    a coil for wireless charging of the battery.

13. The remote controller of claim 1, wherein the wireless remote controller is buoyant in fresh water.

14. The remote controller of claim 1 wherein the thumbwheel is removably attached to the body.

15. The remote controller of claim 1 wherein the watertight body is formed of a first portion and a second portion, the first portion coupled to the second portion with a seal disposed therebetween to inhibit fluid from entering the watertight compartment.

16. The remote controller of claim 12 further comprising:
    a gripping portion of the body;
    a display portion of the body;
    a display disposed in an upper surface of the display portion;
    wherein the battery is disposed in the gripping portion; and
    wherein at least half of the weight of the wireless remote controller is within the gripping portion of the body.

17. The remote controller of claim 1 further comprising:
    a Global Navigation Satellite System (GNSS) receiver disposed within the watertight compartment and operably coupled to the processor;

wherein the processor is further configured to determine a speed, a location, or a speed and a location of the remote controller based on data received from the GNSS receiver; and wherein the communication circuitry is further configured to communicate the speed, location, or speed and location to the associated personal watercraft.

18. The remote controller of claim 1 further comprising:

an inertial measurement unit (IMU) disposed within the watertight compartment and operably coupled to the processor;

wherein the processor is further configured to receive at least one of acceleration and orientation data from the IMU; and wherein the communication circuitry is further configured to communicate with the personal watercraft based on the at least one of acceleration and orientation data such that the personal watercraft is operated based at least in part on the at least one of acceleration and orientation data.

19. A method of controlling a personal watercraft, the method comprising:

collecting, via a magnetic sensor disposed within a watertight compartment, magnetic field data in a first direction and a second direction perpendicular to the first direction;

calculating, via a processor disposed within the watertight compartment, an angle of magnetic flux between the first direction and second direction based at least in part on the magnetic field data in the first direction and magnetic field data in the second direction;

determining an angular position of a thumbwheel of a remote controller based at least in part on the angle of magnetic flux, wherein the thumbwheel defines an axis of rotation about which the thumbwheel is rotatable, wherein the thumbwheel is disposed on an upper surface of the remote controller and outside of the watertight compartment, and wherein the thumbwheel includes at least one magnet attached to the thumbwheel; and communicating a control signal to a personal watercraft to control operation of the personal watercraft based at least in part on the determined position of the thumbwheel.

20. The method of claim 19 wherein determining the angular position of the thumbwheel includes identifying whether the magnetic field data is associated with the at least one magnet or caused by magnetic interference and, determining the position of the thumbwheel based on the magnetic field data when the magnetic field data is identified as being associated with the at least one magnet.

21. The method of claim 20 wherein identifying whether the magnetic field data is caused by magnetic interference is based at least in part on a strength of a magnetic field parallel to an axis of rotation of the thumbwheel.

22. The method of claim 19 further comprising determining a lateral position of the thumbwheel relative to a longitudinal axis of the remote controller, the thumbwheel configured to rotate in a direction substantially parallel to the longitudinal axis of the remote controller.

23. The method of claim 19 wherein the at least one magnet includes a first magnet and a second magnet and wherein determining the position of the thumbwheel includes determining a rotational position of the thumbwheel based at least in part on an orientation of a magnetic field of the first magnet and second magnet.

24. The method of claim 19 further comprising determining a speed, a location, or a speed and location of the remote controller based on data received from a Global Navigation Satellite System (GNSS) receiver of the remote controller and communicating the speed, location, or speed and location to the personal watercraft.

25. The method of claim 19 further comprising receiving at least one of acceleration and orientation data from an inertial measurement unit (IMU) of the remote controller and communicating with the personal watercraft to operate the personal watercraft based at least in part on the at least one of acceleration and orientation data.

26. The remote controller of claim 1 wherein to calculate the angle of magnetic flux between the first direction and second direction includes using an arc-tangent function.

* * * * *